United States Patent [19]

Duvall et al.

[11] 4,428,065

[45] Jan. 24, 1984

[54] DATA PROCESSING SYSTEM WITH MULTIPLE DISPLAY APPARATUS

[75] Inventors: William S. Duvall, Portola Valley, Calif.; William K. English, Tokyo, Japan

[73] Assignee: Xerox Corporation, Stamford, Conn.

[21] Appl. No.: 360,036

[22] Filed: Mar. 19, 1982

Related U.S. Application Data

[63] Continuation of Ser. No. 52,992, Jun. 28, 1979 abandoned.

[51] Int. Cl.³ .............................. G06F 3/14; G06F/7/24

[52] U.S. Cl. .............................. 364/900; 340/731; 340/798; 340/751

[58] Field of Search .............................. 364/200 MS File, 900 MS File; 340/728, 731, 798, 751

[56] References Cited

U.S. PATENT DOCUMENTS

| | | | |
|---|---|---|---|
| 3,735,383 | 5/1973 | Naka | 340/750 |
| 3,878,536 | 4/1975 | Gilliam | 340/324 AD |
| 3,893,100 | 7/1975 | Stein | 340/731 |
| 4,069,511 | 1/1978 | Lelke | 364/200 |
| 4,070,710 | 1/1978 | Sukonick et al. | 340/721 |
| 4,122,533 | 10/1978 | Kubinak | 340/790 |
| 4,193,119 | 3/1980 | Arase et al. | 364/900 |
| 4,242,678 | 12/1980 | Somerville | 340/731 X |
| 4,257,044 | 3/1981 | Fukuoka | 340/731 |

*Primary Examiner*—Eddie P. Chan
*Attorney, Agent, or Firm*—Barry Paul Smith; W. Douglas Carothers, Jr.

[57] ABSTRACT

A data processing system comprises a first selection device for selecting a plurality of characters of a first set, the characters of the first set each being defined by a bit map of first predetermined dimensions. A second selection device is capable of selecting a plurality of characters of a second set, the characters of the second set each being defined by a bit map of second predetermined dimensions greater than the first predetermined dimensions. A display device is capable of displaying the selected characters of the first and second sets, and a control device is responsive to the first and second selection devices for controlling the display device to display the selected characters of the first set in a first display area and the selected characters of the second set in a second display area, the first dislay area representing a page of text of characters of the first set, and the second display area representing a magnified portion of the page of text comprised of characters of the second set.

7 Claims, 15 Drawing Figures

| LARGE DISPLAY CHARACTERS | X | Y |
|---|---|---|
| 43 | 100 | 100 |
| 4 | 200 | 100 |
| 17 | 500 | 100 |
| 102 | 200 | 200 |
| 5 | 300 | 200 |
| 2 | 500 | 200 |
| 87 | 100 | 300 |
| 19 | 200 | 300 |
| 33 | 400 | 300 |
| 100 | 200 | 400 |
| 42 | 500 | 400 |
| 59 | 100 | 500 |
| 75 | 500 | 500 |
| 12- BIT CODE | 10-BITS | 10-BITS |

HYPOTHETICAL DISPLAY BIT MAP GENERATION CONTROL WITHOUT SORTING

FIG. 7

| | LARGE DISPLAY CHARACTERS | X | Y |
|---|---|---|---|
| FROM LARGE CHARACTERS STRIKE 0 ON DISK | 2 | 500 | 200 |
| | 4 | 200 | 100 |
| | 5 | 400 | 200 |
| | 17 | 500 | 100 |
| | 19 | 400 | 300 |
| FROM STRIKE 1 | 33 | 400 | 300 |
| | 42 | 500 | 400 |
| | 43 | 100 | 100 |
| FROM STRIKE 2 | 59 | 100 | 500 |
| FROM STRIKE 3 | 75 | 500 | 500 |
| | 87 | 100 | 300 |
| FROM STRIKE 4 | 100 | 200 | 400 |
| | 102 | 200 | 200 |

ACTUAL DISPLAY BIT MAP GENERATION CONTROL FOLLOWING SORT

FIG. 8

DATA PROCESSING SYSTEM WITH MULTIPLE DISPLAY APPARATUS

This is a continuation of application Ser. No. 052,992, filed June 28, 1979, now abandoned.

BACKGROUND OF THE INVENTION

This invention relates to data processing and, more particularly, to a data processing system of the general type comprising first selection means for selecting a plurality of characters of a first set, second selection means for selecting a plurality of characters of a second set, display means for displaying the selected characters of the first and second sets, and control means responsive to the first and second selection means for controlling said display means to display the selected characters of said first set in a first display area and the selected characters of said second set in a second display area.

An example of the above-type of data processing system used to process Japanese language text is described in U.S. Pat. No. 4,193,119 filed on Mar. 25, 1977 in the names of Shingo Arase and Roy J. Lahr for Apparatus for Assisting in the Transposition of Foreign Language Test and assigned to the assignee of the present invention. As described in that system, a display is divided into two discrete display areas. A first display area is used to display a portion of the Japanese text being created and which may be composed of Hiragana, Katakana, Romaji and Kanji characters. The second display area is used to display Kanji characters having a sound similarity to a phonetic Japanese character or characters (e.g. Hiragana or Katakana) just selected and made to appear in the first text display area. A desired one or more Kanji characters may then be selected for substitution into the text display area in place of the similarly sounding Japanese phonetic character or characters that last appeared in the text.

It would be desirable to provide a data processing system of the general type described in U.S. Pat. No. 4,193,119, where the concept of providing multiple display areas could be expanded to display in a first display area the complete page of text being created to thereby enable page formatting and the like, and in addition to display in a second display area a magnified portion of the page of text being created to thereby facilitate editing and verification of the text. It would also be desirable to provide a third display area for Kanji selection, as is done in the second display area of the system of U.S. application Ser. No. 781,266. It would further be desirable if the second display area for magnified viewing could be made adjustable in terms of its dimensions.

SUMMARY OF THE INVENTION

In accordance with one aspect of the invention, a data processing system is provided comprising first selection means for selecting a plurality of characters of a first set, said characters of said first set each being defined by a bit map of first predetermined dimensions; second selection means for selecting a plurality of characters of a second set, said characters of said second set each being defined by a bit map of second predetermined dimensions greater than said first predetermined dimensions; display means for displaying the selected characters of said first and second sets; and control means responsive to said first and second selection means for controlling said display means to display the selected characters of said first set in a first display area and the selected characters of said second set in a second display area, said first display area representing a page of text of characters of said first set, and said second display area representing a magnified portion of said page of text comprised of characters of said second set.

In accordance with the preferred embodiment, the first set of characters include Hiragana, Katakana and Romaji characters, as well as a single "dummy" character representative of all Kanji characters. All of these characters of the first set are of first predetermined dimensions, e.g., a bit map 7 bits wide by 7 bits high. These characters appear in a first display area which is preferably a full page display to thereby enable page formatting and the like. The Kanji characters normally cannot be legibly reproduced in the full page display area, due to the size of the bit map, the normal resolution capabilities of contemporary display devices and the complexity of these characters. Consequently, a single "dummy" character bit map is used to represent all Kanji characters of the first set.

The second set of characters preferably include Hiragana, Katakana, Romaji and Kanji characters.. In the preferred embodiment, the bit map dimensions for each character of the second set, including all the Kanji characters, are 18 bits wide by 20 bits high. The Kanji character subset is thus capable of being legibly reproduced in the second display area. The purpose of the second display area is to display a magnified portion of the text being created and which is displayed in the first display area.

In accordance with a further aspect of the invention, the control means includes means for selectively adjusting the dimensions of the second display area. In this manner, a "window" defining the second display area may be expanded to include as much of the text being created as is necessary and required for easy text editing, creation and viewing. In accordance with this aspect, it is posssible, if desired, to enlarge the second display area to encompass the entire display so that only a magnified portion of the full page of text being created is displayed. Alternately, a second display area need not be used at all, the viewer relying solely upon the text as depicted in the full page area. When both display areas are used, it is possible to enlarge the window defining the second display area to overlap that portion of the first display area not presently containing text.

In accordance with a still further aspect of the invention, the control means includes means for controlling the display means to display preselected Kanji characters in a third display area, so as to enable easy Kanji selection for substitution in the text in place of similarly sounding Hiragana and Katakana phonetics, such as is accomplished in the system described in U.S. Pat. No. 4,193,119.

BRIEF DESCRIPTION OF THE DRAWINGS

These and other aspects and advantages of the present invention will be described below with reference to the accompanying drawings, wherein:

FIG. 7 shows a hypothetical display bit map generation control list stored in the main memory of FIGS. 2 and 6, wherein the characters appear in an ordered visual presentation sequence;

FIG. 8 shows the display bit map generation control list of FIG. 7, wherein the characters are sorted into an ordered storage sequence;

DESCRIPTION OF THE PREFERRED EMBODIMENT

At the outset of this description, it must be stated that the term "character" as used herein is meant to imply not only recognizable alphanumerics and language character forms, but also any graphical or symbolic representation of any size, shape or geometric orientation.

Figure 1:
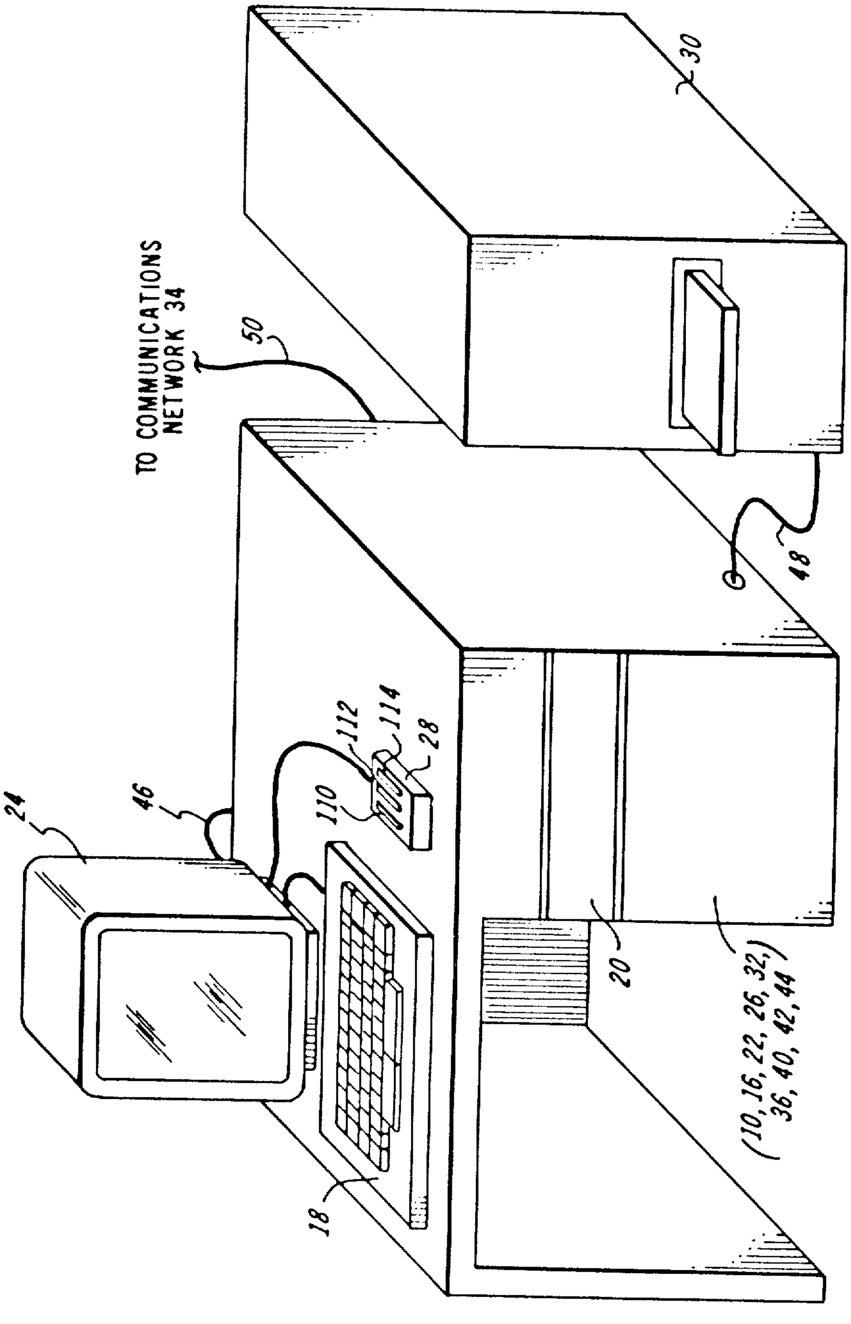
FIG. 1 is a perspective view of a data processing system of the present invention.
Figure 2:
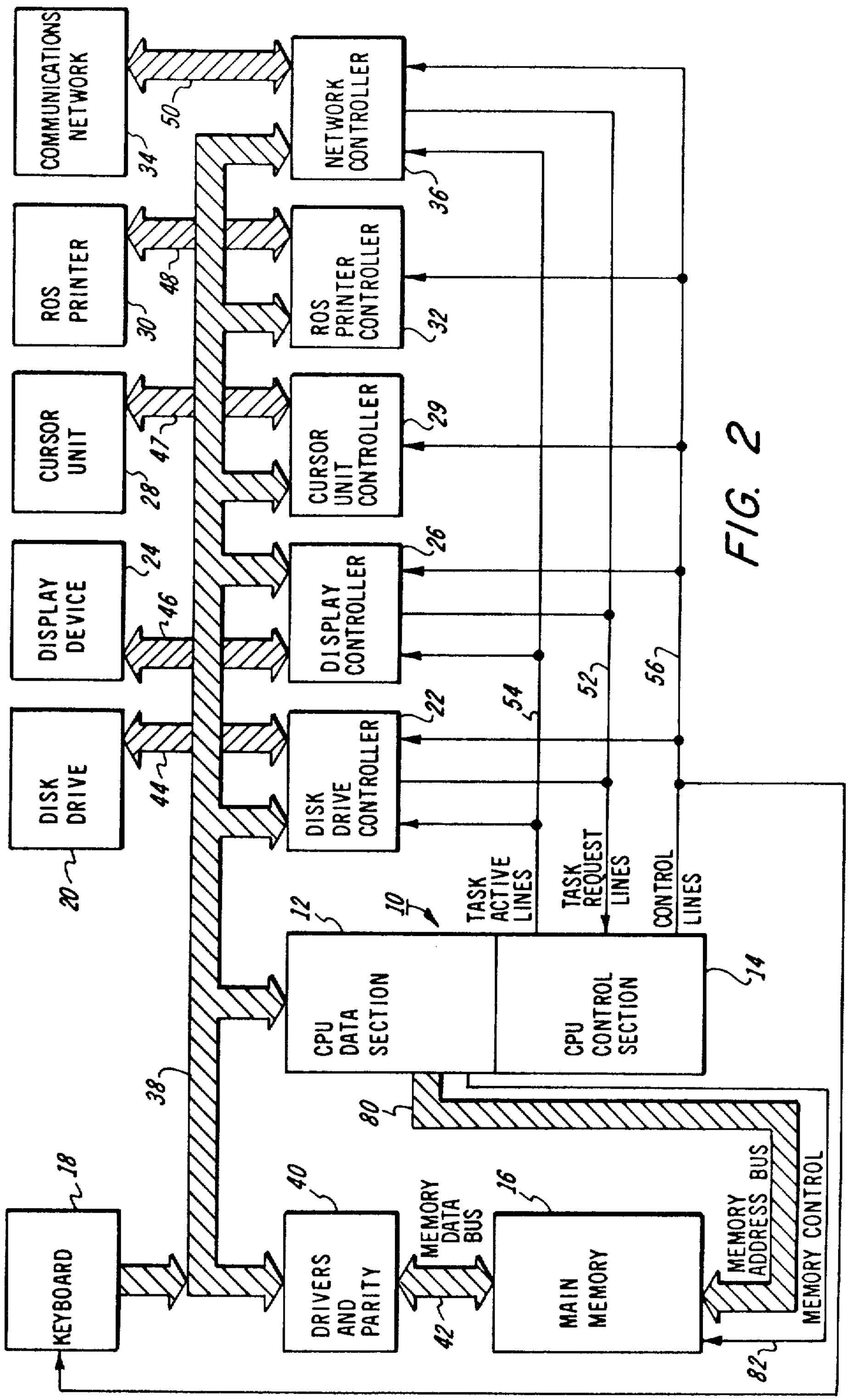
FIG. 2 is a block diagram representation of the data processing system of FIG. 1.

Referring now to FIGS. 1 and 2, a data processing system of the present invention is shown. The system includes a central processing unit (CPU) 10 that is comprised of a data section 12 and a control section 14. The system also comprises a main memory 16 and a plurality of peripheral devices, some of which having associated controllers. More specifically, the system comprises a keyboard 18, a disk drive 20 with associated disk drive controller 22, a display device 24 with associated display controller 26, a cursor unit 28 with associated cursor unit controller 29, a raster output scanned (ROS) printer 30 with associated ROS printer controller 32, and a communications network 34 with associated network controller 36. The keyboard 18 is unencoded and does not require a separate controller.

Information is transferred to and from the data section 12 of the CPU 10 by means of a main data transfer bus 38. The preferred processor 10 is designed to handle 16-bits of parallel data, and so the bus 38 is comprised of 16 parallel lines. The data bus 38 is connected not only to the CPU data section 12, but also to the main memory 16 through a driver and parity circuit 40 and a 32-bit memory data bus 42. Additionally, the data bus 38 is connected to the disk drive controller 22, the display controller 26, the cursor unit controller 29, the ROS printer controller 32 and the network controller 36, as well as to the keyboard 18.

Information is thus applied directly onto the data bus 38 from the keyboard. On the other hand, the disk drive 20, display device 24, cursor unit 28, ROS printer 30 and communications network 34 are each input/output peripheral devices and information is transferred to and from such devices through and by means of their respective controllers 22, 26, 29, 32 and 38. Thus, a suitable bus 44 is connected between the disk drive 20 and its controller 44, a bus 46 is connected between the display device 24 and its controller 26, a bus 17 is connected between the cursor unit 28 and its controller 29, a bus 48 is connected between the ROS printer 30 and its controller 32, and a bus 50 is connected between the communications network 34 and its controller 36. The nature and constitution of many of the signals transferred along the busses 44, 46, 47, 48 and 50 will be described below.

The disk drive controller 22, display controller 26 and network controller 36 are each capable of generating one or more task request signals in the form of "wake-up" commands whenever it requires one or more services to be performed by the CPU 10. The cursor unit controller 29 and ROS printer controller 32 do not employ the use of task requests. The disk controller 22 is capable of generating two task request signals i.e. KSEC (Disk Sector Task) and KWD (Disk Word Task). These signals are applied along respective task request lines 52 to the CPU control section 14. The display controller 26 is capable of generating three task request signals associated with the display of data, i.e., DWT (Display Word Task), DHT (Display Horizontal Task) and DVT (Display Vertical Task) that are applied along respective task request lines 52 to the CPU control section 14. Additionally, the display controller generates a CURT (Cursor Task) task request signal periodically to enable the CPU 10 to execute a program routine associated with the handling of cursor data. The network controller 36 is capable of generating a single task request signal, i.e., NET (Network Task) that is applied along a respective line 52 to the CPU control section 14.

Other task request signals are generated internally of the CPU 10 and include MPT (Main Program Task), MRT (Memory Refresh Task) and PART (Parity Task). The MPT task request signal is associated with the main microprogram routine stored in the CPU control section 14 and is always true, i.e., the main microprogram routine is always requesting service. The MRT task request signal goes true every 38.08 is in order to refresh information stored in the main memory 16. Lastly, the PART task request signal goes true whenever a parity error is detected by the parity circuit 40.

In order for each of the controllers 22, 26 and 36 to be informed when the CPU 10 is executing instructions relating to the requested service, the control section 14 includes means to be described below for applying "task-active" status signal back to the controller. These task active signals are applied on lines 54 from the control section 14 to the controllers 22, 26 and 36, as shown in FIG. 2. There are two task-active lines 54 connected to the disk controller 22 (associated with the KSEC and KWD tasks), four task active lines connected to the display controller 26 (associated with the DWT, DHT, DVT and CURT tasks) and one task-active line 54 connected to the network controller 36 (associated with the NET task).

Referring now in more detail to the CPU 10, and in particular to the control section 14 thereof, it must be stated generally that the control section 14 applies instructions to the data section 12 for execution thereby. Additionally, instructions in the form of control signals are applied along respective control lines 56 to the various I/O controls 22, 26, 29, 32 and 36 for execution thereby. The instructions are forwarded in accordance with a particular sequence or routine to be carried out and identified with a particular task to be serviced. The control section includes means to be described below for determining which of a plurality of wake-up task request signals applied to the control section 14 has the highest current priority value. More specifically, each of the plurality of tasks to be serviced is preassigned a unique priority value. Thus, performing a requested service for the display controller 26 may be of higher priority than performing a requested service for the network controller 36. The control section 14 forwards instructions associated with the highest current task to serviced to the data section 12 and respective I/O controller for execution.

Figure 6:
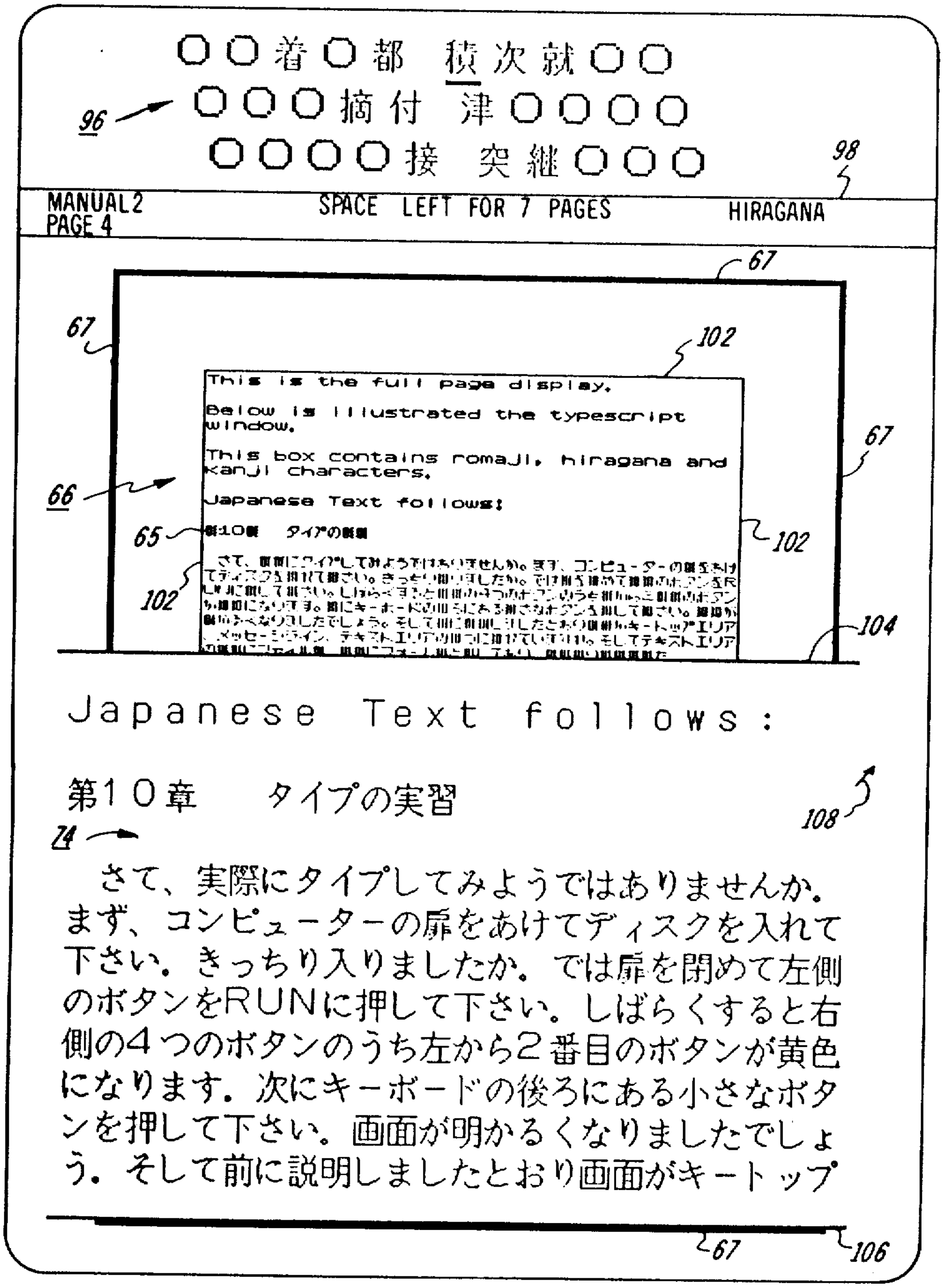
FIG. 6 shows an exemplary image display on the display device depicted in FIG. 2.

As indicated above, there are no task request signals supplied from the cursor unit controller 29 and the ROS printer controller 32. Rather a program routine associated with the processing of cursor information is processed in response to the CURT task request signal initiated by the display controller 26. The printing task is initiated by the operator depressing a command key on the keyboard 18. This will cause a number of selectable commands to be displayed on the display device 24 in a key top area 96 (FIG. 6). One of the commands is a print command which can then be selected by hitting a key on the keyboard 18 corresponding to the location of the print command in the key top area. This entire concept will be described in more detail below in connection with the description of FIG. 6. At this time, however, it should be noted that the print command signal generated by the keyboard 18 is interpreted by the CPU 10 as a "Print Task Request" which is then serviced in the manner described above.

Figure 12:
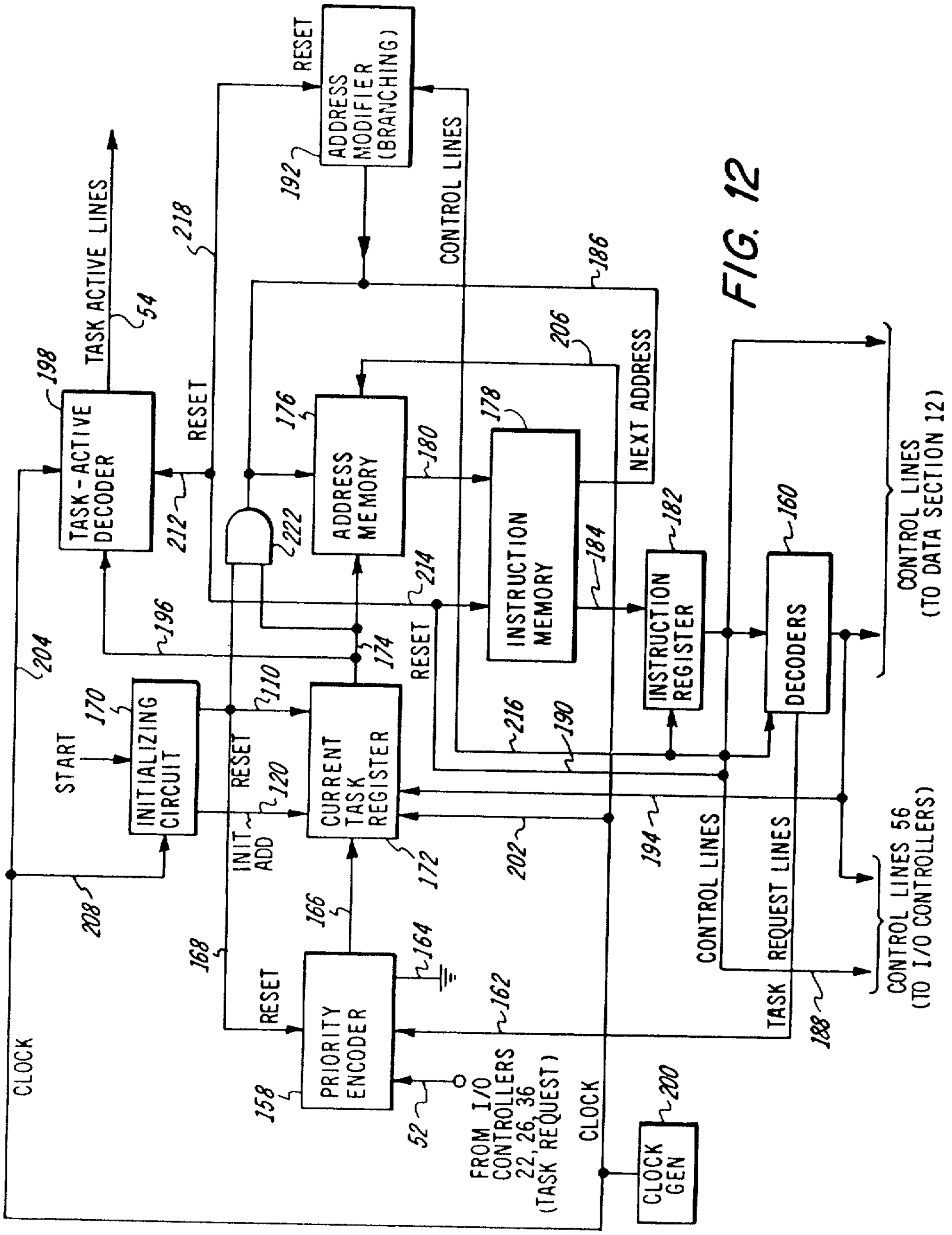
FIG. 12 is a block diagram representation of the control section of the CPU shown in FIG. 2.

Referring now in more detail to FIG. 12, the control section 14 of the CPU 10 includes a priority encoder 158 which has task request inputs connected to the various task request lines 52 from the I/O controllers 22, 26 and 36, as well as to various output lines 162 from the decoders 160 for receipt of the internally generated task request signals alluded to above, e.g., MRT. The task request signal MPT, which requests servicing the main program, is manifest by the grounded line 164 and is always true (low). Thus, the main program is always requesting service. The priorty encoder 158 includes circuitry (not shown) for generating a multi-bit control signal on a respective plurality of lines 166 related to the highest priority wakeup-task request signal currently applied as an input to the encoder 158. The priority encoder 158 includes a further input for receiving a RESET signal on a line 168 from an initialize circuit 170 to be described in more detail below.

Now then, the control signal developed on lines 166 is applied to respective inputs of a current task register 172 which responds to such control signal for generating a multibit address signal that is applied in bit-parallel format on a respective plurality of lines from the register 172 to respective inputs of an address memory 176. The address memory 176 includes a plurality of storage locations, preferably defined by a respective plurality of multi-bit registers (not shown). There are preferably a number of registers included in the address memory 176 equal to and respectively associated with the plurality of tasks capable of being performed by the CPU 10, as alluded to above. Each register in the address memory 176 is addressed by a unique multi-bit code defined by the address signal applied thereto from the current-task register 172 on lines 174.

In accordance with the preferred embodiment, each of the registers in address memory 176 is capable of storing the next address of an executable microinstruction stored in a microinstruction memory 78. In this respect, each of the plurality of address memory registers may be thought of as a program counter for its respective task to be serviced relative to the corresponding microinstruction routine stored in the instruction memory 178.

Each instruction stored in the memory 178 is accessed in response to a corresponding address signal applied on address lines 180 from the address memory 178. Each instruction includes an instruction field preferably comprised of twenty-two bits, and a next-address field preferably comprised of ten bits. The specific constitution of the 22-bit instruction field, if desired, may be obtained through a review of Appendix A to and forming part of this specification. The instruction field is loaded into an instruction register 182 on lines 184 and is then applied through appropriate decoders 160 (also described in more detail in Appendix A) to the data section 12 of the CPU 10. Certain of these decoded instructions are also forwarded to the I/O controllers 22, 26 and 36. The next-address field is fed back on lines 186 to the currently addressed register in the address memory 176. In this manner, each of the plurality of registers in the memory 176 will always contain the address of the next microinstruction stored in the instruction memory 178 to be executed in accordance with the particular task to be serviced.

A portion of the twenty-two bit instruction field of each microinstruction may be dedicated to various special functions, some of which are applied on control lines 188 to respective ones of the I/O controllers 22, 26 and 36 for controlling same, and some of which are applied on control lines 190 to address modifier circuits 192 for branching. In accordance with the preferred embodiment, there is a four-bit special function "subfield" in the instruction field of each microinstruction, wherein two of the sixteen four-bit codes capable of being defined are respectively representative of "TASK" and "BLOCK" functions. A TASK signal component of an accessed instruction, upon being decoded by an appropriate one of the decoders 160, is applied on a line 194 to the current task register register 172 for enabling the register to load an address signal, representing the current highest priority task requesting service. This address signal is then applied to the address memory 176. A decoded BLOCK signal is applied on another line 194 to the current task register 172 for disabling same.

The multi-bit address signal developed at the output of the current task register 172, in addition to being applied to the address memory 176 on lines 174, is also applied on lines 196 to a task-active decoder 198. The decoder 198 responds to the address signal output of the register 172 and generates one of the plurality of TASK-ACTIVE signals alluded to earlier on its respective line 54, dependent upon the current highest priority task to be serviced. The decoder 198 includes a delay circuit for delaying the application of a TASK-ACTIVE signal to the respective I/O controller by one clock cycle of the processor. In this manner, the appropriate TASK-ACTIVE signal will be generated at a time corresponding to the execution of instructions related to the task being serviced.

The control section 14 as shown in FIG. 12 also includes a clock generator 200 for generating appropriate CLOCK signals for application to the current-task register 172 on a line 202, the task-active decoder 198 on a line 204, the address memory 176 on a line 206, and the initialization circuit 170 on a line 208.

Still referring to FIG. 12, the initialization circuit 170 is responsive to a START signal generated when the system is turned on by the operator. Upon receipt of the START signal, conventional circuitry in the circuit 170 causes a RESET signal to be generated which is applied to the priority encoder 158 on line 168, to the current task register 172 on a line 210, to the task-active decoder 198 on a line 212, to the instruction memory 178 on a line 214, to the instruction register 182 and decoders 160 on a line 216, and to the address modifier 192 on a line 218. Upon receipt of a RESET signal, these various components of the control section 14 are reset.

The initialization circuit 170, in response to a START signal, also generates a multi-bit initialization address signal on a respective plurality of lines 220. In a preferred embodiment of the invention, their are sixteen possible tasks and associated registers in address memory 76. Thus, the initialization address signal is a four-bit signal that is initially zero, i.e., 0000, and is incremented by one at the rate of the CLOCK signal pulses applied on line 208. The RESET signal is maintained for sixteen cycles, i.e., sixteen CLOCK signal pulses, at which time the initialization address on lines 220 will increment from zero (0000) to fifteen (1111). The address signal output of the current task register 172 during initialization is identical to the initialization address signal. During initialization, the address signal output of the current task register 172 is applied through an AND-gate 222, which is enabled by a RESET signal from the initialization circuit 170, to the address memory 176. In this manner, the address signal (0000) will be loaded into register number zero in the address memory 176, the address signal one (0001) into register number one, and so on. This process initializes the address memory by setting the various registers therein at their respective starting values.

Further details of the preferred CPU control section 14, if desired, may be obtained through a review of of the manual entitled "ALTO: A Personal Computer System Hardware Manual", January, 1979 available from Xerox Corporation, 3333 Coyote Hill Road, Palo Alto, CA 94304 as well as U.S. Pat. No. 4,103,330.

Figure 13:
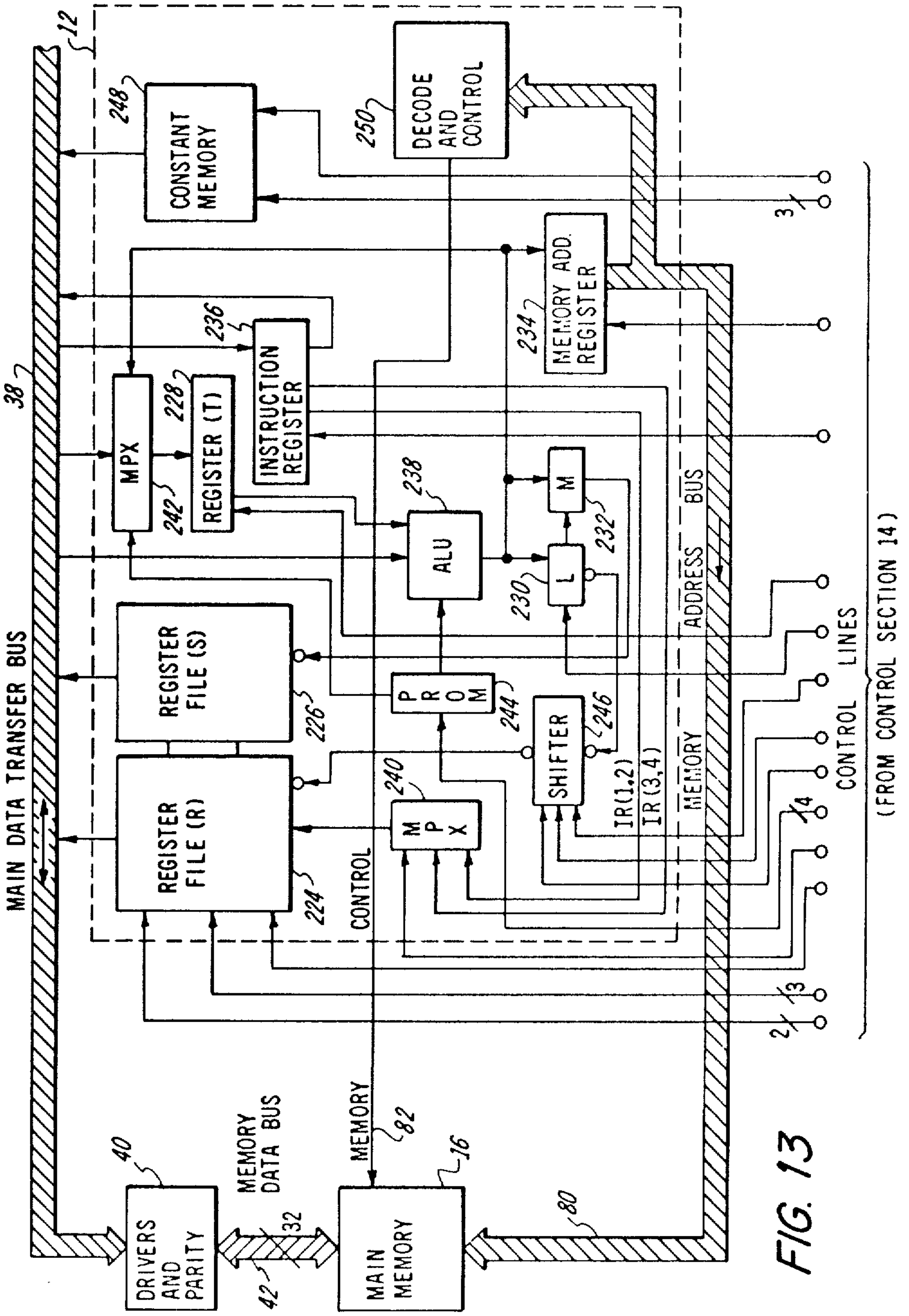
FIG. 13 is a block diagram representation of the data section of the CPU shown in FIG. 2.

Referring now to FIG. 13, the data section 12 of the CPU 10 preferably includes a number of 16-bit registers, such as a pair of 32 word register files (R register file 224 and S register file 226) and a number of single word registers (T register 228, L register 230, M register 232, memory address register (MAR) 234 and instruction register (IR) 236). The data section 12 also includes an arithmetic logic unit (ALU) 238, a pair of multiplexers 240 and 242, a PROM 244, a shifter 246, a constant memory 248 and a main memory decode and control circuit 250.

As shown in FIG. 13, the multiplexer 242 has a first data input connected to the data bus 38 for receiving data therefrom and a second data input connected to the output of the ALU 238. A control input of the multiplexer 242 is connected to an output of the PROM 244 for controlling the multiplexer in terms of which data input is to be applied at its output. The output of the multiplexer 242 is connected to the T register 228. Load control of the T register is accomplished by a control signal from the control section 14, while the output of the T register 228 is connected to the ALU 238. The ALU 238 is restricted by an output of the PROM 244 into 16 possible arithmetic and logic functions. The PROM 244 is controlled by 4 control lines from the control section 14 of the CPU 10. The output of the ALU 238 is connected to inputs of the L register 230, M register 232 and MAR 234, as well as to the multiplexer 242, as indicated above.

A load control output of the L register 230 is connected to a second input of the M register 232 for controlling the loading of data therein, whereas a second inverted output of the L register 230 is connected to an inverted input of the shifter 246, which is capable of left and right shifts by one place and cycles of eight. Load control of the L register 230 is effected by a load control signal applied from the control section 14. The output of the shifter 246 is connected to an inverted data input of the R register file 224, whereas the output of the M register 232 is connected to an inverted data input of the S register file 226. The outputs of both register files 224 and 226 are connected to the data bus 38. The various functions of the shifter 246 are controlled by control signals from the control section 14. The register files 224 and 226 also receive control signals from the output of the multiplexer 240 and are addressed by address control signals from the control section 14. The multiplexer 240 itself receives various input control signals from the control section 14.

The MAR 234 has its output connected to the memory address bus 80 for applying a 16-bit address signal to the main memory 16. Additionally, this 16-bit address is applied to the decode and control circuit 250 which applies control signals to the main memory 16 on lines 82. These control signals are associated with the manner in which the 16-bit values stored in main memory are transferred over the 32-bit memory data bus 42 to the drivers and parity circuit 40.

The instruction register 236 is used by an emulator microcode routline to hold the current emulated microinstruction. The input of IR 236 is thus connected to the data bus 38, as is a 16-bit output. Additionally, various output bits (1–4) of the 16-bit output are connected on output lines to the multiplexer 240. Lastly, the constant memory 248 is preferably a 256 word by 16-bit PROM that holds arbitrary constants. The constant memory output is connected to the data bus 38 and is addressed by control signals from the control section 14, as shown.

Further details of the preferred data section 12, if desired, may be obtained through a review of of the manual entitled "ALTO: A Personal Computer System Hardward Manual", January, 1979 available from Xerox Corporation, 3333 Coyote Hill Road, Palo Alto, CA 94304, and details of an earlier alternative embodiment may be obtained through a review of U.S. Pat. Nos. 4,103,331 and 4,148,098.

Figure 3:
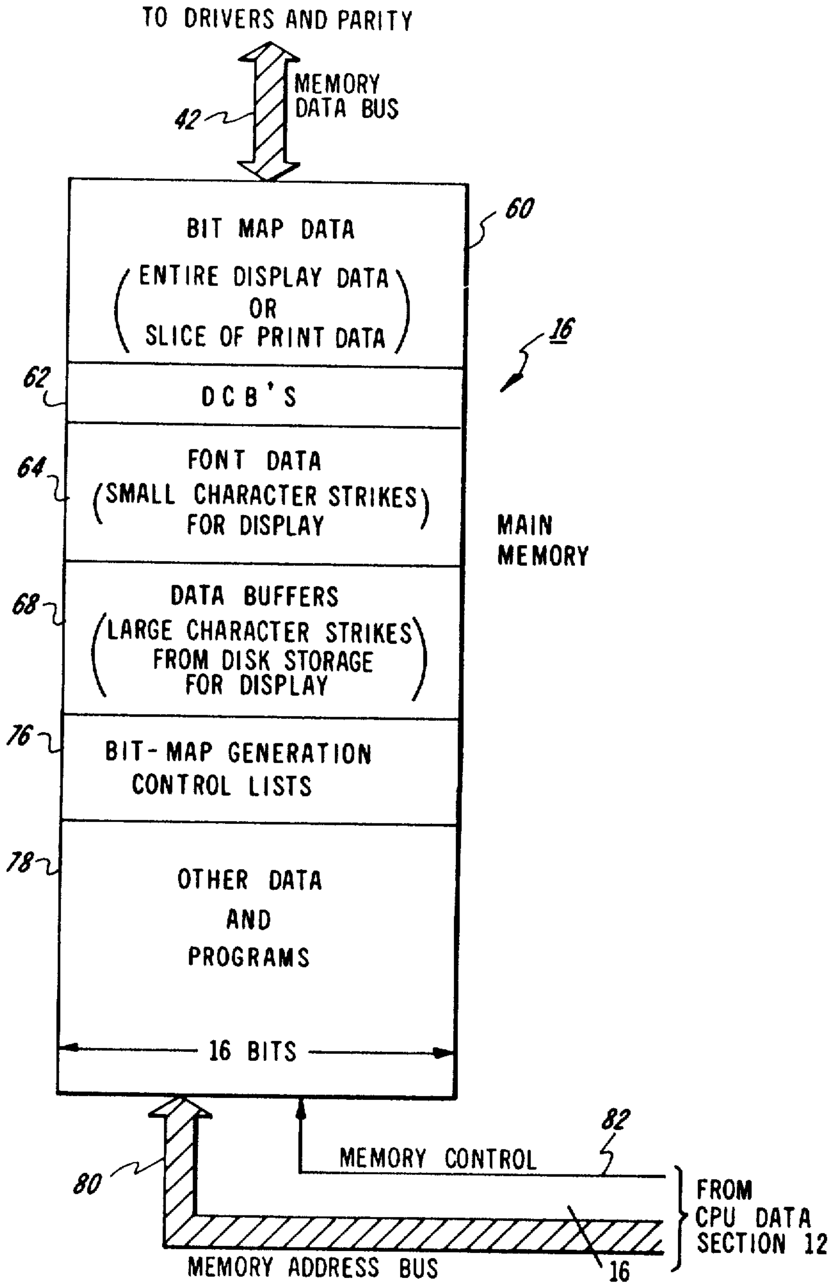
FIG. 3 is a representation of various storage areas in the main memory depicted in FIG. 2.

Reference is now had to FIG. 3 where the main memory 16 will be described in more detail. At the outset, it should be noted that memory 16 is preferably an 850 μs error corrected semiconductor memory capable of storing 65,536 16-bit words. A first section 60 of the memory 16 is capable of defining and storing a bit map representation of an image to be displayed on the display device 24, or a "slice" or segment of an image or page to be printed on the ROS printer 30. This slice may be either lengthwise or widthwise in orientation, but is desirably widthwise. In accordance with the preferred embodiment, the resolution capabilities of the printer 30-are significantly greater than that of the display device 24. Accordingly, it is not possible to create an entire bit map for a page to be printed in the bit map data section 60. Consequently, the bit map for a page to be printed is created on a disk in the disk drive 20 and then transferred in widthwise slices, each a predetermined number of bits in length. The slices are transferred to the memory 16 and then to the ROS printer controller 32 one slice at a time, as will be discussed in more detail below.

A second section 62 of the main memory 16 is adapted to store "display control blocks" and "disk command blocks", both referred to generically as "DCB's". The purpose of DCB's will be described below in connection with a description of the display controller 26 and the disk drive controller 22.

A third section 64 of the main memory 16 is adapted to store character font data for a first set of characters, i.e., "small" characters for display. These small display characters preferably comprise Romaji (English alphanumerics), Katakana and Hiragana character sub-sets, wherein each character is desirably defined by a 7×7 bit map matrix. Additionally, due to this relative small scale and the degree of complexity of the Kanji character sub-set, a single "dummy" Kanji character comprised of a predetermined 7×7 bit map matrix pattern is included in the small display character set (see character numbered 65 in FIG. 6). Desirably, only small display characters are displayed in a first page display area 66 on the display device which is used for page formatting purposes and the like. This concept will be discussed in more detail below relative to FIG. 6.

Figure 9:
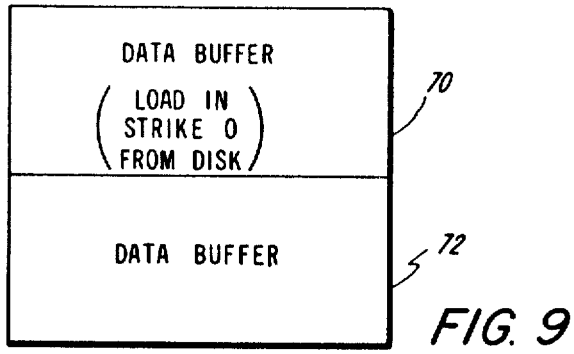
FIGS. 9–11 depict the sequence of operations during which large character strikes for display are loaded from the disk into data buffers defined in the main memory of FIGS. 2 and 3, and then from the data buffers into the bit map data portion of the main memory.
Figure 10:
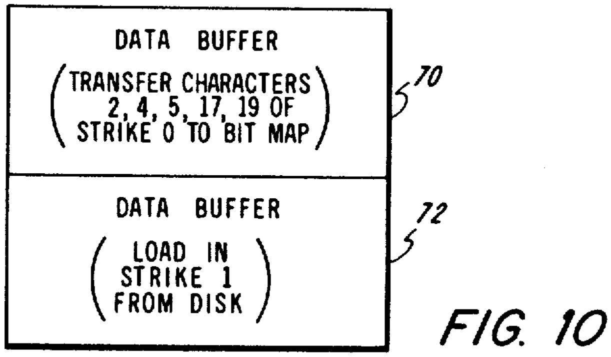
Figure 11:
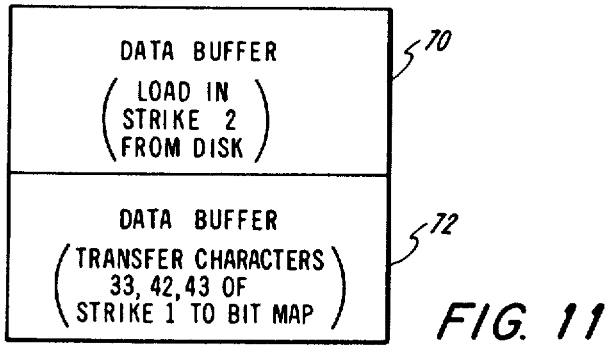

A fourth storage section 68 of the main memory 16 defines a pair of data buffers 70 and 72 (FIGS. 9-11). The purpose of these data buffers is to receive "strikes" of large display characters from the disk drive controller 22 and forward selected ones of the characters in each strike to the bit map data section 60. The specific manner in which data buffers 70 and 72 are controlled will be described below. At this point, however, it should be noted that the large display character set includes Romaji, Katakana, Hiragana and full Kanji character sub-sets. Each character is defined by an 18 bit wide by 20 bit high font data bit map matrix. Further, each character strike is comprised of 512, 16-bit words, and thus 22 characters. Desirably, only large display characters are displayed in a second text display area 74 (FIG. 6), which defines a magnified portion of the full page being created and is used for editting and viewing purposes. Again, this concept will be discussed in more detail relative to FIG. 6.

A fifth section 76 of the main memory 16 defines a pair of bit map generation control lists, one for display and one for printing. An exemplary display bit map generation control list is depicted in FIG. 8. Generally speaking, the bit map generation control list for display comprises a list of all large display characters to be displayed. Each such character is listed by a 12-bit character code which defines the character and its set (large display) and sub-set (Hiragana, Katakana, etc.), as well as its style (bold, italics, etc.). In addition, for each character in the list, the x, y coordinate values at which such character is to be located in the display bit map are given. Preferably, the x, y coordinate values define the upper left hand corner of the 18-bit wide by 20-bit high bit map matrix defining each large display character. The concept will be discussed in more detail below with reference to FIGS. 7 and 8. At this time, however, it should be noted that the information contained in the display list is used to access the character font data for the large display characters from the disk memory included in the disk drive 20. This data is then loaded into the data buffers 70 and 72 for ultimate storage in the appropriate locations in the bit map data section 60, then used for display.

The other bit map generation control list defined in section 76 of the main memory 16 is for printing. The list is basically the same, except it lists print characters that are to be included in the particular slice of print bit map data then being created, it being recalled that the complete bit map for printing is located on the disk memory and is formed a slice at a time. As will be discussed below, print characters are preferably each defined by a character font data bit map 32 bits high by 32 bits wide. The print character font data is stored on the disk memory and preferably contains the full set of Romaji, Hiragana, Katakana and Kanji characters. As each slice of print bit map data is formed in the bit map data section 60, then used for printing, it is transferred into disk memory. Then, a new print bit map generation control list is created to define the next adjacent slice of print bit map. When the complete print map has been defined and stored on the disk memory, it is re-transferred a slice at a time to the bit map data section 60 and from there to the ROS printer controller 32 for serial output to the ROS printer 30. During printing, the display device 24 must be blanked, since only a single bit map data section 60 is utilized and in order to increase memory speed. Obviously, if additional main memory storage space were provided, separate display and print bit maps storage sections might be defined.

A sixth and last section 78 of the main memory 16 is allocated for the storage of other data and programs. Specifically, the program routines associated with the data processing system of this invention are loaded into section 78 from the disk drive 20 for ultimate execution by the CPU 10.

As shown in FIGS. 2 and 3, the main memory 16 is addressed by a 16-bit address signal supplied on the address bus 80 from the data section 12 of the CPU 10. Additionally, appropriate memory control signals are applied on lines 82 from the data section 12 to the main memory. These control signals determine the manner in which two, 16-bit words are placed on the 32-bit memory data bus for application to the driver and parity circuit 40 during a read operation, and the manner in which the 32-bit composite word applied to the memory data bus 42 from the circuit 40 is segregated for storage in the main memory 16 during a write operation. The address signal on the bus 80 controls the location at which each 16-bit word is to be stored or retrieved. Further details of a preferred main memory 16 are disclosed in of of the manual entitled "ALTO: A Personal Computer System Hardware Manual", January, 1979 available from Xerox Corporation, 3333 Coyote Hill Road, Palo Alto, CA 94304, as well as in U.S. Pat. Nos. 4,103,331 and 4,148,098.

Having described the various storage sections of the main memory 16, reference is now had to FIG. 4 where the disk memory 84 will be described. In accordance with the presently preferred embodiment, the disk drive 20 may comprise either a Diablo Model 31 or Model 44 disk drive. Each drive can accommodate a removable disk cartridge (not shown) containing the disk memory 84 therein. As is conventional, the disk drive 20 includes means for reading and writing data from opposing surfaces of the disk memory 84. There are preferably 12 sectors and up to 406 tracks on each surface of the disk memory.

Figure 4:
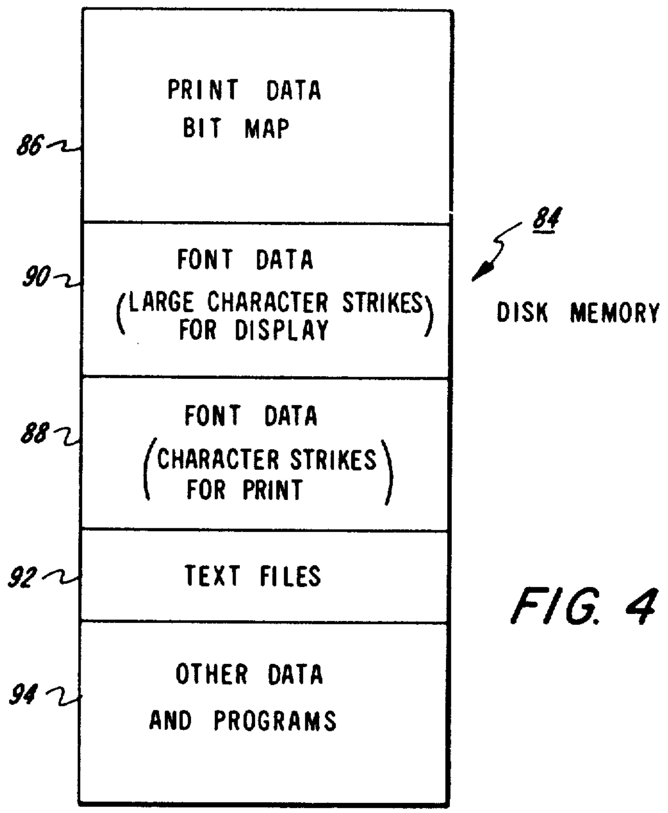
FIG. 4 is a representation of various storage areas on the surfaces of a magnetic recording disk included in the disk drive depicted in FIG. 2.

Purely for ease of discussion, the disk memory 84 is shown in FIG. 4 in the same format as the main memory 16 of FIG. 3. However, it will be appreciated that, unlike the main memory 16 wherein 16-bit words are accessed in parallel, 16-bit words are accessed from the disk memory 84 serial by bit. Thus, in defining the five basic sections of the disk memory 84, it will be appreciated that the data content of such sections is stored in series on identifiable sections of identifiable tracks on the two storage surfaces of the disk.

As shown in FIG. 4, a first storage section 86 of the disk memory 84 is adapted to store a complete bit map of a page of text to be printed by the ROS printer 30, such page being comprised of the print characters above-defined, i.e., each print character being defined by a 32 bit×32 bit character font matrix. As will be recalled, the character font data describing the bit map matrix for each print character is defined in a second, font data storage section 88 of the disk memory 84 and includes characters of the Romaji, Hiragana, Katakana and Kanji sub-sets. The print bit map is created a slice at a time in the bit map data section 60 of the main memory 16 and is then transferred to the print bit map section 86 of the disk memory for eventual application to the ROS printer controller 32 through the main memory bit map data section 60 and the main data transfer bus 38.

The print character data is stored in the font data storage section 88 as "strikes" of 512, 16-bit words. There are thus 8 print characters in each strike, due to the 32×32 bit map matrix. Desirably, six strikes are stored on each track, each strike occupying 2 adjacent sectors. To facilitate access of the data, the print character data is stored in a predetermined ordered storage sequence (e.g. A, B, C, D - - - ) and each strike is numbered. Then, and in accordance with the preferred embodiment, strikes 0–5 are stored on one track on one side of the disk, strikes 6–11 on the aligned track on the other side of the disk, strikes 12–17 on an adjacent track on the first side of the disk, and so on.

A third storage section 90 of the disk memory 84 is adapted to store the 18 bit wide×20 bit high bit map matrix defining each of the large display characters. Again, this large display character font data is stored by strikes of 512 words each, i.e., there are 22 characters per strike. The manner in which the strikes are stored on the disk surfaces is preferably the same as that for the print character strikes. As will be recalled, the large display character set preferably includes the complete Romaji, Hiragana, Katakana and Kanji character subsets.

Still referring to FIG. 4, a fourth storage section 92 of the disk memory 84 is adapted to store various "text files". These files contain data representative of each document created. Each document is comprised of a predetermined number of pages and is identified in the text file by a predetermined code. Each page of the document is identified in the text file by number. The information content of the page is identified in the text file by a character identification list. Each character on each page (and not just a particular set of characters, such as large display characters) is identified in the list by its 12 bit identification code. Further, the list contains data as to the relative positions of the characters on the page. The list for each page in the text file can be read and interpreted by the CPU 10 in order to generate either the display bit map generation control list (FIG. 8) or the print bit map generation control list, dependent upon whether the data is to be displayed or printed. It will be recalled that both of such control lists are defined in the main memory storage section 76 (FIG. 3).

A fifth and last storage section 94 of the disk memory 84 contains other data and programs, such as the main program for carrying out the data processing operations of the system of FIGS. 1 and 2. As will be recalled, this program is loaded into the storage section 78 of the main memory 16 when it is desired to have the CPU 10 execute same.

Figure 5:
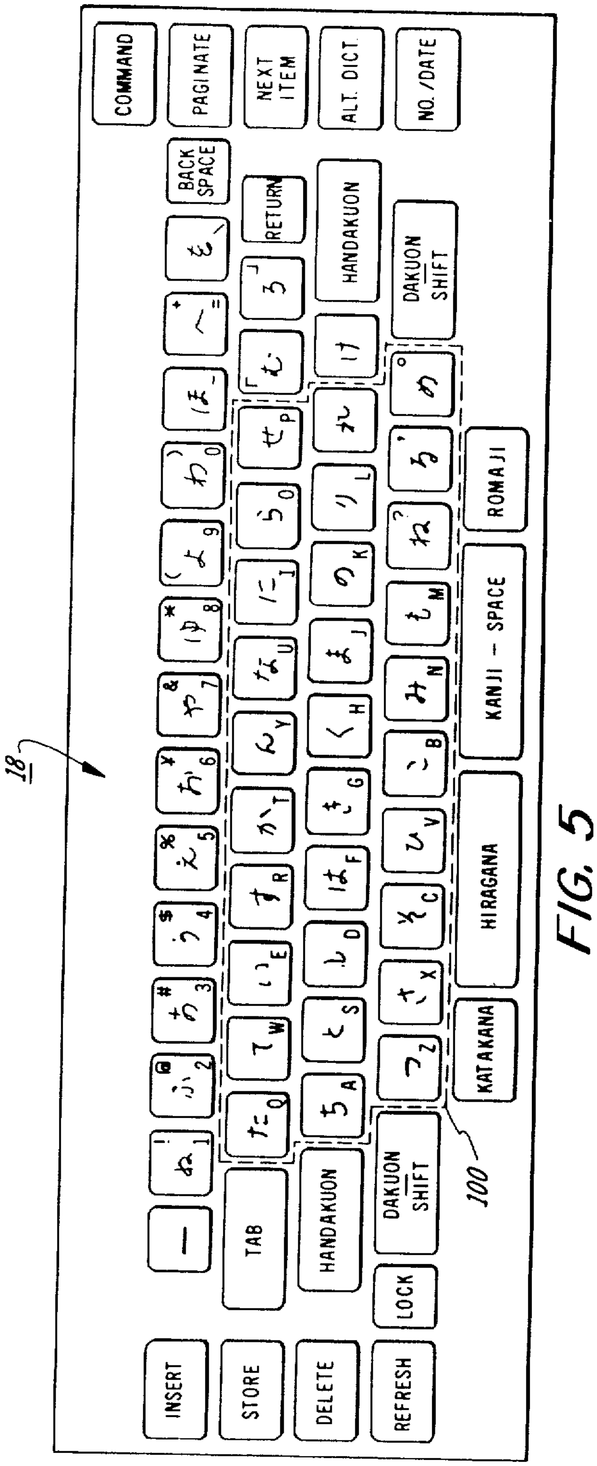
FIG. 5 is a top plan view of the array of keys included in the keyboard depicted in FIG. 2.

Referring now to FIG. 5, the keyboard 18 will be described in more detail. As will be recalled, the keyboard 18 is preferably unencoded in the sense that 63 of the 68 keys shown in FIG. 5 are each capable of generating a signal on a corresponding one of 63 output lines when depressed. The remaining 5 keys are each capable of generating a signal on a 64th output line, as well as an associated one of the original 63 keys. Thus, 68 output states can be defined on a 64 bit output. Now then, the 64 bit output from the keyboard is applied directly into preassigned storage locations in the storage section 78 of the main memory 16 (FIG. 3) through the data bus 38. The 64 bit output is actually applied as four, 16-bit words and are preferably stored in four adjacent storage locations. The 64 bit output values are then sampled periodically by the CPU 10 under program control. More specifically, the key depressed at any instant of time causes its corresponding output line or lines to go true (binary 0). All other output lines will be false (binary 1). The CPU 10 detects this under program control during each sample period and encodes the true signal(s) into a 12-bit code representative of the specific keys depressed.

As shown in FIG. 5, the keyboard 18 contains a group of character keys containing the standard English (Romaji) alphanumeric character set thereon, as well as characters of the Hiragana character set. Four additional character keys contain just Hiragana characters, as such character set includes 48 characters and the standard Romaji character set includes only 44 characters. Aside from the character keys, there are various function and command keys as follows:

| KEY | FUNCTION |
|---|---|
| STORE | Allows text that has been created to be stored in disk memory. |
| INSERT | Allows the text that has been stored in disk memory 84 following a STORE command to be inserted into the page of text being created. |
| DELETE | Allows data to be deleted from the text. |
| REFRESH | This key regenerates the page image display. |
| TAB | Permits normal typewriter tab function. |
| HANDAKUON | These keys are used in conjunction with the Katakana keys for Handakuon sounds and small symbols. |
| SHIFT/DAKUON | This is a dual function key. A first function during a Romaji typing mode is to allow capitalized characters to be included in the text by "shifting". A second function during a Katakana typing mode is to produce Dakuon reading. |
| KATAKANA | When this key is depressed, all 44 Hiragana/Romaji character keys and the 4 Hiragana only character keys thereafter depressed will be encoded as the corresponding 48 Katakana |

-continued

| KEY | FUNCTION |
|---|---|
| | characters by the CPU 10. |
| HIRAGANA | When this key is depressed, or in default of the KATAKANA, KANJI or ROMAJI keys being depressed, all Hiragana/Romaji character keys and Hiragana only character keys thereafter depressed will be encoded as Hiragana characters. |
| KANJI/SPACE | This is a dual function key. A first function is to allow ordinary typewriter spacing. In a second mode, this key may be depressed following selection of one or more Hiragana characters defining the desired phonetic sound(s) for one or more Kanji characters. Upon depressing of the KANJI key, groups of up to 30 KANJI characters having the same sound as the originally selected Hiragana character(s) will be displayed in a key top display area 96 on the display device 24 (see FIG. 6). The specific manner by which the desired one of the displayed Kanji characters may then be selected for substitution in the text in place of the originally selected Hiragana character(s) will be described in more detail below with reference to FIG. 6. |
| ROMAJI | When this key is depressed, all Hiragana/Romaji character keys thereafter depressed will be encoded as Romaji characters by the CPU 10. |
| RETURN | When this key is depressed, the typing location will advance to the left margin of the next line. |
| BACKSPACE | Depressing this key will cause a backspace operation. |
| COMMAND | This key causes additional commands to be displayed in the key top display area 96. The commands can then be invoked by typing the corresponding keyboard key. An example of one such additional command is the print command alluded to earlier. |
| NEXT ITEM | This key causes the text to advance to the next field on the page. |
| PAGINATE | This key causes the system to paginate the entire document. |
| ALTERNATE DICTIONARY | This key is similar to the KANJI key, but instead uses an alternate dictionary that contains names and special terminology. |
| NUMBER/DATE | This key causes certain predetermined number and date information, such as days of the week, to be displayed in the key top display area 96 (FIG. 6). |

Referring again to FIG. 2, the display device 24 and display controller 26 will be described in more detail. The display device is preferably a standard CRT display, such as a standard 875 line raster-scanned TV monitor, refreshed at 60 fields per second from the display bit map defined in the storage section 60 of the main memory 16. The display device 24 preferably contains 606 display points (pixels) horizontally and 808 pixels vertically, i.e., 489,648 pixels in total.

The display controller 26 handles transfers of image data between the bit map storage section 60 of the main memory 16 and the display device 24. The basic manner in which image data is presented on the display is by fetching a series of 16-bit words from the display bit map in main memory storage section 60, and then serially extracting the bits to become the video signal. The serial video bits are applied along the bus 46 to the display device 24. Each scan line is comprised of 38, 16-bit words of the display bit map. The actual display is defined by one or more display control blocks (DCB's) in the storage section 62 of the main memory 16. Basically, each DCB contains data which defines the resolution, margin and positive-negative characteristics of the display. In addition, if more than one DCB is used for data to be displayed, they are linked together starting at a predetermined location in main memory 16, such location being in section 78 of the main memory and representing a pointer to the first DCB in the chain. Then, each succeeding DCB contains a pointer to the next DCB in the chain. Each DCB also contains the bit map starting address for two scan lines in each field (odd and even). Further details of DCB's as applicable to the display controller 26, if desired, may be obtained through a review of of the manual entitled "ALTO: A Personal Computer System Hardware Manual", January, 1979 available from Xerox Corporation, 3333 Coyote Hill Road, Palo Alto, CA 94304, as well as U.S. Pat. No. 4,103,331.

Figure 14:
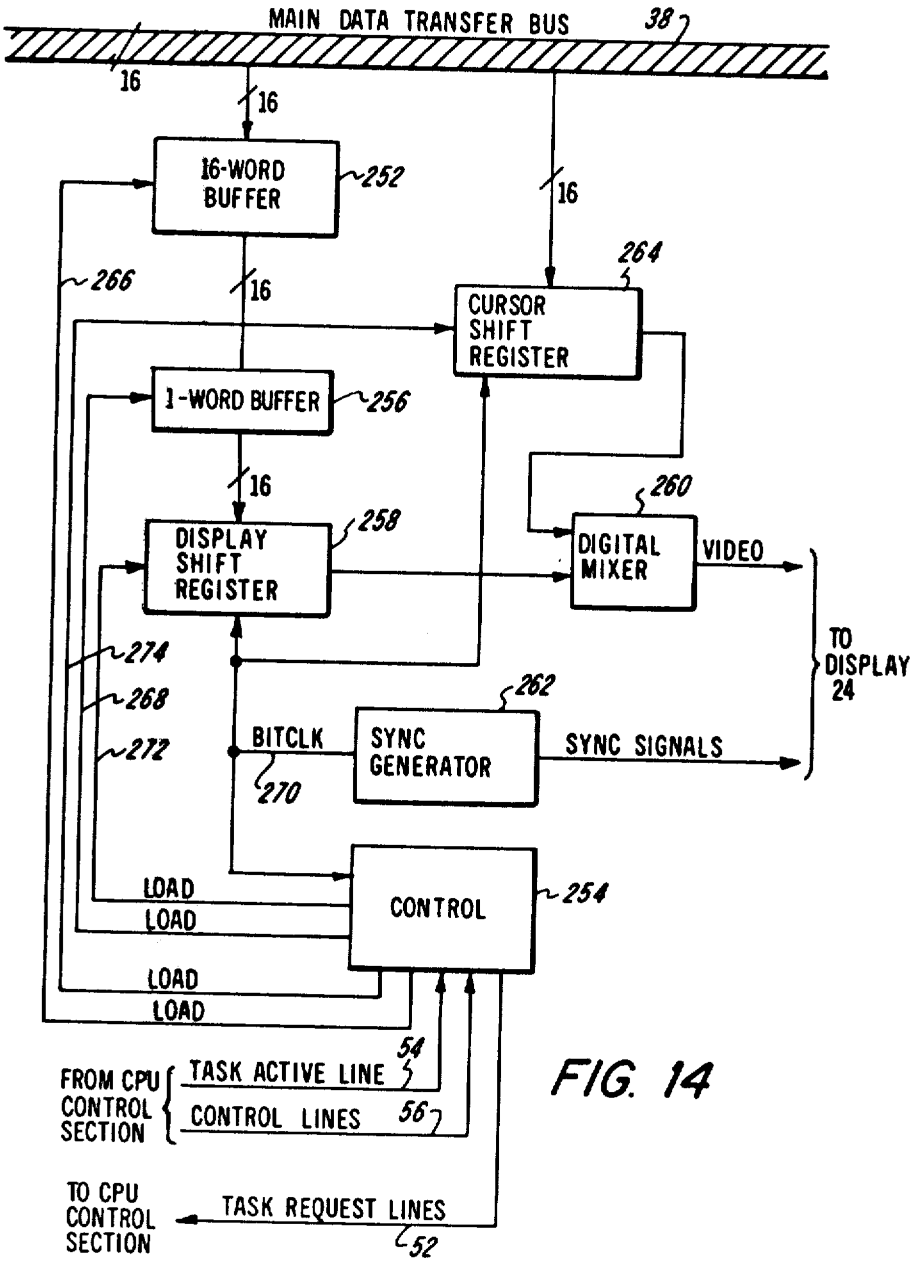
FIG. 14 is a block diagram representation of the display controller shown in FIG. 2.

As shown in FIG. 14, the display controller 26 includes a 16 word buffer 252 for receiving image data from the bit map data section 60 of the main memory 16 as applied along the data bus 38. In this respect, the 16 bit parallel input of the buffer 252 is connected to the bus 38. The buffer 252 is loaded with 16 words of image data, one word at a time, in response to a load command applied on a line 266 from a control circuit 254. The control circuit 252 includes means for interpreting and decoding various control signals applied to an input thereof from the CPU control section 14 along lines 56 (see also FIG. 2). The data stored in the buffer 252 is unloaded one word at a time into a single word buffer 256 connected to the output lines of the buffer 252. The buffer 256 is also loaded upon receipt of a load command on a line 258 from the control circuit 254.

The output lines of the buffer 256 are connected to a serializing shift register 258 which serializes the data and supplies it to a digital mixer 260. The register 258 is clocked by a BITCLK signal generated by a sync generator 262 and supplied on a line 270. The sync generator 262 also supplies appropriate video sync signals to the display device 24 along associated lines of the bus 46 (FIG. 2). The BITCLK signal is also applied on lines 270 to clock inputs of the control circuit 254 and a cursor shift register 264 to be described below. The shift register 258 is loaded with a 16 bit word from the output of the buffer 256 upon receipt of a load command on a line 272 from the control circuit 254. The control circuit 254 also is capable of generating a load command on a line 274 for the cursor shift register 264 in order to load therein a 16-bit word of cursor data.

The control circuit further includes means for generating the three primary microcode task request signals identified earlier, i.e., DVT (display vertical task), DHT (display horizontal task) and DWT (display word task). The vertical task is "awakened" once per field, at the beginning of a vertical retrace. The horizontal task is awakened once at the beginning of each field, and thereafter whenever the word task (DWT) is blocked (essentially at the end of each horizontal scan line). The word task is controlled by the state of the buffer 252, i.e., whether it needs to receive more image data. In addition to these three task-request signals, the control circuit 254 is also capable of generating the cursor task-request signal (CURT) each horizontal line. The cursor task enables the CPU 10 to process x and y coordinate data supplied thereto on the data bus 38 from the cursor unit controller 29.

Still referring to FIG. 14, the cursor shift register 264 has its 16 parallel inputs connected to the data bus 38 for receiving a 16-bit word of cursor data from the main memory storage section 78, where 16, 16-bit words defining a "patch" of cursor data is stored, as will be discussed in more detail below. The cursor shift register 264 is loaded upon receipt of a load command on line 274 from the control circuit 254 and is clocked by the BITCLK signal on line 270 from the sync generator 262. The serialized cursor data bits are supplied from an output of the register 264 to another input of the digital mixer 260, which then merges the cursor data with the image data from the bit map data section 60. The video bits at the output of the mixer are applied along an associated line of the bus 46 to the display device 24 where they are raster scanned onto the display screen.

Further details of a presently preferred display controller 26, if desired, may be found in of the manual entitled "ALTO: A Personal Computer System Hardware Manual", January, 1979 available from Xerox Corporation, 3333 Coyote Hill Road, Palo Alto, CA 94304, as well as in U.S. Pat. No. 4,103,331.

Referring now to FIG. 6, the various display areas on the display device 24 and the manner in which they are generated will be described. As a general statement, it should be noted that the display screen is capable of displaying data in a scaling of a standard paper size format, such as "A4" size. The totality of display pixels, i.e., 489,648, have corresponding bit locations in the bit map data section 60 of the main memory 16, where the data to be displayed is mapped. With this in mind, the CPU 10 is programmed to cause the effective segregation of the total display into the key top display area 96, a message display area 98, the page display area 66 and the text display area 74.

The keytop display area 96 is located in the upper fourth of the display screen. It normally contains a representation of 30 blank key tops arranged in 3 rows of 10, each row separated into left and right halves of five keys each. These keys form a "virtual keyboard" that enables the operator to enter many more different kinds of symbols than there are keys on the keyboard 18. Thus, and as alluded to above, depressing of the KANJI mode key following typing of a Hiragana character or characters into the text will cause up to 30 Kanji characters (from the large display character set) having the same sound to be displayed in the key top display area 96. The most common Kanji character bearing the typed phonetic sound will be underlined. Selection of one of the displayed Kanji for substitution in the text is then accomplished by simply depressing that one of the keys among a group of 30 keys (outlined by dotted lines and numbered 100-FIG. 5) corresponding in position to the key position of the Kanji character in the virtual keyboard of the display area 96. The key top area 96 may also be used to display a "menu" of commands, including the print command, which may then be selected in the same manner as with Kanji characters. The commands are preferably constituted of words formed by small display characters.

The message area 98 is preferably a white character on black background display and separates the key top display area 96 from the lower three-fourths of the display screen. The information displayed in the message area 98 includes the name of the document being processed, the page number of the currently displayed page, the amount of unused space for document storage remaining in the disk memory 84, and the current typein mode (e.g., Hiragana). This area is also used to display status and error messages to the operator. The information displayed in the message area 98 is also preferably constituted of words and symbols formed by small display characters.

The page display area 66 represents a full page of text and has fixed dimensioned and located outer borders 67. However, inside the borders 67, the operator is capable of defining at least one "text box", which is simply a rectangular area of dimensions capable of being predetermined by the operator and inside which small display characters defining the text being processed is to be displayed. The operator can set the size of each text box and its position within the borders 67 defining the page, as well as whether or not each box is to have a border margin. For purposes of illustration, a border margin 102 is shown defining a single text box in page display area 66. The operator can also set the "pitch," or space between the small display characters in the text box 102, as well as the "leading," or space between the lines within the text box 102. A text box may also contain fixed text incapable of being edited, such as headings for forms and the like. The margins 102 of the text box are settable by the operator through the use of the cursor unit 28 in a manner to be described in more detail below.

The text display area 74 is essentially a magnified portion of the full page display in the page display area 66, inasmuch as only small display characters are preferably used in the latter area and only large display characters are preferably used in the former area. The operator controls whether or not the text display area is "active", and if so its vertical dimension. When the text display area is active, it overlies and replaces a part of the page display area 66, as shown in FIG. 6. The operator can adjust both the top margin 104 and the bottom margin 106 of the text display area 74 through use of the cursor unit 28 in a manner to be described below. Since the text display area magnifies a portion of the full page in the page display area 66, it cannot display the full page of text, even when it is expanded to be the same physical size as the full page display. The operator thus typically will use the text display area for text editting and viewing, while using the page display area for formatting the text on the page.

Referring to FIGS. 2 and 6, the cursor unit 28 and cursor controller 29 will be described. A cursor 108 is capable of being displayed at any desired location on the display device 24. The cursor 108 consists of an arbitrary 16 bit×16 bit patch (such as to define an arrow), which is merged with the image data defined by the display bit map data at the appropriate time in the digital mixer 260 of the display controller 26 (FIG. 14). The bit map for the cursor is contained in 16, 16-bit words in the storage section 78 of the main memory 16 (FIG. 3). Additionally, the x and y coordinates for the cursor 108 are each defined by a 10-bit word and are stored at separate 16-bit word locations in the storage section 78, i.e., each 10-bit coordinate value is stored as the ten least significant bits of a 16-bit word. The coordinate origin for the cursor is the upper left hand corner of the screen. The cursor presentation is unaffected by changes in display resolution.

Positioning of the cursor 108 is operator controlled through the use of the cursor unit 28, which has often been referred to as a "mouse". The cursor 108 is used in conjunction with three buttons 110, 112 and 114 (FIG.

1) on the mouse 28 to control the typing, editing, command and viewing aspects of the system. Button 110 is used to change the viewing aspects, such as activating the text display area 74 and defining the locations of the top and bottom margins 104 and 106 of such display area.

The mouse 28 includes x, y coordinate generating means in the form of x and y position transducers (not shown). The transducers generate x and y pulse trains in response to movement of the mouse 28 along a work surface. These x and y position signals, as well as the button command signals are applied through the cursor controller 29 to the CPU 10. In this respect, the cursor controller 29 basically serves as a store and forward interface between the mouse 28 and the CPU 10 along the data bus 38. The five output lines of the mouse are included as the five most significant bits of a 16-bit signal applied by the cursor unit controller 29 onto the data bus 38 under microcode control. This 16-bit signal is then interpreted by the CPU 10 in order to execute any button command that may have been issued, as well as to update the 10-bit x coordinate and 10-bit y coordinate values stored at separate memory locations in the storage section 78 of the main memory 16.

Further details of a presently preferred mouse 28, if desired, may be obtained through a review of U.S. Pat. No. 3,892,963, and an alternative mouse is disclosed in U.S. Pat. No. 3,987,685. Further details of a presently preferred cursor unit controller 29, if desired, may be obtained through a review of of the manual entitled "ALTO: A Personal Computer System Hardware Manual", January, 1979 available from Xerox Corporation, 3333 Coyote Hill Road, Palo Alto, CA 94304, which also sets forth further details of the presently preferred display controller 26 as it relates to the mixing of cursor data with the image bit map data for display.

Referring again to FIG. 2, the disk drive controller 22 will be described in more detail. The preferred disk drive controller 22 is designed to accommodate a variety of disk drives, such as the Diablo Models 31 and 44 alluded to above, which are preferred alternatives for the disk drive 20. The disk controller 22 records three independent data blocks in each track sector on the disk memory 84 (FIG. 4). The first data block is two, 16-bit words long and includes the address of the sector. It is referred to as the "Header Block". The second data block is referred to as the "Label Block" and is 8, 16-bit words long. The third data block is referred to as the "Data Block" and is 256, 16-bit words long. Each block may be independently read, written or checked, except that writing, once begun, must continue until the end of the sector.

The main program of the data processing system capable of being run on the CPU 10 communicates with the disk drive controller 22 via a four-word block of main memory 16 located in the storage section 78 thereof. The first word is interpreted as a pointer to a chain of disk command blocks (DCB's) which are stored in the storage section 62 of the main memory 16 (FIG. 4). A disk command block is a ten-word block of main memory in storage section 62 which describes a disk transfer operation to the disk controller 22, and which is also used by the controller to record the status of that operation.

Figure 15:
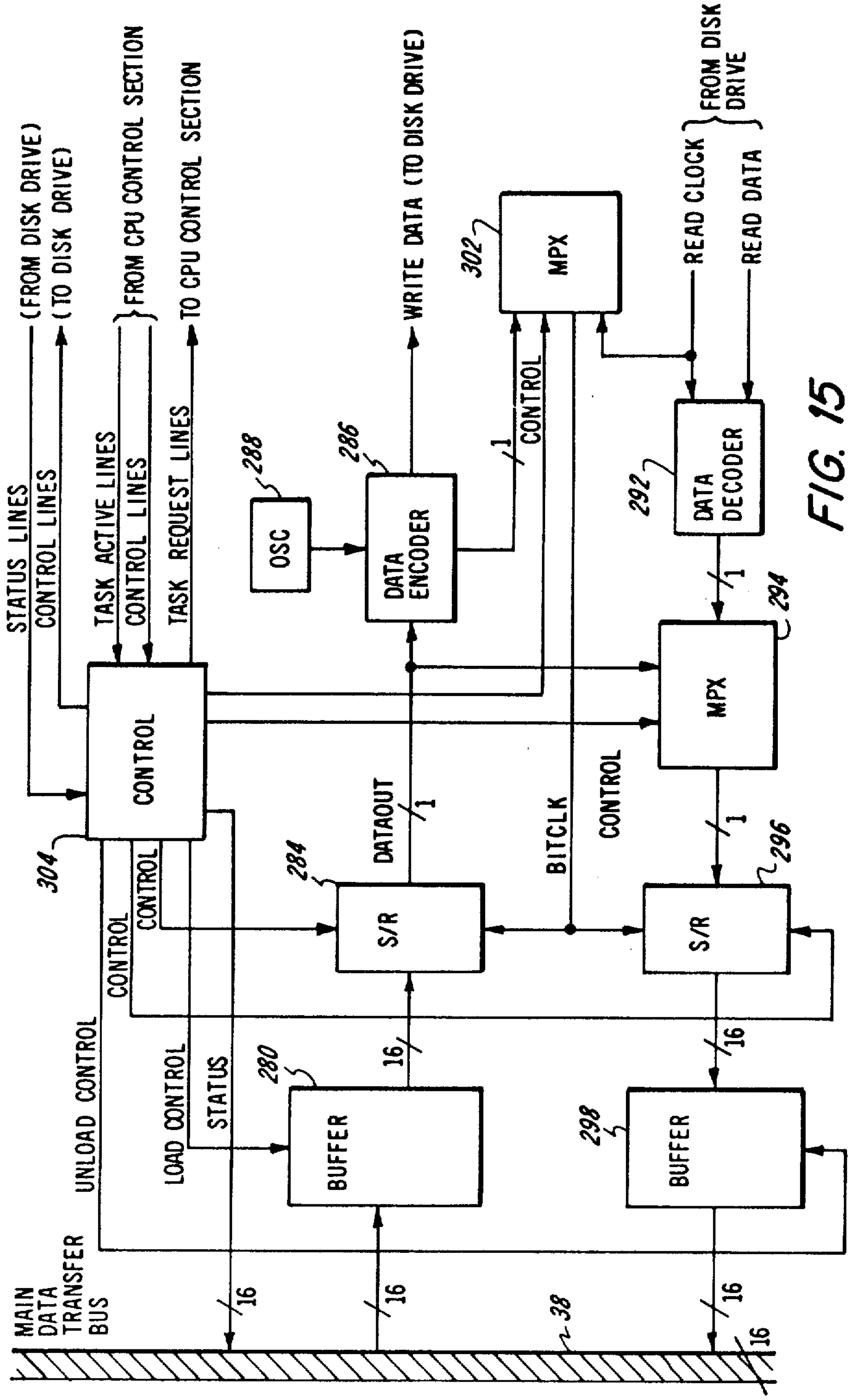
FIG. 15 is a block diagram representation of the disk drive controller shown in FIG. 2.

The preferred disk drive controller 22 is implemented by the circuitry shown in FIG. 15 and the two microcode tasks alluded to above, i.e., the sector task (KSEC) and the word task (KWD). The data paths in the disk drive controller 22 are shown in FIG. 15. More specifically, data is loaded from the data bus 38 into a buffer 280 where it is buffered before being loaded into a shift register 284. The register 284 provides a serial transfer of data indicated by the output signal DATOUT which is phase encoded into the signal WRITE DATA by a data encoder 286. An oscillator 288 clocks the data through the encoder 286 to the disk drive 20, for writing on a disk surface in the disk memory 84.

Data is read from a disk surface and decoded by a data decoder 292, whose output is multiplexed by a multiplexer 294 under control of the DATOUT signal from the shift register 284. The output of the multiplexer 294 is shifted through a shift register 296 under control of the signal BITCLK for loading in a buffer 298. The signal BITCLK is a clock signal developed by a multiplexer 302 which is responsive to a clock signal approximately equal to one half the frequency of the signal generated from the oscillator 288 for the data encoder 286 and to the clock signal READ CLOCK which enables the data decoder 292. Under control of the signal BITCLK, the buffer 298 transfer groups of 16 bits of read data to the bus 38 in parallel.

A control circuit 304 provides load command signals for the various buffers and registers depicted in FIG. 15, as well as to the disk drive 20, in response to microcode signals from the CPU control section 14. Additionally, it relays status signals onto the data bus 38 in response to receipt of status signals from the disk drive 20. It further generates the two task request signals referred to above, and receives associated task active signals back from the CPU control section 14. Further details of a preferred disk drive controller 22, if desired, may be obtained through a review of of the manual entitled "ALTO: A Personal Computer System Hardware Manual", January, 1979 available from Xerox Corporation, 3333 Coyote Hill Road, Palo Alto, CA 94304 and U.S. Pat. No. 4,148,098.

Referring now to the ROS printer 30 and its controller 32 shown in FIG. 2, it should be noted that any suitable raster-output scanned printer 30 capable of receiving the print bit map data in serialized format from the controller 32 and scanning such data across an appropriate recording medium can be employed. An exemplary ROS printer is the Fuji Xerox 1660 printer manufactured by Fuji Xerox, Ltd. of Tokyo, Japan. Additionally, any suitable ROS printer controller 32 capable of receiving print bit map data in 16-bit words from the data bus 38 and then serializing and synchronizing it for transmittal to the printer 30 may be employed. An example of the controller 32 is utilized with the Fuji Xerox 1660 commercial printer available from Fuji Xerox of Japan.

In addition, or as an alternative, to the ROS printer 30 and its controller 32, a ROS printer and associated controller (not shown) may be used at a location remote from the system of FIGS. 1 and 2. An exemplary ROS printer for use at a remote location is a laser scanned xerographic printer, such as a Xerox 7000 duplicator modified to include laser-scanning ROS optics. A description of exemplary optics adapted for use in a xerographic copier/duplicator, such as the Xerox 7000 duplicator, appears in U.S. Pat. No. 3,995,110. A suitable ROS printer controller for controlling such a printer is disclosed in U.S. Pat. No. 4,203,154 in the names of Butler W. Lampson et al for Electronic Image Processing System and assigned to the assignee of the present invention. Print bit map data could be supplied to that system through the communications network 34. Yet another exemplary ROS printer is the Xerox 9700 computer printer manufactured by the Xerox Corporation of El Segundo, Calif., and a controller that may be used with that printer is disclosed in U.S. Pat. No. 4,079,458. Either of these exemplary remote ROS printers and associated printer controllers could, if desired, be used as the printer 30 and controller 32 in place of the presently preferred Fuji Xerox 1660 printer and associated controller.

Referring again to FIG. 2, any suitable communications network 34 and network controller 36 may be utilized to supply data to stations or systems external to the system of FIGS. 1 and 2. An exemplary communications network and controller therefore is disclosed in U.S. Pat. No. 4,063,220. Specific details of such network and controller, if desired, may be obtained through a review of of the manual entitled "ALTO: A Personal Computer System Hardware Manual", January, 1979 available from Xerox Corporation, 3333 Coyote Hill Road, Palo Alto, CA 94304 and this patent.

Having described the primary components of the data processing system of FIG. 1 in terms of the block diagram representation of FIG. 2, the manner in which character font data (either large display characters or print characters) are transferred from the disk memory 84 into appropriate storage locations in the bit map data section 60 of the main memory 16 will be described. This process will be described, by way of example, with reference to the transfer and storage of large display characters, although the process is identical for the transfer and storage of print characters, as will be made clear below.

Referring first to FIG. 7, a hypothetical display bit map generation control list is shown with the characters being listed in an ordered visual display sequence, i.e., the order in which the characters are to be scanned for display. The list of FIG. 7 is hypothetical since the characters are in fact sorted by the CPU 10 into an ordered disk storage sequence, i.e., the order in which characters are stored in disk memory 84, when the list is actually prepared (FIG. 8). The list of FIG. 7 is simply included to represent how the characters would be normally listed without the unique character sort feature of this system.

As shown in FIGS. 7 and 8, the display bit map generation control list contains the identification of all large display characters to be displayed on the display screen in terms of its 12-bit identification code and 10-bit x and y coordinate values. The list thus contains the identification data for all large display characters to be displayed in all large character display areas on the display, such as the text display are 74 and the key top display area 96. The x, y coordinate values insure the display of all characters at the appropriate location on the screen by insuring their proper location in the display bit map data section 60 of the main memory 16.

It should be noted that the small display characters do not appear in the display bit map generation control list in main memory, as the font data therefore is itself resident in the main memory. Consequently, no sorting is necessary with respect to the character identification data for those characters, which appears in the character identification list in the text file located in storage section 92 of the disk memory 84. These characters would thus be displayed in accordance with their ordered display sequence, and not in accordance with the order in which they are stored in main memory.

Purely for ease of description, the display bit map generation control lists depicted in FIGS. 7 and 8, respectively, are only 13 characters in length. Additionally, the 12-bit character identification code and 10-bit x and y coordinate values for each large display character in the lists are indicated by numbers, where the number indicative of the 12-bit identification code signifies the number of that character in the large display character set as stored on the disk memory 84. As an example, character number 2 in a "0, 1, 2" sequence could be the Romaji character C, character number 4 could be the Romaji character E, and so on for the entire set of large Romaji, Hiragana, Katakana and Kanji display characters (potentially over 10,000 in all). The numbers representing the 10-bit x and y coordinate values are meant to be the numerical equivalent of the actual 10-bit digital values, it being recalled that the display screen is roughly 600 pixels wide by 800 pixels high with the display bit map containing an equivalent number of bit storage locations. Thus, character 2 would be located at coordinate x=500, y=200, character 4 at coordinate x=200, y=100, and so on. Obviously, the x and y values are totally hypothetical and are merely for exemplary purposes.

In creating the actual display bit map generation control list of FIG. 8, what the CPU 10 does under program control is to create the list one character at a time on the basis of the list of characters contained in the associated text file in disk memory 84. It will be recalled that the character identification data appearing in the text file list are in an ordered visual display sequence, i.e., the order in which the characters are to be scanned for visual display. The ordered sequence of the characters listed in the hypothetical control list of FIG. 7 would be the same as the ordered sequence of those characters in the text file list. It should be recalled, however, that the text file list contains the 12-bit identification codes and "leading" and "pitch" data, as opposed to the 12-bit identification codes and x, y coordinate data that appears in the bit map generation control lists.

Character sorting to arrive at the actual display bit map generation control list of FIG. 8 is accomplished by the CPU 10 under program control. More specifically, the data section 12 of the CPU 10 preferably executes a standard "Tree Sort" algorithm. Details of such an algorithm, if desired, may be obtained through a review of Algorithm No. 245, "TreeSort 3", Robert W. Floyd, *Communications of the ACM*, Vol. 7, No. 12, December, 1964. Execution of the program routine implementing this algorithm causes the character information in the display bit map generation control list to be listed in the sequence in which the characters are stored in disk memory 84, as opposed to the order in which the characters are to be scanned for display (as exemplified by the hypothetical list of FIG. 7). This enables each track on a disk surface to be accessed only once to read all of the large display characters to be displayed in the text display area 74 and key top display area 96 (FIG. 6) that are stored in the six strikes on that track. Specific details of the preferred program routine associated with implementing the TreeSort 3 algorithm for character sorting are set forth in the program listings of Appendix C hereto.

It will be recalled that the large display characters are stored in strikes of 22 characters each on the disk memory 84. Thus, the first strike (strike 0) would include large display characters 0–21, the second strike (strike 1) large display characters 22–43, and so on. FIG. 8 indicates which strikes each of the listed characters is in. It is important to appreciate this relationship in view of the procedure by which the character font data for each of the listed characters is actually entered into the appropriate location of the display bit map in section 60 of the main memory 16.

More specifically, and with reference to FIGS. 9–11, character font data is loaded into the bit map data section 60 of the main memory 16 through the use of the pair of data buffers 70 and 72 defined in the data buffer section 68 of the main memory 16. Thus the CPU 10 under program control first looks through the bit map generation control list to see if any characters from strike 0 are in the list. With respect to the example of FIG. 8, there are five such characters, i.e., numbers 2, 4, 5, 17 and 19. Then, it causes the twenty two characters of strike 0, i.e., characters 0–21, to be transferred into the data buffer 70. Such transfer is effected by instructing the disk controller 22 to cause the disk drive 20 to read strike 0, and then the disk controller to apply such strike in successive 16-bit words onto the disk bus 38 for transmittal to the data buffer 70 in the main memory 16. At this stage, the data buffer 72 remains empty.

The CPU 10 then transfers, in successive 16-bit words, characters 2, 4, 5, 17 and 19 from the data buffer 70 into their respective locations in the bit map data section 60 of the main memory 16, as defined by the values of the x, y coordinates for each character. In this respect, the CPU 10 reads the x, y coordinate values for each character prior to transfering the first 16-bit word thereof into the bit map data section. Virtually at the same time characters are being transferred from the data buffer 70 into the bit map data section, the CPU 10 looks to see whether any characters in the bit map generation control list are in strike 1 on the disk memory. If so, which is the case in FIG. 8, it effects a transfer of strike 1 in the above-described manner into data buffer 72 of main memory data section 68. This stage is shown in FIG. 10.

FIG. 11 shows the next stage in the process, i.e., transferring characters 33, 42 and 43 (the only characters in strike 1 in the list of FIG. 8) from data buffer 72 into the bit map data section 60 of the main memory. Virtually at the same time, the data buffer 70 is reloaded with the twenty-two characters of strike 2, since character number 59 appears in the list. This procedure is repeated until all large display characters to be displayed in the total image are transferred into the display bit map in the main memory storage section 60.

An entirely similar procedure is effected by the CPU 10 under program control with respect to the strikes of print character data stored in the front data section 88 of disk memory 84. With respect to the print data strikes, however, it will be recalled that each 512 word strike comprises only 8 characters, due to the fact that the bit map defining matrix for each print character is 32 bits×32 bits, as opposed to the 18×20 bit map matrix for each large display character. Additionally, it must be recalled that the total print bit map (resident in disk memory 84) is created a slice at a time by transferring the character font data for each slice into the bit map data section 60 of the main memory 16 in the ordered storage sequence following character sort, and then forwarding the bit map slice to the disk drive controller 22 for loading into the corresponding slice of the total print bit map.

Specific details of the program routines associated with the creation of the display and print bit map generation control lists and the transfer of listed characters from disk memory 84 to main memory 16, as well as those routines associated with the definition of multiple display areas on the display device 24, are respectively set out in the program listings of Appendixes C and D forming part of this specification and set forth below. With respect to such routines, it should be noted that there are three implementing languages used in the software in general for this system. They are, from lowest to highest level, microcode, assembly language and BCPL. The microcode and assembly language levels are described in the previously referred to manual entitled "ALTO: A Personal Computer System Hardware Manual". BCPL is a high level, ALGOL-like programming language and is described in a copyrighted publication by Xerox Corporation entitled "BCPL Reference Manual", May 30, 1977, Xerox Palo Alto Research Center.

Although the invention has been described with respect to a presently preferred embodiment, it will be appreciated by those skilled in the art that various modifications, substitutions, etc. may be made without departing from the spirit and scope of the invention as defined in and by the following claims.

The following are Appendices C and D.

APPENDIX C

(PROGRAM LISTINGS - CHARACTER SORT)

```
// tooldecl

// This file contains declarations of routines, structures, and manifests
used by the toolbox library

// ***USE OVERLAYS OR NOT HERE

   manifest useoverlays = true

// Use XMEM here


  manifest usexmem = true


// Externals
  external
    [
    // Memory tools
      getmem
      retmem
      checkmem
    // Arithmetic Range Tools (signed)
      BOUNDS
      IN
      MIN
      MAX
    // And block memory operations
      movebytes
      clear
    // Error Tools
      seterror
      callerror
      localcallerror
      continueerror
    ];

// Manifests
  manifest
    [
    // Bit blt manifests
    // Source type and characteristics
      blocksource = 0
      brushsource = 2
      compblocksource = 1
      constantsource = 3
    // Function
      erasefunction = 3
      invertfunction = 2
      paintfunction = 1
      replacefunction = 0
    // Colors
      colorwhite = 0
      colorlightgrey = 1
      colormedgrey = 4
      colormediumgrey = 4
      colordarkgrey = 7
      colorblack = 8
    // ALTO I/O locations
      DCBChainHead = 420b
      xmouseloc = 424b
      ymouseloc = 425b
      xcursorloc = 426b
      ycursorloc = 427b
      clockloc = 430b // 39 ms increments
      cursorloc = 431b
      buttonsloc = 177030b
      keyboardloc = 177034b
      xpenloc = 177100b
      ypenloc = 177101b
```

```
 zpenloc = 177102b
 penpressureloc = zpenloc
// Display Boundaries
 xmax = 605
  xmin = 0
 ymax = 807
  ymin = 0
  junkY = ymax + 4 // used for measuring
 bitsperline = xmax - xmin + 1
 maxdatnumber = 14 // must change builddcblist for more
// I/O Manifests
 // Channel manifests
  tty = 0
  unassignedchannel = -1
  channelmax = 17
 // I/O functions
  read = 0
  write = 1
  append = 2
  readwrite = 3
 // Character Definitions
  CR = 15B
  EOF = $Z & 37b
  ESC = 33B
   escape = ESC
  FF = 14b
   formfeed = FF
  LF = 12B
   linefeed = LF
  SP = 40b
   space = SP
  BS = 10b
  TAB = 11B
  DEL = 177B
 ]

// Structures
structure
  [
  BYTE↑0,177777b byte 1
  ]
structure
 STRING:
  [
  count byte 1
  char↑0,255 byte 1
  ]
structure
 BOX:
  [
  x1 word 1
  y1 word 1
  x2 word 1
  y2 word 1
  ]
 manifest boxsize = (size BOX + 15)/16

structure
 BITBLTTABLE:
  [
  function word 1
     = [
    blank bit 10
    sourcebank bit 1
    destbank bit 1
    sourcetype bit 2
    operation bit 2
    ]
  greycode word 1
  // Destination
   bca word 1
   bmw word 1
   leftx word 1
   topy word 1
   width word 1
   height word 1
  //Source
   sourcebca word 1
   sourcebmw word 1
   sourceleftx word 1
   sourcetopy word 1
  scratchgrey1 word 1
  scratchgrey2 word 1
  scratchgrey3 word 1
  scratchgrey4 word 1
  ]
 manifest bitbltablesize = (size BITBLTTABLE + 15)/16

structure
 DCB:
  [
  link word 1
  // word boundary
  statusword word 1
   = [
   resolution bit 1 // 0 = high
   background bit 1 //0 = black on white
   horiztab bit 6 // htab* 16 bits
   wordsperscanline byte 1 // must be even
   ]
  startingaddress word 1 // must be even
  numscanlinesdiv2 word 1 // scan lines / 2 defined by this DCB
  ]
// diskdecl

  structure
   DISKREQ:
    [
    diskaddr word 1
    pageno word 1
    coreaddr word 1
    ]
   manifest diskreqsize = (size DISKREQ + 15)/16

  manifest
   [
   // disk commands
    KBLK = 521b
    readdiskcommand = 44120b;
    writediskcommand = 44130b
   // various parameters
    maxdiskqueueentries = 20
    diskqueuesize = maxdiskqueueentries*diskreqsize
    diskringsize = 4
   ]
```

```
structure
 DISKLABEL:
  [
  nextcommand word//PTR TO NEXT SUCH BLOCK
  status word//DISK command status WHEN COMPLETED
  command word// DISK COMMAND TO BE EXECUTED
  headerpointer word//PTR TO HEADER BLOCK
  labelpointer word//PTR TO LABEL BLOCK PORTION
  memoryaddress word//PTR TO MEMORY BUFFER
  diskstatusok word//OR'ED WITH NWW AFTER OK DISK ACTION
  diskstatusbad word// OR'ED WITH NWW AFTER ERROR ON DISK ACTION

  headerblock word 2 =
   [
   header1 word//FIRST word OF HEADER
   header2 word// 2ND WD OF HEADER.DISK ADDRESS OF PAGE
     = [
    diskaddr word 1
    ]
   ]
 labelblock word 8 =
  [
  nextpage word// PTR TO NEXT PAGE ON DISK
  lastpage word// PTR TO LAST PAGE ON DISK
  blank word
  numchars word
  pagenumber word// PAGE NUMBER
  versionnumber word //VERSION NUMBER
  serialnumber1 word// SERIAL NUMBER WD 1
  serialnumber2 word// SERIAL NUMBER WD 2
  ]
 ]
manifest disklabelsize = (size DISKLABEL + 15)/16

// and then a disk block
structure
 DISKBLOCK:
  [
  @DISKLABEL
  writecommand word 1
  readcommand word 1
  pagebuffer word 1
  pagetable word 1
  lastpageinfile word 1
  ]
 manifest diskblocksize = (size DISKBLOCK + 15)/16

// and a disk address
structure
 DISKADDRESS:
  [
  sector bit 4 // 0 - 13b
  track bit 9 // 0 - 312b
  head bit 1 // 0,1
  diskno bit 1 // 0,1
  restore bit 1 // normally 0
  ]
 manifest dcbsize = (size DCB + 15) / 16

structure
 DAT: // Display Area
  [
  link word 1
  @BOX
  xoffset word 1
  width word 1 // in bits
  height word 1 // in bits
  bitblttable word 1 // address of table
  fontvec word 1
  defaultfont word 1
  statusword word 1
   = [
   resolution bit 1 // 0 = high
   background bit 1 //0 = black on white
   horiztab bit 6 // htab* 16 bits
   wordsperscanline byte 1 // must be even
   ]
  ];
 manifest datsize = (size DAT + 15) / 16

structure
 DISPLAYKANJI: // Display Kanji Structure
  [
  // Disk location (from kanji code)
   page byte 1 // really page/2
   strikeleftx bit 5 // must multiply by 18
   xlow bit 3 // lowest 3 bits of x
  xy word 1 // y = xy/80 x = (xy rem 80) * 8 + xlow
  ];
 manifest displaykanjisize = (size DISPLAYKANJI + 15) / 16

structure
 PRESSFONT:
  [
  link word 1
  name word 10
  fontset word 1
  fontnumber word 1
  firstchar word 1
  lastchar word 1
  pointsize word 1
  face word 1
  source word 1
  rotation word 1
  ]
 manifest pressfontdescsize = (size PRESSFONT + 15)/16
{// basicdisplaytools

// declarations

 get "tooldecl"
 get "fonttooldecl"


 external // Declared in This File
  [
  bitblt
  cursoroff
  cursoron
  datlist
  invertbits
  makebox
  measurechar
  measurestr
  outlinebox
```

```
      putachar
      setbits
      setdatfont
      ttydat
      writestring
      xbugoffset
      ybugoffset
      ]

  external // Declared in Other Files
      [
      asmbitblt
      boxheight
      boxwidth
      findchar
      MoveBlock
      numstrikefonts
      strikefonts
      ]

  static
      [
      datlist
      ttydat
      xbugoffset
      ybugoffset
      ]

// Code

  let bitblt(dat, x, xbits, y, ybits, operation, source, sourcetype, grey;
  numargs n) be
    [
    let x2, y2 = MIN(dat>>DAT.width, MAX(0, x + xbits)) -1 +
    dat>>DAT.xoffset, MIN(dat>>DAT.height, MAX(0, y + ybits))-1
    x = x + dat>>DAT.xoffset
    let x1 = MAX(x, dat>>DAT.xoffset)
    let y1 = MAX(y, 0)
    xbits = MAX(0, x2-x1 + 1)
    ybits = MAX(0, y2-y1 + 1)
    let bitblttable = dat>>DAT.bitblttable
    bitblttable>>BITBLTTABLE.leftx = x1;
    bitblttable>>BITBLTTABLE.width = xbits;
    bitblttable>>BITBLTTABLE.topy = y1;
    bitblttable>>BITBLTTABLE.height = ybits;
    if source ne 0 then
      [
      MoveBlock(lv bitblttable>>BITBLTTABLE.sourcebca, source,
      4);
      if x1 ne x then
      bitblttable>>BITBLTTABLE.sourceleftx =
      bitblttable>>BITBLTTABLE.sourceleftx + (x1-x)
      if y1 ne y then
      bitblttable>>BITBLTTABLE.sourcetopy =
      bitblttable>>BITBLTTABLE.sourcetopy + (y1-y)
      ];
    bitblttable>>BITBLTTABLE.sourcetype = sourcetype;
    bitblttable>>BITBLTTABLE.operation = operation;
    bitblttable>>BITBLTTABLE.greycode = IN(grey, colorwhite, colorblack)?
    table[ 0;
    101202b; 12050b; 36074b; 55132b; 125125b; 165727b; 76575b; -1 ]
    !grey, grey;
    asmbitblt(bitblttable);
    ];
  and biton(dat,x,y) be   // turns on the bit at x,y
    [
    setbits(dat, x,1,y,1)
    ]
  and bitoff(dat, x,y) be  //turns off the bit at x,y
    [
    setbits(dat, x,1,y,1, colorwhite)
    ]
  and cursoroff() be
    clear(cursorloc, 16)
  and cursoron(bitmap, xoff, yoff; numargs n) be
    [
    xbugoffset = xoff
    ybugoffset = yoff
    if n eq 0 then
      [
      bitmap = table[ 200b; 200b; 200b; 200b; 200b; 200b; 200b; 77777b;
      200b; 200b; 200b; 200b; 200b; 200b; 200b; 0 ]
      xbugoffset = 8
      ybugoffset = 7
      ];
    MoveBlock(cursorloc, bitmap, 16)
    ];

  and invertbits(dat, x, xbits, y, ybits, grey; numargs n) be
    [
    if n eq 5 then grey = colorblack
    bitblt(dat, x, xbits, y, ybits, invertfunction, 0, constantsource,
    grey);
    ];
  and makebox(x1,y1,x2,y2) =
    valof[
    // makes a box  with x1,y1 as top left and x2,y2 as bottom right
    let box = getmem(boxsize)
    box>>BOX.x1 = MAX(0, x1)
    box>>BOX.y1 = MAX(0, y1)
    box>>BOX.x2 = x2
    box>>BOX.y2 = y2
    resultis box
    ]
  and measurechar(char, font; numargs n) =
    valof[
    if n eq 1 then
      font = strikefonts!(MAX(0, MIN(char rshift 8, numstrikefonts-1)))
    let badchar = font>>STRIKESEG.maxchar + 1
    char = char & 177b
    unless IN(char, font>>STRIKESEG.minchar, badchar) do char = badchar
    char = char - font>>STRIKESEG.minchar
    if char is 0 then char = badchar
    let xtable = font>>STRIKESEG.xtable
    resultis xtable!(char + 1) - xtable!char
    ]
  and measurestr(string, font; numargs n) =
    valof[
    if n eq 1 then
      font = strikefonts!0
    let count = string>>STRING.count-1
    let x = 0
    for i = 0 to count do
      x = x + measurechar(string>>STRING.char!i, font)
    resultis x
    ]
```

```
  and outlinebox(dat, box) be
    [
    manifest outlinewidth = 1
    let width = boxwidth(box) + outlinewidth*2
    let height = boxheight(box)
    let x1p = box>>BOX.x1-outlinewidth
    let y1 = box>>BOX.y1
    // Horizontal lines
      invertbits(dat, x1p, width, y1-outlinewidth, outlinewidth,
      colorblack)
      invertbits(dat, x1p, width, box>>BOX.y2 + 1, outlinewidth,
      colorblack)
    // vertical lines
      invertbits(dat, x1p, outlinewidth, y1, height, colorblack)
      invertbits(dat, box>>BOX.x2 + 1, outlinewidth, y1, height,
      colorblack)
    ];

  and writestring(dat, string, x, y, font; numargs n) =
    valof[
    switchon n into
      [
      case 0:
      case 1:
      case 2:
      case 3:
        callerror("Insufficient Args (writestring)")
      case 4:
        font = 0
      ]
    // write a string -- do not check for overflow
    let count = string>>STRING.count-1
    let savex = x
    for i = 0 to count do
      x = x + putachar(dat, font lshift 8 + string>>STRING.char!i, x, y)
    resultis x - savex
    ];

  and putachar(dat, char, x, y, font; numargs n) =
    valof[
    // y points to baseline

    test n eq 3
      ifso // special for tty simulation
        [
        font = x
        y = 0
        ];
      ifnot
        if n ne 5 then
          [
          font = strikefonts!(MAX(0, MIN(char rshift 8,
          numstrikefonts-1)))
          ];
    char = char & 177b
    let bitblttable = dat>>DAT.bitblttable
    if n ne 3 then
      setdatfont(dat, font, x, y)
    test font>>STRIKESEG.strikelist ne 0
      ifso
        [
        char = findchar(font>>STRIKESEG.strikelist, char) - 1
        if char is 0 then char = font>>STRIKESEG.maxchar + 1
        ];
      ifnot
        [
        let badchar = font>>STRIKESEG.maxchar + 1
        unless IN(char, font>>STRIKESEG.minchar, badchar) do char =
        badchar
        char = char - font>>STRIKESEG.minchar
        ];
    let xtable = font>>STRIKESEG.xtable
    bitblttable>>BITBLTTABLE.sourceleftx = xtable!char +
    font>>STRIKESEG.xoffset
    let width = xtable!(char + 1) - xtable!char
    bitblttable>>BITBLTTABLE.width = width
    if y ls dat>>DAT.height then
      [
      asmbitblt(bitblttable)
      ];
    resultis width
    ];
  and setdatfont(dat, font, x, y; numargs n) be
    // Dest
    [ // set up bitblt table for this font
    let bitblttable = dat>>DAT.bitblttable
    let yclipped = 0
    if n eq 1 then font = dat>>DAT.defaultfont
      if n gr 2 then
        [
        bitblttable>>BITBLTTABLE.leftx = x + dat>>DAT.xoffset // start in
        upper left corner (y)
        if n gr 3 then
          [
          let ystart = y - font>>STRIKESEG.ascent
          yclipped = MAX(-ystart, 0)
          bitblttable>>BITBLTTABLE.topy = ystart + yclipped // start in
          upper left corner (y)
          ];
        ];
    bitblttable>>BITBLTTABLE.height = MAX(0,
    MIN(dat>>DAT.height-bitblttable>>BITBLTTABLE.topy,
    font>>STRIKESEG.height-yclipped))
  // Source
    bitblttable>>BITBLTTABLE.sourcebca = font>>STRIKESEG.sourcebca //
    address of bit map
    bitblttable>>BITBLTTABLE.sourcebmw = font>>STRIKESEG.sourcebmw //
    width of bit map
    bitblttable>>BITBLTTABLE.sourcetopy = yclipped // start in upper
    left corner (y)
    bitblttable>>BITBLTTABLE.sourcetype = blocksource
  ];
  and setbits(dat, x, xbits, y, ybits, grey; numargs n) be
    [
    switchon n into
      [
      case 1: // entire dat black
        x = colorblack
      // ***FALL THROUGH***
      case 2: //
        test IN(x, 0, 10) // see if it is a color
          ifso // dat to color
            [
            grey = x
            x, y = 0, 0
            xbits = dat>>DAT.width
            ybits = dat>>DAT.height
```

```
      endcase
      ];
    ifnot // dat, box black
      xbits = colorblack

 // ***FALL THROUGH***
 case 3: // dat, box grey
   [
   let box = x
   grey = xbits
   x = box>>BOX.x1
   y = box>>BOX.y1
   xbits = boxwidth(box)
   ybits = boxheight(box)
   endcase
   ];
 case 4: // dat, indicated bits black
   ybits = 1
 case 5: // dat, indicated bits black
   [
   grey = colorblack
   endcase
   ];
  ];
bitblt(dat, x, xbits, y, ybits, replacefunction, 0, constantsource,
grey)
];

// kanjidisplay kanjidisplay.ext

// declarations
  get "tooldecl"
  get "diskdecl"

  external // Declared in This File
    [
    displaycharstack
    putjdschar
    setcharstack
    ]

  external // Declared in Other Files
    [
    asmfastblt
    diskring
    getnextkanji
    kanjifile
    kanjistack
    outch
    outnum
    SetBlock
    suppresskeyboardflag
    unsigneddivide
    ]

  static
    [
    diskmisses = 0
    diskidle = 0
    ]

 // Code

  let putjdschar(code, x, y) =
    valof[
    // return false, or true if stack is full
    test kanjistack eq 0
      ifso
        [
        //putachar(jdsdat, code, x, y, jdssmallfont)
        test IN(code, space, 177b)
          ifso outch(tty, code)
          ifnot
            [
            outch(tty, $<)
            outnum(tty, code, 8, 4)
            outch(tty, $>)
            ]
        ]
      ifnot
        [
        //kanjistack!0 = index
        //kanjistack!1 = max
        // display stack if no room
        let kv0 = kanjistack + 1
        let kv1 = kv0 + @kv0 // pointer to second half
        let index = @kanjistack + 1
        if index gr @kv0 then
          resultis true
        @kanjistack = index
        // build entry
          let k0, k1 = nil, nil
          k0 = unsigneddivide(code, 22, lv k1) lshift 8
          k0 = k0 + (k1 lshift 3) + (x & 7b)
          k1 = (y * 80) + (x rshift 3)
        // Now enter it into queue and sift it down
        kv0!index = k0
        kv1!index = k1
        let i, j = index, nil
        while i gr 1 do
          [
          j = i rshift 1
          test (kv0!j rshift 1) gr (kv0!i rshift 1)
            ifso // switch them
              [
              let t, t1 = kv0!j, kv1!j
              kv0!j, kv1!j = kv0!i, kv1!i
              kv0!i, kv1!i = t, t1
              i = j
              ]
            ifnot
              break // done
          ]
          ]
        resultis false
        ]
      and setcharstack(address, Size, dat) =
        valof[
        kanjistack = address
        if address ne 0 then
          [
          let nentries = (Size - 3)/displaykanjisize
          kanjistack = kanjistack + 1
          kanjistack!-1 = dat
          kanjistack!0 = 0
           kanjistack!1 = nentries
           resultis nentries
           ]
         resultis 1
         ]
       and displaycharstack(buffer0, buffer1; numargs n) be
         [
         if n eq 0 then return
         if n eq 1 then buffer1 = buffer0 + 512
         let buffvec = vec 1
         buffvec!0 = buffer0
         buffvec!1 = buffer1
         kdiskio(kanjifile, buffvec)
         ]
       and kdiskio(diskblock, buffvec) be
         [
         manifest kstacksize = 45
         let bitblttable = (kanjistack!-1)>>DAT.bitblttable
         // set it up
           bitblttable>>BITBLTTABLE.sourcetype = blocksource
           bitblttable>>BITBLTTABLE.operation = replacefunction
           bitblttable>>BITBLTTABLE.width = 18
           bitblttable>>BITBLTTABLE.height = 20
           bitblttable>>BITBLTTABLE.sourcebmw = 25
           bitblttable>>BITBLTTABLE.sourcetopy = 0
           SetBlock(lv bitblttable>>BITBLTTABLE.scratchgrey1, -1, 4)
         if @kanjistack le 0 then return
         while @KBLK ne 0 do;
         // turn off display and keyboard
           if @kanjistack gr 20 then
             suppresskeyboardflag = true
           let savedpy = 0!DCBChainHead
           //if @kanjistack gr 300 then
             //0!DCBChainHead = 0
         // first set up diskring buffers
           (diskring!0)>>DISKLABEL.memoryaddress = buffvec!0
           (diskring!1)>>DISKLABEL.memoryaddress = buffvec!0 + 256
           (diskring!2)>>DISKLABEL.memoryaddress = buffvec!1
           (diskring!3)>>DISKLABEL.memoryaddress = buffvec!1 + 256
           for i = 0 to 3 do
             (diskring!i)>>DISKLABEL.command = diskblock>>DISKBLOCK.command
         // Now fill initial kanji list
           let pagetable = diskblock>>DISKBLOCK.pagetable
           let kstack = vec 1
           let kstackv = vec (kstacksize lshift 1)
           kstack!0 = kstackv
           kstack!1 = kstackv + kstacksize
           let kstackx = 0
           let kindex = nil
           let labelno = 0
           let kv = kanjistack
           let kvptr = kanjistack + 2
           let pageno = @kvptr & 177400b
           let waitloc = startkdisk(pagetable, pageno, labelno)
           // fill kstack with kanji for page being read
             let ks = kstack!kstackx
             kstackx = 1-kstackx
             kindex = 1
             while (@kvptr & 177400b) eq pageno do
               [
               if getnextkanji(kv, ks + kindex) then break // done
               kindex = kindex + 2
               if kindex ge kstacksize then break // too many
               ]
             @ks = kindex
           // start of loop
             [
             // Now start next disk transfer
             let nextwaitloc = nil
             test @kanjistack ne 0 // there's something there
               ifso
                 [
                 pageno = @kvptr & 177400b
                 labelno = 2 - labelno
                 if @KBLK eq 0 then diskmisses = diskmisses + 1
                 nextwaitloc = startkdisk(pagetable, pageno, labelno)
                 // fill next kstack with kanji for next page being read
                   ks = kstack!kstackx
                   kindex = 1
                   while (@kvptr & 177400b) eq pageno do
                     [
                     if getnextkanji(kv, ks + kindex) then break // done
                     kindex = kindex + 2
                     if kindex ge kstacksize then break // too many
                     ]
                   @ks = kindex
                 ]
               ifnot nextwaitloc = 0
             kstackx = 1-kstackx
             // Now do this set of kanji
               diskdisplaykanji(waitloc, kstack!kstackx, bitblttable)
             if nextwaitloc eq 0 then break
             waitloc = nextwaitloc
             ]repeat
         //retmem(@kstack)
         suppresskeyboardflag = false
         0!DCBChainHead = savedpy
         ]
       and startkdisk(pagetable, pageno, labelno) =
         valof [ // return address to wait on for completion
         pageno = pageno rshift 7 // real page
         // set up to read 2 sectors
         let disklabel = diskring!labelno
         let lastlabel = diskring!(3-labelno)
         for i = 0 to 1 do
           [
           // set up the disk header and label
             disklabel>>DISKLABEL.status = 0
             SetBlock(lv disklabel>>DISKLABEL.headerblock, 0, 10)
             disklabel>>DISKLABEL.diskaddr = pagetable!pageno
             pageno = pageno + 1
             disklabel>>DISKLABEL.pagenumber = pageno
           lastlabel>>DISKLABEL.nextcommand = disklabel
           lastlabel = disklabel
           disklabel = diskring!(labelno + 1)
           ]
         disklabel>>DISKLABEL.nextcommand = 0
           // now start it if necessary
             if @KBLK eq 0 then
               @KBLK = diskring!labelno
         resultis diskring!labelno
         ]
       and diskdisplaykanji(labeladdr, kstack, bitblttable) =
         valof[
         // wait for disk to finish, and then display kanji
         // return true IFF a disk error
         // Wait for the disk to finishdklabel = diskring!diskringout
           let time0, time1 = nil, nil
```

```
  // Timer(lv time0)
  //diskidle = diskidle - time1
  while labeladdr eq @KBLK do;
  while @labeladdr eq @KBLK do;
  // Timer(lv time0)
  //diskidle = diskidle + time1
  //if ((labeladdr>>DISKLABEL.status & 373b) + ((@labeladdr)>>DISKLABEL.status
  & 373b)) ne 0 then
    //resultis -1 // error
bitblttable>>BITBLTTABLE.sourcebca = labeladdr>>DISKLABEL.memoryaddress
let kindex = @kstack
  [
  if kindex le 1 then break
  kindex = kindex - 2
  let kanji0 = kstack!kindex
  let charx = (kanji0 rshift 2) & 76b
    // kanji>>DISPLAYKANJI strikeleftx lshift 1
  bitblttable>>BITBLTTABLE sourceleftx = charx + (charx lshift 3) // * 18
  let x = nil
  bitblttable>>BITBLTTABLE topy = unsigneddivide(kstack!(kindex + 1), 80, lv x)
  bitblttable>>BITBLTTABLE leftx = x lshift 3 + (kanji0 & 7b)
  asmfastblt(bitblttable)
  ] repeat
resultis false
]
 ; kanjiasm

 .get "altasmdecl"

 ; ****** externals *********
   .bext getnextkanji

 ; ****** SRELS *********
   .srel
     ;getnextkanji(lvkanjistack, lvresult)
     getnextkanji: siftupx
 .nrel
   v1: 0
   v2: 0
   std: 0
   savestk: 0
   siftupx:
     inc 3,3
     sta 3,1,2
     sta 2,savestk
   ; here. 0 = address of vector, 1 = address for result
       mov 0,3, address of vector
       ; get v1!std
         lda 2,0,3: index of last entry (std)-1
         ; decrement and update for next call
           neg 2,0,snr
            jmp tret; done
           com 0,0, index - 1
           sta 0,0,3, update index
         add 3,2
         lda 2,1,2, std
         sta 2,std
       mov 1,2: address for result
       ; make 3 point to 0 entry (1 is first data)
         inc 3,3
         sta 3,v1
       ; Now get result
         lda 1,1,3: first value
           sta 1,0,2, save it
         lda 1,0,3 size of vector
         add 1,3; address of second vector
         lda 1,1,3, second value
         sta 1,1,2, and store it in result
         sta 3,v2; save v2
       ; here, 2 is address of v1, and 3 of v2
       ; use 1 for j
         one 1,1
       ; start loop to siftup
       siftloop:
         ; 1 = i
         lda 3,v1; restore 3 to v1 ptr
         movzl 1,1; j = i * 2
         lda 0,-1,3; top
         add 1,3; address of v1!j
         lda 2,0,3, v1!j
         skg 0,1
           jmp lastone; maybe done
         lda 0,1,3, v1!(j + 1)
         sub 1,3; restore 3
         skl 0,2; skip if v1!(j + 1) < v1!j
         onemore. mov 2,0,skp; 0 ← v1!j
           inc 1,1; j ← j + 1
         ; by here. 0 is current winner -- check against standard
         lda 2,std
         skg 2,0; skip if std > winner
           jmp donesift, got it -- j is in 1
         ; save v1!i ← v1!j
           movzr 1,2; i ← j/2
           add 2,3
           sta 0,0,3
         ; and v2!i ← v2!j
           lda 3 v2
           add 3,2 pointer to v2!i
           add 1,3 address to v2!j
           lda 0,0,3 v2!j
           sta 0,0,2 v2!i ← v2!j
         jmp siftloop
     lastone: ; come here on last value of j or done
       sle 0,1
         jmp donesift; done
           sub 1,3 restore 3
           jmp onemore; done
     donesift: ; come here with 1 = j
       movzr 1,2 i = j/2
       lda 3 v1
       lda 1 -1,3 top
       lda 0,std
       add 2,3
       sta 0,0,3; v1!i = std
       lda 3,v2
       add 3,2; address of v2!i
       add 1,3; address of v2!(std-1)
       lda 0,1,3; v2!std
       sta 0,0,2; v2!i = v2!std
     clr 0,0,skp
   tret: none 0,0
   lda 2,savestk
   jmp @-1,2
  // kanjiprint kanjiprint.ext


 // declarations
   get "tooldecl"
```

```
  get "diskdecl"
  get "jdsdecl"


  external // Declared in This File
    [
    displaynarrowstack
    putnarrowchar
    ]

  external // Declared in Other Files
    [
    asmbitblt
    asmfastblt
    diskring
    getnextkanji
    kanjistack
    MoveBlock
    SetBlock
    printkanjifile
    suppresskeyboardflag
    ]

 static mdiskmisses
 manifest pagemask = 177600b

// Code

 let putnarrowchar(code, x, y, Size) =
   valof[
   // Size = 0 for 32X32, 10b for 24X24
   // return false, or true if stack is full
   //kanjistack!0 = index
   //kanjistack!1 = max
   // display stack if no room
   let kv0 = kanjistack + 1
   let kv1 = kv0 + @kv0 // pointer to second half
   let index = @kanjistack + 1
     if index gr @kv0 then
         resultis true
   @kanjistack = index
   // build entry
     x = (x - lefttextmargin) & 777b // in range [0, 511]
     let k0, k1 = nil, nil
     k0 = (code lshift 4) + Size // code lshift 4
     k0 = k0 + (x & 7b) // 3 bits
     k1 = (y lshift 6) + (x rshift 3) // 6 bits
   // Now enter it into queue, and sift it down
     kv0!index = k0
     kv1!index = k1
     let i, j = index, nil
     while i gr 1 do
       [
       j = i rshift 1
       test (kv0!j rshift 1) gr (kv0!i rshift 1)
         ifso // switch them
           [
           let t, t1 = kv0!j, kv1!j
           kv0!j, kv1!j = kv0!i, kv1!i
           kv0!i, kv1!i = t, t1
           i = j
           ]
         ifnot
           break // done
       ]
   resultis false
   ]
 and displaynarrowstack(buffer0, buffer1; numargs n) be
   [
   if n eq 0 then return
   if n eq 1 then buffer1 = buffer0 + 512
   let buffvec = vec 1
   buffvec!0 = buffer0
   buffvec!1 = buffer1
   mkdiskio(printkanjifile, buffvec)
   ]
 and mkdiskio(diskblock, buffvec) be
   [
   manifest kstacksize = 45
   let bitblttable = (kanjistack!-1)>>DA1 bitblttable
   // set it up
     bitblttable>>BITBLTTABLE.sourcetype = blocksource
   bitblttable>>BITBLTTABLE operation = replacefunction
   bitblttable>>BITBLTTABLE.width = 32
   bitblttable>>BITBLTTABLE.height = 32
   bitblttable>>BITBLTTABLE.sourcebmw = 16
   bitblttable>>BITBLTTABLE sourcetopy = 0
   SetBlock(lv bitblttable>>BITBLTTABLE.scratchgrey1, -1, 4)
 if @kanjistack le 0 then return
 while @KBLK ne 0 do;
 // turn off display and keyboard
   suppresskeyboardflag = true
   let savedpy = 0!DCBChainHead
   if @kanjistack gr 300 then
     0!DCBChainHead = 0
 // first set up diskring buffers
   (diskring!0)>>DISKLABEL.memoryaddress = buffvec!0
   (diskring!1)>>DISKLABEL.memoryaddress = buffvec!0 + 256
   (diskring!2)>>DISKLABEL.memoryaddress = buffvec!1
   (diskring!3)>>DISKLABEL.memoryaddress = buffvec!1 + 256
   for i = 0 to 3 do
     (diskring!i)>>DISKLABEL command = diskblock>>DISKBLOCK.command
 // Now fill initial kanji list
   let pagetable = diskblock>>DISKBLOCK pagetable
   let kstack = vec 1
   let kstackv = vec (kstacksize lshift 1)
   kstack!0 = kstackv
   kstack!1 = kstackv + kstacksize
   let kstackx = 0
   let kindex = nil
   let labelno = 0
   let kv = kanjistack
   let kvptr = kanjistack + 2
   let pageno = @kvptr & pagemask
   let waitloc = startmkdisk(pagetable, pageno, labelno)
   // fill kstack with kanji for page being read
     let ks = kstack!kstackx
     kstackx = 1-kstackx
     kindex = 1
     while ((@kvptr & pagemask) eq pageno) do
       [
       if getnextkanji(kv, ks + kindex) then break // done
       kindex = kindex + 2
       if kindex ge kstacksize then break // too many
       ]
     @ks = kindex
   // start of loop
     [
```

```
// Now start next disk transfer
let nextwaitloc = nil
test @kanjistack ne 0 // there's something there
 ifso
  [
  pageno = @kvptr & pagemask
  labelno = 2 - labelno
  if @KBLK eq 0 then mdiskmisses = mdiskmisses + 1
  nextwaitloc = startmkdisk(pagetable, pageno, labelno)
  // fill next kstack with kanji for next page being read
   ks = kstack!kstackx
   kindex = 1
   while (@kvptr & pagemask) eq pageno do
    [
    if getnextkanji(kv, ks + kindex) then break // done
    kindex = kindex + 2
    if kindex ge kstacksize then break // too many
    ]
   @ks = kindex
  ]
 ifnot nextwaitloc = 0
kstackx = 1-kstackx
// Now do this set of kanji
 diskdisplaymkanji(waitloc, kstack!kstackx, kanjistack! 1)
if nextwaitloc eq 0 then break
waitloc = nextwaitloc
] repeat
//retmem(@kstack)
suppresskeyboardflag = false
DTKOKChainHead = savedp
]
and startmkdisk(pagetable, pageno, labelno) =
 valof [ // return address to wait on for completion
 pageno = pageno rshift 6 // real page
 // set up to read 2 sectors
 let disklabel = diskring!labelno
 let lastlabel = diskring!(3-labelno)
 for i = 0 to 1 do
  [
  // set up the disk header and label
   disklabel>>DISKLABEL.status = 0
   SetBlock(lv disklabel>>DISKLABEL.headerblock, 0, 10)
   disklabel>>DISKLABEL.diskaddr = pagetable!pageno
   pageno = pageno + 1
   disklabel>>DISKLABEL.pagenumber = pageno
  lastlabel>>DISKLABEL.nextcommand = disklabel
  lastlabel = disklabel
  disklabel = diskring!(labelno + 1)
  ]
 disklabel>>DISKLABEL.nextcommand = 0
  // now start it if necessary
   if @KBLK eq 0 then
    @KBLK = diskring!labelno
 resultis diskring!labelno
 ]
and diskdisplaymkanji(labeladdr, kstack, dat) =
 valof[
 // wait for disk to finish, and then display kanji
 // return true IFF a disk error
 // Wait for the disk to finishdklabel = diskring!diskringout
  let time0, time1 = nil, nil
  // Timer(lv time0)
  //diskidle = diskidle - time1
  while labeladdr eq @KBLK do;
  while @labeladdr eq @KBLK do;
  //Timer(lv time0)
  //diskidle = diskidle + time1
  //if ((labeladdr>>DISKLABEL.status & 373b) + ((@labeladdr)>>DISKLABEL.status
  & 373b)) ne 0 then
   //resultis -1 // error
 let bitbltable = dat>>DAT.bitbltable
 let firsty = dat>>DAT.y1
 let lasty = dat>>DAT.y2
 bitbltable>>BITBLTTABLE.sourcebca = labeladdr>>DISKLABEL.memoryaddress
 let squashvec = vec 7
 clear(squashvec, 8)
 let kindex = @kstack
  [
  if kindex le 1 then break
  kindex = kindex - 2
  let kanji0 = kstack!kindex
  let height = nil
  bitbltable>>BITBLTTABLE.sourceleftx = (kanji0 & 160b) lshift 1
  test (kanji0 & 10b) eq 0
   ifso // 32X32
    [
    height = 32
    bitbltable>>BITBLTTABLE.width = 32
    ]
   ifnot // 24X24
    [
    height = 24
    let charno = (kanji0 & 160b) rshift 4
    if squashvec!charno eq 0 do // squash it
     [
     squashvec!charno = -1
     let bltb = vec bitbltablesize
     bltb = (bltb + 1) & -2
     MoveBlock(bltb, bitbltable, bitbltablesize)
     bltb>>BITBLTTABLE.bca = bltb>>BITBLTTABLE.sourcebca
     bltb>>BITBLTTABLE.bmw = bltb>>BITBLTTABLE.sourcebmw
     bltb>>BITBLTTABLE.leftx = bltb>>BITBLTTABLE.sourceleftx
     bltb>>BITBLTTABLE.topy = 0
     // first do rows
      bltb>>BITBLTTABLE.sourcetopy = 1
      bltb>>BITBLTTABLE.height = 3
      bltb>>BITBLTTABLE.width = 32
      for i = 0 to 7 do
       [
       asmfastblt(bltb)
       bltb>>BITBLTTABLE.topy = bltb>>BITBLTTABLE.topy + 3
       bltb>>BITBLTTABLE.sourcetopy = bltb>>BITBLTTABLE.sourcetopy
        + 4
       ]
     // and now columns
      bltb>>BITBLTTABLE.height = 24
      bltb>>BITBLTTABLE.width = 3
      bltb>>BITBLTTABLE.sourcetopy = 0
      bltb>>BITBLTTABLE.topy = 0
      bltb>>BITBLTTABLE.sourceleftx = bltb>>BITBLTTABLE.sourceleftx +
      1
      for i = 0 to 7 do
       [
       asmfastblt(bltb)
       bltb>>BITBLTTABLE.leftx = bltb>>BITBLTTABLE.leftx + 3
       bltb>>BITBLTTABLE.sourceleftx = bltb>>BITBLTTABLE.sourceleftx
        + 4
       ]
     ]
    bitbltable>>BITBLTTABLE.width = 24
    ]
  let kanji1 = kstack!(kindex + 1)
  let topy = (kanji1 & 177700b) rshift 4
  let sourcetopy = 0
  test topy ls firsty
   ifso // clip
    [
    sourcetopy = firsty - topy
    topy = firsty
    height = height - sourcetopy
    ]
   ifnot // see if too far down
    if (topy + height - 1) gr lasty then
     [ // off bottom
     height = lasty - topy + 1
     ]
  if height le 0 then loop // out of bounds
  bitbltable>>BITBLTTABLE.height = height
  bitbltable>>BITBLTTABLE.topy = topy-firsty
  bitbltable>>BITBLTTABLE.sourcetopy = sourcetopy
  bitbltable>>BITBLTTABLE.leftx = (((kanji1 & 77b) lshift 3) + (kanji0 & 7b))
  lshift 2 // 0 to 2047 (0 to 1679 used)
  asmfastblt(bitbltable)
  ] repeat
 resultis false
 ]
```

APPENDIX D

(PROGRAM LISTINGS - MULTIPLE DISPLAY AREAS)

```
// tooldecl

// This file contains declarations of routines, structures, and manifests
used by the toolbox library

// ***USE OVERLAYS OR NOT HERE

  manifest useoverlays = true

// Use XMEM here

  manifest usexmem = true

// Externals
 external
  [
  // Memory tools
   getmem
   retmem
   checkmem
  // Arithmetic Range Tools (signed)
   BOUNDS
   IN
   MIN
   MAX
  // And block memory operations
   movebytes
   clear
  // Error Tools
   seterror
   callerror
   localcallerror
   continueerror
  ];

// Manifests
 manifest
  [
  // Bit blt manifests
  // Source type and characteristics
   blocksource = 0
   brushsource = 2
   compblocksource = 1
   constantsource = 3
  // Function
   erasefunction = 3
   invertfunction = 2
   paintfunction = 1
   replacefunction = 0
  // Colors
   colorwhite = 0
   colorlightgrey = 1
   colormedgrey = 4
   colormediumgrey = 4
   colordarkgrey = 7
   colorblack = 8
  // ALTO I/O locations
   DCBChainHead = 420b
   xmouseloc = 424b
   ymouseloc = 425b
   xcursorloc = 426b
   ycursorloc = 427b
   clockloc = 430b // 39 ms increments
   cursorloc = 431b
   buttonsloc = 177030b
   keyboardloc = 177034b
   xpenloc = 177100b
   ypenloc = 177101b
   zpenloc = 177102b
   penpressureloc = zpenloc
  // Display Boundaries
   xmax = 605
    xmin = 0
   ymax = 807
    ymin = 0
    junkY = ymax + 4 // used for measuring
   bitsperline = xmax - xmin + 1
   maxdatnumber = 14 // must change builddcblist for more
  // I/O Manifests
   // Channel manifests
    tty = 0
    unassignedchannel = -1
    channelmax = 17
   // I/O functions
    read = 0
    write = 1
    append = 2
    readwrite = 3
   // Character Definitions
    CR = 15B
    EOF = $Z & 37b
```

```
      ESC = 33B
        escape = ESC
      FF = 14b
        formfeed = FF
      LF = 12B
        linefeed = LF
      SP = 40b
        space = SP
      BS = 10b
      TAB = 11B
      DEL = 177B
    ]

// Structures
  structure
    [
    BYTE10,177777b byte 1
    ]
  structure
    STRING:
    [
    count byte 1
    char10,255 byte 1
    ]
  structure
    BOX:
    [
    x1 word 1
    y1 word 1
    x2 word 1
    y2 word 1
    ]

  manifest boxsize = (size BOX + 15)/16

  structure
    BITBLTTABLE:
    [
    function word 1
        = [
        black bit 10
        sourcebank bit 1
        destbank bit 1
        sourcetype bit 2
        operation bit 2
        ]
    greycode word 1
    // Destination
      bca word 1
      bmw word 1
      leftx word 1
      topy word 1
      width word 1
      height word 1
    //Source
      sourcebca word 1
      sourcebmw word 1
      sourceleftx word 1
      sourcetopy word 1
    scratchgrey1 word 1
    scratchgrey2 word 1
    scratchgrey3 word 1
    scratchgrey4 word 1
    ]
  manifest bitblttablesize = (size BITBLTTABLE + 15)/16

 structure
   DCB:
   [
   link word 1
   // word boundary
   statusword word 1
     = [
     resolution bit 1 // 0 = high
     background bit 1 //0 = black on white
     horiztab bit 6 // htab * 16 bits
     wordsperscanline byte 1 // must be even
     ]
   startingaddress word 1 // must be even
   numscanlinesdiv2 word 1 // scan lines / 2 defined by this DCB
   ]
  manifest dcbsize = (size DCB + 15) / 16


 structure
   DAT: // Display Area
   [
   link word 1
   @BOX
   xoffset word 1
   width word 1 // in bits
   height word 1 // in bits
   bitblttable word 1 // address of table
   fontvec word 1
   defaultfont word 1
   statusword word 1
     = [
     resolution bit 1 // 0 = high
     background bit 1 //0 = black on white
     horiztab bit 6 // htab * 16 bits
     wordsperscanline byte 1 // must be even
     ]
   ];
 manifest datsize = (size DAT + 15) / 16

structure
  DISPLAYKANJI: // Display Kanji Structure
   [
   // Disk location (from kanji code)
    page byte 1 // really page/2
    strikeleftx bit 5 // must multiply by 18
    xlow bit 3 // lowest 3 bits of x
  xy word 1 // y = xy/80. x = (xy rem 80) * 8 + xlow
  ];
 manifest displaykanjisize = (size DISPLAYKANJI + 15) / 16

structure
  PRESSFONT:
   [
   link word 1
   name word 10
   fontset word 1
   fontnumber word 1
   firstchar word 1
   lastchar word 1
   pointsize word 1
   face word 1
   source word 1
```

```
   rotation word 1
   ]
  manifest pressfontdescsize = (size PRESSFONT + 15)/16
// jdsdecl


// Manifests
  manifest
   [
   // THESE TWO VALUES ARE IMPORTANT -- DO NOT CHANGE
     rangemarker = 0
     insertmarker = 1
   firstlookupdict = 0
   indexedtable = 0
   scannedphonic = 1
   kanjilist = 2
   repeatkanjilist = 3
   probeaddrshift = 2 // for rel addresses to probe file
   lastkanjicode = 6637b
   numkanjicodes = lastkanjicode + 1
   firstphonic = 0
   lastphonic = 123b
   filecheckword = 12345b
   magickataconstant = 123b
   pageecho = 1
   textecho = 2
   numberdateecho = 3
   filenamefeedback = 100
   editmodefeedback = 101
   appendfbstr = 102
   waitmessage = 63
   typescriptblink = 1
   insertblink = 2
   rangeblink = 3
   mindiskspace = 75
   // statistics manifests
     statschar = 1
     statscommand = 2
     statsprocedure = 3
   ]
// shifts and characters
  manifest
   [
   // Character ranges
     firstromaji = 0
     lastromaji = 174b
     firsthiragana = 200b
     lasthiragana = 473b
     firstkatakana = 500b
     lastkatakana = 773b
   // shifts
     asciishift = 0
     romanjishift = 000b
     romajishift = 000b
     hiraganashift = 200b
     katakanashift = 500b
     commandshift = 300b
   // defined character values
     bsignorebit = 40000b
     breakchar = 112000b
     breakmask = 172000b
     defaultjdschar = 376b
     jdsblankchar = 375b
     ignorebit = 20000b
     jdsCR = 10000b // tab to position 0
     kanaterminator = 401b + 177b
     numberdatephonic = 1123b // 522b + 401b
     tabcommand = 1

   // keyboard keys

     numcommandkeys = 5
     commandkeybase = 64
     altkanjikey = 36b
     //backspacekey = 17b
       backspacekey = 56b
     //readfilekey = 16b
       nextboxkey = 16b
     //commandkey = 56b // delete key
       commandkey = commandkeybase + 4
     //deletekey = commandkeybase + 2
       deletekey = commandkeybase + 1
       storekey = commandkeybase + 2
   displaykey = commandkeybase + 0
   jdsspace = 7?b
   hiraganakey = 76b
   insertkey = commandkeybase + 3
   kanjilookupkey = jdsspace
   katakanakey = 37b
   //newlinekey = 51b // CR
     newlinekey = 17b // CR (BS)
   numberdatekey = 75b
   //quitkey = commandkeybase + 4
   //breaklinekey = commandkeybase + 1
   romanjikey = 77b
   tabkey = 42b
   //writefilekey = 55b
   ]
// Function Codes
  // must re-compile initjdsstates, jdsinitcontrol when changed
  manifest
   [
   // function table idents
     nopagetable = 0
     pagetable = 1
     texttable = 2
     selecttable = 3
     numberdatetable = 4
     nofiletable = 5
   // And function codes
     nofunction = 0 // MUST BE 0
     resetfunction = 1
     inputfunction = 2
     displayfunction = 3
     deletefunction = 4
     backspacefunction = 5
     selectkanjifunction = 6
     hiraganafunction = 7
     katakanafunction = 8
     romanjifunction = 9
     romajifunction = 9
     newlinefunction = 10
     filltypescriptfunction = 11
     typescriptofffunction = 12
     selectpagefunction = 13
     setinsertfunction = 14
     setrangefunction = 15
     movetolinefunction = 16
```

```
    setbox1function = 17
    setmarkerfunction = 18
    altkanjifunction = 19
    breaklinefunction = 20
    writefilefunction = 21
    readfilefunction = 22
    tabfunction = 23
    quitfunction = 24
    insertfunction = 25
    printfunction = 26
    deleteboxfunction = 27
    setborderfunction = 28
    commandfunction = 29
    nextboxfunction = 30
    numberdatefunction = 31
    readformfunction = 32
    setboxtextfunction = 33
    printnarrowfunction = 34
    colorfunction = 35
    setbox2function = 36
    cancelfunction = 37
    storefunction = 38
    returnnopagefunction = 39
    numberoffunctions = 40
    // waitmessage = 63 must not duplicate a function number
   ]
// Mouse tracking and parsing
 manifest
   [
   // Display Window Mouse locations
     undefinedloc = 0
     leftmarginloc = 1
     rightmarginloc = 2
     typescriptloc = 3
     fullpageloc = 4
   // Button definitions
     redbutton = 4
     yellowbutton = 1
     bluebutton = 2
   ]
// Sizes and bounds
 manifest
   [
   outlinewidth = 1
   markerwidth = 7
   inputregistersize = 60
   firstdiskpage = 1
   pagedisksize = 16
   maxdocumentpages = 30
   textinc = 2
   stopfexlpos = 777/8b
   numtabsets = 12
   kanaringsize = 11
   inputringsize = 50
   commandringsize = 60
   statsringsize = 50
   kanjistacksize = 512

    // Character sizes:

     // Size 1: Print (24 + 8) X (24 + 12). Display (7 + 1) X (7 + 2)

      char1width = 7
        char1space = 1
        horizchar1size = char1width + char1space
      char1height = 7
        leading1 = 2
        vertchar1size = char1height + leading1

     // Size 2. Print (32 + 8) X (32 + 16). Display (7 + 3) X (7 + 5)

      char2width = 7
        char2space = 3
        horizchar2size = char2width + char2space
      char2height = 7
        leading2 = 5
        vertchar2size = char2height + leading2

     // Typescript Display. (18 + 6) X (20 + 7)

      tscharwidth = 18
        tscharspace = 6
        tshorizcharsize = tscharwidth + tscharspace
      tscharheight = 20
        tsleading = 7
        tsvertcharsize = tscharheight + tsleading

    // Display Areas

     // keytop area
       keywidth = 28
       keyheight = 30
       keyoffset = 10
       horizkeys = 10
       vertkeys = 3
       numkeytops = vertkeys * horizkeys

       keytopy = 50
       keytopheight = vertkeys * keyheight
       keytopwidth = horizkeys * keywidth + vertkeys * keyoffset
       keytopx = ((xmax - keytopwidth)/64) * 32
     // Message Areas (tty)
       ttyy = keytopy + keytopheight
       ttyheight = 34
       ttyx = 32
       ttywidth = 510
       // File name area
         fnamex = 0
         fnamey = 0
         fnamewidth = 183
       // Pages Left
         pagesleftx = fnamex + fnamewidth + 1
         pageslefty = 0
         pagesleftwidth = 190
       // Edit Mode
         //editmodex = fnamex + fnamewidth + 1
         //editmodey = 0
         //editmodewidth = 90
       // Typing Mode
         typemodewidth = 90
         typemodex = ttywidth - typemodewidth
         typemodey = 0
       // Message Area
         msgx = 140
         msgy = 16
         msgwidth = 370
       // current page area area
         currentpagex = 0
         currentpagey = 16
         currentpagewidth = msgx

     // Main Text Area

       textareawidth = 420
       textareaheight = 568
     // Left Margin
       leftmarginx = 0
       leftmarginwidth = 32

     // Right Margin
       rightmarginwidth = 16

     // Text Area

       lefttextmargin = leftmarginx + leftmarginwidth
       righttextmargin = lefttextmargin + textareawidth - 1
         rightmarginx = righttextmargin + 1
       textareatop = 0

       textareay = ttyy + ttyheight + 20
       textareax = ((xmax - textareawidth (leftmarginwidth -
       rightmarginwidth))/(leftmarginwidth*2))*leftmarginwidth
   ]
// structures

  structure
   JDSBOX:
    [
    @BOX
    link word 1
    // word boundary
     leading word 1 // 3 bits used
     vsize word 1 // 5 bits used
     charspace word 1 //bit 3
     hsize word 1 //bit 5
    textstartx word 1
    textstarty word 1
    text word 2
     = [
     textpos word 1
     textsize word 1
     ]
    fixedtext word 2
     = [
     fixedtextpos word 1
     fixedtextsize word 1
     ]
    markers word 2
     = [
     rangemark word 1
     insertmark word 1
     ]
    flags word 1
     = [
     borderflag bit 1
     skipboxflag bit 1
     blank bit 14
     ]
    tabsets word 1
    ]
   manifest jdsboxsize = (size JDSBOX + 15)/16

  structure
   JDSCHAR:
    [
    textpos word 1
    x word 1
    y word 1
    ]
   manifest jdscharsize = (size JDSCHAR + 15)/16
  structure
   CHAR
    [
    command bit 4
     = [
     deleted bit 1
     opcode bit 3
     ]
    code bit 12
    ]

  structure
   CHARSCANDATA
    [
    textstart word 1 // pointer to text buffer
    box word 1 // box containing text being scanned
    lasttextpos word 1 // position of last valid text character in box
    character word 1 // the result - character to be displayed
    startpos word 1 // starting position for the character
    startx word 1 // starting x coord for character
    starty word 1 // starting y coord for character
    nextpos word 1 // starting position for next character
    nextx word 1 // starting x coord for next character
    nexty word 1 // starting y coord for next charcter
    ]

   manifest charscandatasize = (size CHARSCANDATA + 15)/16

  structure
   MARK:
    [
    @JDSCHAR
    // word boundary
     type byte 1 // really 1 bit
     marked byte 1 // really 1 bit
    ]

   manifest marksize = (size MARK + 15)/16

  structure
   LOOKUPDICTHEADER:
    [
    // word boundary
     toplevel bit 1
     tabletype bit 7
     entrysize byte 1
    tablesize word 1
    ]
   manifest lookupdictheadorsize = (size LOOKUPDICTHEADER + 15)/16
  structure
```

```
[illegible]NEOPHONIC:
  [
  // [illegible] boundary
    [illegible] byte 1
    [illegible] byte 1
  next[illegible] word 1
  ]

structure
  KANJI[illegible]:
  [
  // [illegible] boundary
    key[illegible] bit 7
      [illegible] [
      [illegible]ysel bit 2
      key[illegible]s bit 5
      ]
    del[illegible]key bit 1
    part[illegible]speech bit 6
    num[illegible]ofkanji bit 3
  kan[illegible]d 1
  ]
structure
  PROC[illegible]RESS:
  [
  // word [illegible]ndary
    diskpage bit 10
    reladdr bit 6
  ]
structure
  FUNCTION:
  [
  statelist word 1
  ]
  manifest functionsize = (size FUNCTION + 15)/16

structure
  RINGBUFFER // MUST BE SAME AS OsBUF IN SYSDEFS.D
  [
  first word 1
  last word 1
  in word 1
  out word 1
  ]

  manifest ringbuffersize = (size RINGBUFFER + 15)/16

structure
  BLINKBLOCK:
  [
  @BITBLTTABLE
  bitbltproc word 1
  link word 1
  // Word Boundary
    ident byte 1
    flag byte 1
  ]

  manifest blinkblocksize = (size BLINKBLOCK + 15)/16

structure
  PAGENODISPLAY:
  [
  x word 1 // leftmost x coordinate
  y word 1 // top y
  ybase word 1 // baseline for first page number
  width word 1 // width of area
  lineheight word 1 // height of a single line
  ]

  manifest pagenodisplaysize = (size PAGENODISPLAY + 15)/16
  // basicdisplaytools

  // declarations

    get "tooldecl"
    get "fonttooldecl"


    external // Declared In This File
      [
      bitblt
      cursoroff
      cursoron
      datlist
      invertbits
      makebox
      measurechar
      measurestr
      outlinebox
      putachar
      setbits
      setdatfont
      ttydat
      writestring
      xbugoffset
      ybugoffset
      ]

    external // Declared In Other Files
      [
      asmbitblt
      boxheight
      boxwidth
      findchar
      MoveBlock
      numstrikefonts
      strikefonts
      ]


    static
      [
      datlist
      ttydat
      xbugoffset
      ybugoffset
      ]

  // Code

    let bitblt(dat, x, xbits, y, ybits, operation, source, sourcetype, grey;
    numargs n) be
      [
      let x2, y2 = MIN(dat>>DAT.width, MAX(0, x + xbits)) - 1 +
      dat>>DAT.xoffset, MIN(dat>>DAT.height, MAX(0, y + ybits)) - 1
```

```
  x = x + dat>>DAT.xoffset
  let x1 = MAX(x, dat>>DAT.xoffset)
  let y1 = MAX(y, 0)
  xbits = MAX(0, x2-x1 + 1)
  ybits = MAX(0, y2-y1 + 1)
  let bitblttable = dat>>DAT.bitblttable
  bitblttable>>BITBLTTABLE.leftx = x1;
  bitblttable>>BITBLTTABLE.width = xbits;
  bitblttable>>BITBLTTABLE.topy = y1;
  bitblttable>>BITBLTTABLE.height = ybits;
  if source ne 0 then
    [
    MoveBlock(lv bitblttable>>BITBLTTABLE.sourcebca, source,
    4);
    if x1 ne x then
    bitblttable>>BITBLTTABLE.sourceleftx =
    bitblttable>>BITBLTTABLE.sourceleftx + (x1-x)
    if y1 ne y then
    bitblttable>>BITBLTTABLE.sourcetopy =
    bitblttable>>BITBLTTABLE.sourcetopy + (y1-y)
    ];
  bitblttable>>BITBLTTABLE.sourcetype = sourcetype;
  bitblttable>>BITBLTTABLE.operation = operation;
  bitblttable>>BITBLTTABLE.greycode = IN(grey, colorwhite, colorblack)?
  table[ 0;
  101202b; 12050b; 36074b; 55132b; 125125b; 165727b; 76575b; -1 ]
  !grey, grey;
  asmbitblt(bitblttable);
  ];
and biton(dat,x,y) be  // turns on the bit at x,y
  [
  setbits(dat, x,1,y,1)
  ]
and bitoff(dat, x,y) be  //turns off the bit at x,y
  [
  setbits(dat, x,1,y,1, colorwhite)
  ]
and cursoroff() be
  clear(cursorloc, 16)
and cursoron(bitmap, xoff, yoff; numargs n) be
  [
  xbugoffset = xoff
  ybugoffset = yoff
  if n eq 0 then
    [
    bitmap = table[ 200b; 200b; 200b; 200b; 200b; 200b; 200b; 77777b;
    200b; 200b; 200b; 200b; 200b; 200b; 200b; 0 ]
    xbugoffset = 8
    ybugoffset = 7
    ];
  MoveBlock(cursorloc, bitmap, 16)
  ];

and invertbits(dat, x, xbits, y, ybits, grey; numargs n) be
  [
  if n eq 5 then grey = colorblack
  bitblt(dat, x, xbits, y, ybits, invertfunction, 0, constantsource,
  grey);
  ];
and makebox(x1,y1,x2,y2) =
  valof[
  // makes a box with x1,y1 as top left and x2,y2 as bottom right
  let box = getmem(boxsize)
  box>>BOX.x1 = MAX(0, x1)
  box>>BOX.y1 = MAX(0, y1)
  box>>BOX.x2 = x2
  box>>BOX.y2 = y2
  resultis box
  ]
and measurechar(char, font; numargs n) =
  valof[
  if n eq 1 then
    font = strikefonts!(MAX(0, MIN(char rshift 8, numstrikefonts-1)))
  let badchar = font>>STRIKESEG.maxchar + 1
  char = char & 177b
  unless IN(char, font>>STRIKESEG.minchar, badchar) do char = badchar
  char = char - font>>STRIKESEG.minchar
  if char is 0 then char = badchar
  let xtable = font>>STRIKESEG.xtable
  resultis xtable!(char + 1) - xtable!char
  ]
and measurestr(string, font; numargs n) =
  valof[
  if n eq 1 then
    font = strikefonts!0
  let count = string>>STRING.count-1
  let x = 0
  for i = 0 to count do
    x = x + measurechar(string>>STRING.char↑i, font)
  resultis x
  ]

and outlinebox(dat, box) be
  [
  manifest outlinewidth = 1
  let width = boxwidth(box) + outlinewidth*2
  let height = boxheight(box)
  let x1p = box>>BOX.x1-outlinewidth
  let y1 = box>>BOX.y1
  // Horizontal lines
    invertbits(dat, x1p, width, y1-outlinewidth, outlinewidth,
    colorblack)
    invertbits(dat, x1p, width, box>>BOX.y2 + 1, outlinewidth,
    colorblack)
  // vertical lines
    invertbits(dat, x1p, outlinewidth, y1, height, colorblack)
    invertbits(dat, box>>BOX.x2 + 1, outlinewidth, y1, height,
    colorblack)
  ];

and writestring(dat, string, x, y, font; numargs n) =
  valof[
  switchon n into
    [
    case 0:
    case 1:
    case 2:
    case 3:
      callerror("insufficient Args (writestring)")
    case 4:
      font = 0
    ]
  // Write a string -- do not check for overflow
  let count = string>>STRING.count-1
  let savex = x
  for i = 0 to count do
    x = x + putachar(dat, font lshift 8 + string>>STRING.char↑i, x, y)
```

```
resultis x - savex
];

and putachar(dat, char, x, y, font; numargs n) =
valof[
// y points to baseline

test n eq 3
 ifso // special for tty simulation
   [
   font = x
   y = 0
   ];
 ifnot
   if n ne 5 then
     [
     font = strikefonts!(MAX(0, MIN(char rshift 8,
     numstrikefonts-1)))
     ];
char = char & 177b
let bitbltable = dat>>DAT.bitbltable
if n ne 3 then
  setdatfont(dat, font, x, y)
test font>>STRIKESEG.strikelist ne 0
 ifso
   [
   char = findchar(font>>STRIKESEG.strikelist, char) - 1
   if char is 0 then char = font>>STRIKESEG.maxchar + 1
   ];
 ifnot
   [
   let badchar = font>>STRIKESEG.maxchar + 1
   unless IN(char, font>>STRIKESEG.minchar, badchar) do char =
   badchar
   char = char - font>>STRIKESEG.minchar
   ];
let xtable = font>>STRIKESEG.xtable
bitbltable>>BITBLTTABLE.sourceleftx = xtable!char +
font>>STRIKESEG.xoffset
let width = xtable!(char + 1) - xtable!char
bitbltable>>BITBLTTABLE.width = width
if y ls dat>>DAT.height then
  [
  asmbitblt(bitbltable)
  ];
resultis width
];
and setdatfont(dat, font, x, y; numargs n) be
// Dest
[ // set up bitblt table for this font
let bitbltable = dat>>DAT.bitbltable
let yclipped = 0
if n eq 1 then font = dat>>DAT.defaultfont
  if n gr 2 then
    [
    bitbltable>>BITBLTTABLE.leftx = x + dat>>DAT.xoffset // start in
    upper left corner (y)
    if n gr 3 then
      [
      let ystart = y - font>>STRIKESEG.ascent
      yclipped = MAX(-ystart, 0)
      bitbltable>>BITBLTTABLE.topy = ystart + yclipped // start in
      upper left corner (y)
      ];
    ];
  bitbltable>>BITBLTTABLE.height = MAX(0,
  MIN(dat>>DAT.height-bitbltable>>BITBLTTABLE.topy,
  font>>STRIKESEG.height-yclipped))
 // Source
  bitbltable>>BITBLTTABLE.sourcebca = font>>STRIKESEG.sourcebca //
  address of bit map
  bitbltable>>BITBLTTABLE.sourcebmw = font>>STRIKESEG.sourcebmw //
  width of bit map
  bitbltable>>BITBLTTABLE.sourcetopy = yclipped // start in upper
  left corner (y)
  bitbltable>>BITBLTTABLE.sourcetype = blocksource
 ];
and setbits(dat, x, xbits, y, ybits, grey; numargs n) be
  [
  switchon n into
    [
    case 1: // entire dat black
      x = colorblack
    // ***FALL THROUGH***
    case 2: //
      test IN(x, 0, 10) // see if it is a color
        ifso // dat to color
          [
          grey = x
          x, y = 0, 0
          xbits = dat>>DAT.width
          ybits = dat>>DAT.height
          endcase
          ];
        ifnot // dat, box black
          xbits = colorblack

    // ***FALL THROUGH***
    case 3: // dat, box grey
      [
      let box = x
      grey = xbits
      x = box>>BOX.x1
      y = box>>BOX.y1
      xbits = boxwidth(box)
      ybits = boxheight(box)
      endcase
      ];
    case 4: // dat, indicated bits black
      ybits = 1
    case 5: // dat, indicated bits black
      [
      grey = colorblack
      endcase
      ];
    ];
  bitblt(dat, x, xbits, y, ybits, replacefunction, 0, constantsource,
  grey)
  ];
```

```
; CHASCAN Micro Code -- charscan.mu

;COME HERE TO SCAN A SINGLE CHARACTER

;CONST DEF

 $TISIZEDISP      $10;
 ;$DELETEDCODE    $376; = 377-1
 ;$COMMANDMASK    $70000; = 170000 AND 77777 (OR 160000 RSH 1)
  $170000      $170000;
 $DELETEDBIT   $100000;

;R/S REG DEF

 $LREG            $R40;
   $TEMP0         $R60;
    $TEXTPTR      $R60;
    $CHARSAVE     $R60;
   $TEMP1         $R61;
    $NEXTY             $R61;
    $BOX          $R61;
    $...          $R61;
   $TEMP2         $R62;
    $LASTTEXTPOS       $R62;
    $TSIZE        $R62;

   $STARTXADDR    $R63;
   $NEXTPOS            $R64;
   $NEXTX         $R65;

; Labels

 !L2 GETCHAR,RETURN2;
 !L2 DELCHAR1,DELCHAR2;
 !L2 RETURN3,COMNEWX;
 !L2 UPDATE,RETURN4;

; FORMAT OF CHARSCANDATA
;AC0 = pointer to table (even word boundary)

 ;Word [0] = Text pointer
 ;Word [1] = Box address
 ;Word [2] = Last Text Pos in box
 ;Word [3] = Character [Returned]
 ;Word [4] = Start Pos [Returned]
 ;Word [5] = Start X [Returned]
 ;Word [6] = Start Y [Returned]
 ;Word [7] = Next Pos [Returned]
 ;Word [10] = Next X [Returned]
 ;Word [11] = Next Y

CHARSCAN:

; *****TEMP2 is LASTTEXTPOS*****
  ; Get Last Text Pos

    T+2;

   MAR+AC0 + T;              GET LASTTEXTPOS
    ;RETURN CHARSCANDATA POINTER IN AC1
     L+T+AC0;
     AC1+L;
    L+MD;

 ; AC0, AC1 CONTAIN POINTER TO CHARSCANDATA
 ; T CONTAINS CHARSCANDATA POINTER
 ; L CONTAINS LASTTEXTPOS

 ; Get Next Pos, x, and y

   MAR+7 + T, T+7,             GET NEXTPOS
    LASTTEXTPOS+L,             STORE LASTTEXTPOS
    L+AC1 + T,T+AC1;
    AC0+L,          POINTER TO NEXTPOS
    L+MD;


   ; T CONTAINS CHARSCANDATA POINTER
   ; AC0 CONTAINS POINTER TO NEXTPOS
   ; L CONTAINS NEXTPOS

   MAR+4 + T,T+4,
    NEXTPOS+L,
    L+AC1 + T,TASK,
   MD+NEXTPOS;                 START POS+NEXTPOS

  ; LREG CONTAINS POINTER TO STARTPOS

  MAR+T+AC0 + 1;               GET NEXT X
   L+L,T+LREG; L + NEXTX ADDR, T + START POS ADDR
   AC0+L,L+T;
   STARTXADDR+L;
   L+MD;

  ; L CONTAINS NEXT X
  ; AC0 CONTAINS POINTER TO NEXT X

  MAR+T+STARTXADDR + 1;
   NEXTX+L,L+T;
   STARTXADDR+L,TASK;
   MD+NEXTX;             STARTX+NEXTX

  ; AC0 CONTAINS POINTER TO NEXT X

  L+MAR+AC0 + 1;               GET NEXT Y
   AC0+L,TASK;
   L+MD;

; *****TEMP1 is NEXTY*****

  ; AC0 CONTAINS POINTER TO NEXT Y
  ; LREG CONTAINS NEXT Y

  MAR+STARTXADDR + 1;
   L+LREG;
   NEXTY+L,TASK;
   MD+NEXTY;            STARTY+NEXTY

; here AC0 points to next pos (NEXTPOS)

;>>>>> SEE IF CHAR IS VALID <<<<<

 T+NEXTPOS;                    T = NEXTPOS
 L+LASTTEXTPOS-T;              LASTTEXTPOS-NEXTPOS
 SH<0,TASK;
  :GETCHAR;
```

```
GETCHAR:

; *****TEMP0 is TEXTPTR *****
  MAR←AC1; address of TEXTPTR
    ; Compute (NEXTPOS + 1)/2

      L←NEXTPOS + 1;
      AC0←L RSH 1;
    L←MD,
  TEXTPTR←L; save text pointer
  T←TEXTPTR;
  MAR←AC0 + T;              TEXTPTR[(NEXTPOS + 1)/2
    ; Update NEXTPOS
      T←2;
      L←NEXTPOS + T;
      NEXTPOS←L;
    L←MD TASK;  Read the Character
; *****TEMP0 is CHARSAVE *****
    CHARSAVE←L;

;>>>>> CHECK FOR COMMAND <<<<<

  :T←COMMANDMASK;
    T←170000,
  L←CHARSAVE AND T;          LREG = CHARACTER & COMMANDMASK
  AC0←L LSH 1 SH=0;
    RETURN3;                 [RETURN3 , COMNEWX:]

;>>>>> COMPUTE NEW X <<<<<

COMNEWX:
  ; *****TEMP1 is BOX *****
  ; Get Box address
    MAR←AC1 + T;             Box address
      NOP
      L←MD,TASK;
    BOX←L;

    *****TEMP2 is HSIZE *****
    Get HSIZE
     T←HSIZE DISP;
    MAR←BOX + T;             HSIZE

      NOP;
      L←MD,TASK;
     HSIZE←L;

    ; Get X2 + 1
      T←2;
      MAR←BOX + T;           X2
        NOP;
        L←MD + 1,TASK;              X2 + 1
    ; *****TEMP1 is X2 *****
        X2 ← L;

    ; Compute (X2 + 1)-(STARTX + HSIZE)
      T←HSIZE;
        L←NEXTX + T;         NEWX = STARTX + HSIZE
        NEXTX←L;
        T←NEXTX;
      L←X2-T;          (X2 + 1)-(STARTX + HSIZE)

    SH<0,TASK;
      :UPDATE;

;>>>>> UPDATE X,NEXTPOS <<<<<

    UPDATE:

    T←7;
    L ← MAR←AC1 + T;
      AC0 ← L;
      MD←NEXTPOS;

    MAR←AC0 + 1;                    X←(STARTX + HSIZE)
      NOP;
      MD←NEXTX;

;>>>>> CHECK FOR DELETED CHARACTETER <<<<<

    T←DELETEDBIT;         DELETEDBIT = 100000
    L←CHARSAVE AND T;
    SH=0

      :DELCHAR1;

DELCHAR1:
    L←377,TASK;   DELETEDCODE = 376
    CHARSAVE←L;

DELCHAR2:
    T←CHARACTER ADDRESS
    MAR←AC1 + T;
      L←CHARSAVE;
      AC0←L;
      MD←CHARSAVE, :EXIT;

;>>>>> RETURN ADR <<<<<

RETCHAR:
  CHARSAVE←L;
  L←PC + T; ; called with return inc in T
  PC←L, :DELCHAR2;

RETURN2:
  L←ALLONES-1, RETURN -2 IN AC0
  T←2-1, RETCHAR, NOT WITHIN BOX

RETURN3  RETURN COMMAND IN AC0
  L←CHARSAVE;
  T←2,RETCHAR.          COMMAND

RETURN4  RETURN -1 IN AC0
  L←ALLONES; -1
  T←3 RETCHAR.          OFF RIGHT OF BOX
  ; jdsasm

  .get "altasmdecl"

  ; ****** externals *********
    .bext setcharscan
    .bext scanchar
    .bext movejdschar
    .bext endoftext
    .bext getjdschar
    .bext infixedtext
    .bext intextbox
```

```
    .bext setjdschar
    .bext jdstext
    .bext typescriptbox

; ****** SRELS *********
  .srel
   ;let setcharscan(box, jdschar) be
     setcharscan: setcharscanx
   ;let scanchar() = // return address of [char; startx, starty, pos, right x, right y]
     scanchar: scancharx
   ;let movejdschar(destjdschar, sourcejdschar) =
     movejdschar: movejdscharx
   ;let infixedtext(box, textpos) =
     infixedtext: infixedtextx
   ;let intextbox(box, textpos) =
     intextbox: intextboxx
   ;let getjdschar(textpos) =
     getjdschar: getjdscharx
   ;let setjdschar(box, jdschar) =
     setjdschar: setjdscharx
   ;let endoftext(textpos) =
     endoftext: endoftextx
.nrel
 ; misc decls
   getframe = 370
   return = 366
 ; definition of JDSBOX
   x1 = 0
   y1 = 1
   x2 = 2
   y2 = 3
   leading = 5
   vsize = 6
   charspace = 7
   hsize = 10
   textstartx = 11
   textstarty = 12
   textpos = 13
   textsize = 14
   fixedtextpos = 15
   fixedtextsize = 16
   linestarts = 21
   nlines = 22

 ; definition of JDSCHAR
   jdscharpos = 0
   jdscharx = 1
   jdschary = 2

 ; definition of CHARSCANDATA
   textptr = 0
   charbox = 1
   lasttextpos = 2
   character = 3
   startpos = 4
   startx = 5
   starty = 6
   nextpos = 7
   nextx = 10
   nexty = 11

 ; movejdschar(dest, source)
   movejdscharstk 0
   movejdscharx:
     ; move the jds char (3 words)
     inc 3,3
     sta 3,1,2
     sta 2 movejdscharstk
     mov 0,2; dest in 2
     mov 1,3; source in 3
     lda 0,0,3
       sta 0,0,2
     lda 0,1,3
       sta 0,1,2
     lda 0,2,3
       sta 0,2,2
     lda 2,movejdscharstk
     jmp @1,2

; setjdschar(box, jdschar) =
  setjdsret: 0
  setjdsstk: 0
  setjdscharx:
    inc 3,3
    sta 3,setjdsret
    mov 0,3,snr
      jmp @setjdsret; no box
    sta 2 setjdsstk; save stack
    mov 1,2; jdschar ptr
    ; textpos
      lda 1,textpos,3
      neg 1,1
      com 1,1
      sta 1,jdscharpos,2 ; textpos - 1
    ; x
      lda 1,textstartx,3
      lda 0,x1,3
      add 0,1
      sta 1,jdscharx,2
    ; y
      lda 1,textstarty,3
      lda 0,y1,3
      add 0,1
      sta 1,jdschary,2
    lda 2,setjdsstk
    jmp @setjdsret

; getjdschar(textpos) =
  getjdscharret 0
  getjdscharx:
    inczr 0,0,snr
      jmp n1ret, pos is 0
    inc 3,3
    sta 3 getjdscharret
    lda 3,@jdstext
    lda 1,1,3; max pos + 1
    add 0,3, pos
    sub 0,1
    lda 0,0,3, char
    skg0 1,1
      none 0,0, return -1 if no char
    jmp @getjdscharret
  n1ret
    none 0,0
    jmp 1,3

jdstext jdstext
```

```
; infixedtext(box, textpos) =
  infixedtextx:
    skn0 0,0
      jmp 1,3; no box
    inc 3,3
    sta 3,intextboxret
    mov 0,3; box
    lda 0 fixedtextpos,3
    lda 3,fixedtextsize,3
    add 0,3
    inc 1,1
    skg 0,1
    skle 1,3
      clr 0,0,skp
    none 0,0
    jmp @intextboxret

; intextbox(box, textpos) =
  stoppos: 77776
  intextboxret: 0
  intextbox2: 0
  intextboxx:
    skn0 0,0
      jmp 1,3; no box
    inc 3,3
    sta 3,intextboxret
    sta 2,intextbox2
    mov 0,3; box
    lda 0 textpos,3
    lda 2 stoppos
    skn 0,2
      jmp notintextbox
    lda 3 textsize,3
    add 0,3
    inc 1,1
    skg 0,1
    skle 1,3
  notintextbox:
      clr 0,0,skp
    none 0,0
    lda 2,intextbox2
    jmp @intextboxret


; endoftext(textpos) =
  endoftextx:
    inczr 0,0,snr
      jmp 1,3; 0 is true
    inc 3,1
    lda 3,@ jdstext
    lda 3,-1,3; last pos
    skg 3,0; skip if legit pos
      none 0,0,skp
    clr 0,0; ok
    mov 1,3
    jmp 0,3

; setcharscan(box, jdschar, charscandata)

commandmask: 070000
setcharscanx:
  ; return address of charscandata
  inc 3,3
  sta 3,1,2
  ; get address of charscandata unless passed
    lda 3,-1,3; numargs
    movzr 3,3 snc; only possibilites are 2 and 3
      jmp .+3
        lda 3 3,2; passed as arg
        jmp gotcharscandata
    ; by here, use our own table
      jsr gotcharscandata
        .blk 12; charscandata


    gotcharscandata: ; address of data block is in 3
  sta 3 charscandata
  sta 2,scancharstk
  sta 0,charbox,3
    mov 1,2; jdschar
  lda 1,jdscharpos,2
    sta 1,startpos,3
    sta 1,nextpos,3
    jsr intextboxx; make sure it is a legal pos
      2
    ske0 0,0; skip if not
      jmp setcharscan1
      ; by here, set jds char
        lda 3 charscandata
        lda 0 charbox,3
        mov 2,1; jdschar
        jsr setjdscharx
          2
        lda 3 charscandata
        lda 1 jdscharpos,2; get proper pos
        sta 1,startpos,3
        sta 1 nextpos,3
  setcharscan1:
    lda 3,charscandata
    set up textptr
     lda 0,@ jdstext
     inczr 1,1; (pos + 1)/2
     add 1,0; ptr to char
    sta 0 textptr,3
  lda 1 jdscharx,2
    sta 1,nextx,3
    sta 1 startx,3
  lda 1 jdschary,2
    sta 1 nexty,3
    sta 1 starty,3
    calculate last text pos
    lda [illegible]
    lda 0 textpos,2
    lda 1 [illegible]size,2
    add 0,1; last pos in box
    lda 3 [illegible] jdstext
    lda 0 -1,3; max pos + 1
    movzl 0,0; *2
    skle 1,0
      mov 0,1; max is end of text
    lda 0 [illegible]
    add 0,1; back up to valid character position
     lda 3,charscandata
     sta 1,lasttextpos,3
  ; now return
  mov 3,0; address of charscandata
  lda 2,scancharstk
  jmp @1,2
```

```
scancharstk: 0

lit2: 2
lit5: 5

; scanchar(charscandata)

scancharx: ; come here to scan a single character

  ; update char data, and return char
  ; return -1 if out of box
  ; return -2 if off end of text



   63000; call microcode scanchar
     jmp 1,3
     jmp badchar
     jmp command
     jmp ovflw

  recall:
    lda 2,scancharstk
    lda 1,1,2; load return loc as second arg
    ; now BCPL procedure header
      sta 3,1,2
      jsr @getframe
        10
      jmp .+1
      lda 0 4,2; load charscandata
      jsr scancharx
        1
      lda 1 5,2; load return loc as second result
      jmp @return


  ovflw: ; come here when overflow line

    ; save registers, etc.
      inc 3,3
      sta 3 1,2
      sta 1 charscandata
      sta 2,scancharstk
    mov 1,3
    lda 2 charbox,3
      jsr nextline
        jmp badchar1, box overflow

    lda 0 charscandata
    jsr recall
      1
    jmp recalldone


  badchar:; return -2
    none 0,0
    movzl 0,0; -2
    jmp 1,3; return

  badchar1:; return -1
    none 0,0, -1


    lda 3 charscandata
    sta 0 character,3
    ; restore x, y, pos for next call
      lda 1 startx,3
        sta 1,nextx,3
      lda 1,starty,3
        sta 1,nexty,3
      lda 1,startpos,3
        sta 1,nextpos,3

  scanchardone:
    lda 2 scancharstk
    jmp @1,2

  recalldone:
    ; come here with AC0 = result, AC1 = return loc for call
       sta 1,1,2; return loc
       jmp @1,2

    blankjdschar: 375
    charscandata: 0
    deletedjdschar: 376
      command: ; come here with char in 0, box in 2

        ; save registers, etc.
          inc 3,3
          sta 3,1,2
          sta 1,charscandata
          sta 2,scancharstk
        sta 0,savechar
        lda 3,charscandata
        lda 2,charbox,3
        ; check for ignore

          lda 3 @.typescriptbox
          lda 1,ignorebit
          skn 2,3; skip unless typescript box
            movzl 1,1; make typescript ignore
          and # 0,1,szr
            jmp ignorechar
        ; now check for tab
          lda 1 tabcommand
          and # 1,0,szr, skip unless tab bit set
            jmp tabchar
         ; by here, treat it as a normal char
           ; mask off ignore bits and re scan
            lda 1,ignoremask
            and 1,0
            lda 3,charscandata
            lda 1,nextpos,3
            inczr 1,1; (pos + 1)/2
            lda 3,textptr,3
            add 1,3
            sta 3,saveptr
            sta 0 0,3; mask off ignore bits in char
            lda 0 charscandata
            jsr recall
              1
            ; restore character
              lda 3,savechar
              sta 3,@saveptr
            jmp recalldone

        savechar: 0
        saveptr: 0
        savepos: 0
```

```
ignorechar:

   ; by here, don't display this character
   lda 3 charscandata
   lda 0,nextpos,3
   sta 0 savepos
   inc 0,0
   inc 0,0
   sta 0,nextpos,3
   mov 3,0
   jsr recall
     1
   sta 1,scancharstk; save return loc
   ; restore startpos
     lda 3,charscandata
     lda 1,savepos
     sta 1,startpos,3

   lda 1 scancharstk; restore return loc
   jmp recalldone;

tabchar: ; come here on tabs
   ; 0 is command
   ; 2 is box
   ; calculate x
     ; see if special kludge for line splitting, specifically,
      ; bit 4 = 0 for small 1 for big
      ; bit 5 = 1
   lda 1 kludgemask; to see if line split character
   and 0 1,szr
     jmp splitline

   ; by here, normal tab
   jsr gettabx
   ; by here, new x is in 1
   ; erase possible bad character
     clr 0,0
   ; see if it will fit on this line
     lda 3,charscandata
     lda 3,nextx,3
     skge 3,1
       jmp tabchar1; on this line
     skge0 3,3
       jmp tabchar1; charx was negative
   ; by here, not on this line
     jsr newline; set up for next line
       jmp badchar1; box overflow
     neg 1,1
       com 1,1; decrement x
     lda 3,charscandata
       sta 1,nextx,3 ; make sure it will go on next line
     lda 1,startx,3
       sta 1,savex
     lda 1,starty,3
       sta 1,savey
     mov 3,0
     jsr recall
       1
     lda 3,charscandata
     sta 1,save1
     lda 1,savex
       sta 1,startx,3
     lda 1,savey
       sta 1,starty,3
     lda 1,save1
     jmp recalldone

   save1: 0
   savex: 0
   savey: 0

   tabchar1:
     ; x is in 1
     lda 0 blankjdschar; tab looks like a blank character
     ; check to see if it is deleted
       lda 3,savechar; get character
       movl 3 3 szc
         lda 0,deletedjdschar; it is a deleted tab
       lda 3 charscandata
       sta 0 character,3; and store it
     lda 2 x2,2
     sgt 1 2; check for overflow
       mov 0 1; noop bad tabs
     sta 1,nextx,3; next x
     isz nextpos,3
     isz nextpos,3
     lda 0,character,3; get character
     jmp scanchardone


newlineret: 0
newline: ; come here to go to new line
  ; called with normal jsr
  ; by here 2 = box
  ; return with 2 = box, 1 = new x
  ; no skip return if overflow in y direction
  ; save ret loc
    inc 3,3
    sta 3 newlineret
  lda 3,charscandata
  ; update y
    lda 1,nexty,3
    lda 0,vsize,2
    add 0 1
    sta 1,nexty,3; new y
  ; and check for overflow
    add 0 1 ; see if next line (bottom of this one) is in box
    lda 0 y2,2
    inc 0,0
    skge 0 1
      dsz newlineret; no skip return if off of box
  ; set up x
    lda 1,x1,2
    sta 1 nextx,3
  ; now return
    jmp @newlineret

splitline: ; come here for special kludge for line splitting
    ; bit 4 = 0 for non typescript, 1 for typescript
    ; bit 5 = 1
     ; AC1 = 6000 for typescript
    ; AC1 = 2000 for non typescript
    ; assumes small size = 10, big = 30

; test bit 4 to see if we are in the right box
  lda 3 @ typescriptbox;
  lda 1,c2000
  skn 2,3
    lda 1,kludgemask
  lda 3,kludgemask
  and 0,3
  ske 1,3; skip if same as size
    jmp ignorechar; nope -- ignore it
  ; by here, we have a split line command
  ; treat it like a tab
    lda 1,tabmask
    and 1,0
    jmp tabchar

.typescriptbox: typescriptbox
c36: 36
c2000: 2000
tabmask: 1777
bighsize: 30
kludgemask: 6000
tabcommand: 010000
ignorebit: 020000
ignoremask: 117777
charmask: 007777

gettabret: 0
gettabx:
  ; called with tab char in 0, box in 2
  sta 3,gettabret
  ; get pos
    lda 1,charmask
    and 0,1; relative x
  ; adjust to character boundary
    lda 3,hsize,2
    neg 3,3
    adc 3,1
    clr 0,0
    mov 2,3; save box
    lda 2,hsize,3
    div; number of characters into ac1
      clr 1,1; overflow
    lda 0,x1,3; to add in box left bound
    mul; and multiply, adding in x1
    ; by here, ac1 contains x1
    mov 3 2; restore box
    jmp @gettabret
.end
```

```
// jdsboxes jdsboxes.ext

// Declarations

  get "lookdecl"
  get "jdsdecl"

  external // Declared in This File
    [
    createjdsbox
    deletejdsbox
    displaytypescriptbox
    emptytypescriptbox
    filltypescriptbox
    outlinejdsbox
    setboxborder
    setboxtext
    setjdsboxbounds
    ]

  external // Declared in Other Files
    [
    appendjdschar
    boxheight
    boxwidth
    createmarker
    displayjdsbox
    expandbox
    findjdsbox
    findleftxy
    fpbitblt
    fpinvertbits
    fpsetbits
    insertfpos
    invertbits
    jdsboxlist
    jdscommandx
    jdscommandy
    jdsrfat
    jdstextareax
    jdstextareay
    jdstext
    markeroff
    markeron
    marktext
    MoveBlock
    readfpos
    reallocatetextdisplay
    setjdschar
    setbits
    setjdschar
    typescriptbox
    waitms
    ]

// Code
 let filltypescriptbox(state, value) be
   [
   let x, y = jdscommandx - textareax, jdscommandy - textareay
   let box = findjdsbox(x, y, jdsboxlist)
   let boxtextsize, boxtextpos = box>>JDSBOX.textsize, box>>JDSBOX.textpos
   if box eq 0 then return
   let textpos = 0
   unless box>>JDSBOX.fixedtextpos eq 0 do
     unless box>>JDSBOX.fixedtextsize eq 0 do
        [
        let x1 = box>>JDSBOX.x1
        let y1 = box>>JDSBOX.y1
        let starty = box>>JDSBOX.textstarty-1
        if starty gr 0 do
          if IN(y, y1, y1 + starty) then x = x1
        if IN(x, x1, x1 + MAX(0, box>>JDSBOX.textstartx-1)) then
          if IN(y, y1, box>>JDSBOX.y1 + starty + box>>JDSBOX.vsize) then
            textpos = box>>JDSBOX.fixedtextpos-1
        ]
```

```
if textpos eq 0 then
  textpos = selectjdschar(box, x, y)
if textpos eq 0 then
  textpos = box>>JDSBOX.textpos-1
if textpos le 0 then return
markeroff(insertmarker)
markeroff(rangemarker)
let oldtextpos = typescriptbox>>JDSBOX.textpos
until oldtextpos eq stoptextpos do // unmark text
  marktext(oldtextpos, oldtextpos + typescriptbox>>JDSBOX.textsize)
typescriptbox>>JDSBOX.textpos = (textpos + 1) & -2
typescriptbox>>JDSBOX.textsize = MAX(0, boxtextsize -
(typescriptbox>>JDSBOX.textpos - boxtextpos))
typescriptbox>>JDSBOX.insertmark>>MARK.textpos = 0
typescriptbox>>JDSBOX.rangemark>>MARK.textpos = 0
displaytypescriptbox()
markeron(rangemarker, rangepos)
markeron(insertmarker, insertpos)
]

and emptytypescriptbox(state, value) be
[
if typescriptbox>>JDSBOX.textpos eq stoptextpos then return
markeroff(insertmarker)
markeroff(rangemarker)
typescriptbox>>JDSBOX.textpos = stoptextpos
typescriptbox>>JDSBOX.textsize = 0
displaytypescriptbox(false)
markeron(rangemarker, rangepos)
markeron(insertmarker, insertpos)
]

and displaytypescriptbox(onflag; numargs n) be
[
if n eq 0 then onflag = true
let textpos = typescriptbox>>JDSBOX.textpos-1
test onflag
 ifso
  [
  unless typescriptbox>>JDSBOX.textpos ne stoptextpos do return

  // mark/unmark text
   marktext(textpos, textpos + typescriptbox>>JDSBOX.textsize)

  // Set top and bottom lines
   setbits(jdsdat, leftmarginx, rightmarginx + rightmarginwidth - leftmarginx,
   typescriptbox>>BOX.y1-2, 2, colorblack)

   setbits(jdsdat, leftmarginx, rightmarginx + rightmarginwidth - leftmarginx,
   typescriptbox>>BOX.y2 + 1, 2, colorblack)

  // Clear out area
   setbits(jdsdat, leftmarginx, rightmarginx + rightmarginwidth - leftmarginx,
   typescriptbox>>BOX.y1, boxheight(typescriptbox), colorwhite)


  // display contents
   displayjdsbox(typescriptbox)
  ]
 ifnot
  [
  // mark/unmark text
   marktext(textpos, textpos + typescriptbox>>JDSBOX.textsize)
  // and restore the display
   restoretextdisplay(typescriptbox>>BOX.y1-2, typescriptbox>>BOX.y2 + 2)
  ]
]
and createjdsbox(state, value; numargs n) =
 valof[
 let box = getmem(jdsboxsize)
 clear(box, jdsboxsize)
 let x = MAX(0, jdsmousex - textareax)
 let y = MAX(0, jdsmousey - textareay)
 if n eq 1 then value = 1
 test value eq 2
  ifso // Size 2 characters
   [
   box>>JDSBOX.hsize = horizchar2size
   box>>JDSBOX.vsize = vertchar2size
   box>>JDSBOX.leading = leading2
   box>>JDSBOX.charspace = char2space
   ]
  ifnot // size 1 characters
   [
   box>>JDSBOX.hsize = horizchar1size
   box>>JDSBOX.vsize = vertchar1size
   box>>JDSBOX.leading = leading1
   box>>JDSBOX.charspace = char1space
   ]


 test n eq 1
  ifso // copy box coords from state
   [
   MoveBlock(box, state, boxsize)
   value = 1
   ]
  ifnot // get box coords from mouse
   [
 let linkedbox = findjdsbox(x, y, typescriptbox>>JDSBOX.link)
 test linkedbox eq 0
  ifso
   [
   box>>BOX.x1 = x
   box>>BOX.y1 = y
   ]
  ifnot
   [
   let xbox = vec 3
   expandbox(linkedbox, xbox)
   test (x - linkedbox>>JDSBOX.x1) ls (linkedbox>>JDSBOX.x2 - x)
    ifso // below old box
     [
     box>>JDSBOX.x1 = linkedbox>>JDSBOX.x1 -
     linkedbox>>JDSBOX.charspace + box>>JDSBOX.charspace

     box>>JDSBOX.y1 = xbox>>BOX.y2 + outlinewidth +
     box>>JDSBOX.leading + 1
     ]
    ifnot // to the right
     [
     box>>JDSBOX.x1 = xbox>>BOX.x2 + outlinewidth +
     box>>JDSBOX.charspace + 1
     box>>JDSBOX.y1 = linkedbox>>JDSBOX.y1 -
     linkedbox>>JDSBOX.leading + box>>JDSBOX.leading
     ]
   ]
 box>>BOX.x2 = box>>BOX.x1
 box>>BOX.y2 = box>>BOX.y1
```

```
   ]
 appendjdschar(jdsCH, false) // suppress updating
 box>>JDSBOX.textpos = (jdstextf-1) lshift 1
 box>>JDSBOX.textstartx = 0
 box>>JDSBOX.textstarty = 0
 box>>JDSBOX.borderflag = true
 box>>JDSBOX.skipboxflag = 0
 box>>JDSBOX.insertmark = createmarker(box, insertmarker)
 box>>JDSBOX.rangemark = createmarker(box, rangemarker)
 // set tabs
  let tabsets = getmem(numtabsets)
  box>>JDSBOX.tabsets = tabsets
  let tabpos = 5
  for i = 1 to numtabsets do
   [
   tabsets!(i-1) = tabpos * box>>JDSBOX.hsize
   tabpos = tabpos + 5
   ]
 verifybox(box)
 if n eq 1 then resultis box
 let lastbox = jdsboxlist
  while lastbox>>JDSBOX.link ne 0 do
   lastbox = lastbox>>JDSBOX.link
  lastbox>>JDSBOX.link = box
 outlinejdsbox(box)
 ]
and verifybox(box) be
 [
 // fix box to be in within text area bounds
 let xbox = vec 3
 let charspace = box>>JDSBOX.charspace
 let leading = box>>JDSBOX.leading
 expandbox(box,xbox);
 // first implement gridding
  [
  xbox>>BOX.x1 = xbox>>BOX.x1 - ((xbox>>BOX.x1-outlinewidth) & 1)
  xbox>>BOX.x2 = xbox>>BOX.x2 + ((xbox>>BOX.x2 + outlinewidth) & 1)
  xbox>>BOX.y1 = xbox>>BOX.y1 - ((xbox>>BOX.y1-outlinewidth) & 1)
  xbox>>BOX.y2 = xbox>>BOX.y2 + ((xbox>>BOX.y2 + outlinewidth) & 1)
  ]
 // now do left and right sides
  [
  let hsize = box>>JDSBOX.hsize
  xbox>>BOX.x1 = MAX(MIN(righttextmargin - outlinewidth - hsize,
  xbox>>BOX.x1), lefttextmargin + outlinewidth )
  xbox>>BOX.x2 = MIN(righttextmargin - outlinewidth , xbox>>BOX.x2)
  ]
 // now do top and bottom
  [
  let vsize = box>>JDSBOX.vsize
  xbox>>BOX.y1 = MAX(MIN(textareaheight - outlinewidth - vsize,
  xbox>>BOX.y1), outlinewidth)
  xbox>>BOX.y2 = MIN(textareaheight - outlinewidth , xbox>>BOX.y2)
  ]
 box>>JDSBOX.x1 = xbox>>BOX.x1 + charspace
 box>>JDSBOX.x2 = xbox>>BOX.x2
 box>>JDSBOX.y1 = xbox>>BOX.y1 + leading
  box>>JDSBOX.y2 = xbox>>BOX.y2
  ]
 and deletejdsbox(state, value) be
  [
  let x, y = jdsmousex-textareax, jdsmousey - textareay
  let box = findjdsbox(x, y, jdsboxlist)
  if box eq 0 then return
  if box eq typescriptbox then return
  let xbox = typescriptbox
  while xbox>>JDSBOX.link ne box do xbox = xbox>>JDSBOX.link
  xbox>>JDSBOX.link = box>>JDSBOX.link
  outlinejdsbox(box, colorwhite)
  fpsetbits(box>>BOX.x1, boxwidth(box), box>>BOX.y1, boxheight(box), colorwhite).
  retmem(box>>JDSBOX.insertmark)
  retmem(box>>JDSBOX.rangemark)
  retmem(box>>JDSBOX.tabsets)
  retmem(box)
  ]
 and setboxborder(state, value) be
  [
  let x, y = jdsmousex-textareax, jdsmousey - textareay
  let box = findjdsbox(x, y, typescriptbox>>JDSBOX.link)
  if box eq 0 then return
  box>>JDSBOX.borderflag = not (box>>JDSBOX.borderflag)
  outlinejdsbox(box, box>>JDSBOX.borderflag? colorblack, colorwhite)
  ]
 and setboxtext(state, value) be
  [
  let x, y = jdsmousex-textareax, jdsmousey - textareay
  let box = findjdsbox(x, y, typescriptbox>>JDSBOX.link)
  if box eq 0 then return
  invertbits(jdsdat, box>>JDSBOX.x1, boxwidth(box), box>>JDSBOX.y1, boxheight(box))
  waitms(100)
  test box>>JDSBOX.fixedtextpos eq 0
   ifso
    [
    let jdschar = vec jdscharsize-1
    setjdschar(box, jdschar)
    findleftkey(box, jdschar, box>>JDSBOX.textpos + box>>JDSBOX.textsize - 1)
    box>>JDSBOX.fixedtextpos = box>>JDSBOX.textpos
    box>>JDSBOX.fixedtextsize = box>>JDSBOX.textsize
    box>>JDSBOX.textpos = box>>JDSBOX.textpos + box>>JDSBOX.textsize
    box>>JDSBOX.textsize = 0
    box>>JDSBOX.textstartx = jdschar>>JDSCHAR.x-box>>JDSBOX.x1
    box>>JDSBOX.textstarty = jdschar>>JDSCHAR.y-box>>JDSBOX.y1
    box>>JDSBOX.skipboxflag = 0
    ]
   ifnot
    test box>>JDSBOX.skipboxflag eq 0
     ifso
      [
      box>>JDSBOX.skipboxflag = true
      invertbits(jdsdat, box>>JDSBOX.x1, boxwidth(box), box>>JDSBOX.y1,
      boxheight(box),colordarkgrey)
      waitms(100)
      invertbits(jdsdat, box>>JDSBOX.x1, boxwidth(box), box>>JDSBOX.y1,
      boxheight(box),colordarkgrey)
      waitms(100)
      ]
     ifnot
      [
      // move to end of box sequence
       let lastbox = jdsboxlist
        [
        if lastbox>>JDSBOX.link eq box do
         lastbox>>JDSBOX.link = box>>JDSBOX.link
        if lastbox>>JDSBOX.link eq 0 do break
        lastbox = lastbox>>JDSBOX.link
        ] repeat
       lastbox>>JDSBOX.link = box
       box>>JDSBOX.link = 0
```

```
box>>JDSBOX.textpos = box>>JDSBOX.fixedtextpos
box>>JDSBOX.textsize = box>>JDSBOX.textsize + box>>JDSBOX.fixedtextsize
box>>JDSBOX.fixedtextpos = 0
box>>JDSBOX.fixedtextsize = 0
box>>JDSBOX.textstartx = 0
box>>JDSBOX.textstarty = 0
box>>JDSBOX.textstarty = 0
box>>JDSBOX.stopboxflag = 0
]
... (jdsdat, box>>JDSBOX.x1, boxwidth(box), box>>JDSBOX.y1, boxheight(box))
]
and ...(state, value) be
[
let lastbox = jdsboxlist
while lastbox>>JDSBOX.link ne 0 do
  lastbox = lastbox>>JDSBOX.link
    outlinejdsbox(lastbox, colorwhite)
    let oldx, oldy = lastbox>>BOX.x2, lastbox>>BOX.y2
    lastbox>>BOX.x2 = jdsmousex - textareax
    lastbox>>BOX.y2 = jdsmousey - textareay
    verifybox(lastbox)
    outlinejdsbox(lastbox, colorblack)
    if (oldx eq lastbox>>BOX.x2) & (oldy eq lastbox>>BOX.y2) then
      return
    let yp = lastbox>>BOX.y1
    let xp = lastbox>>BOX.x1
    let ybits = lastbox>>JDSBOX.vsize - lastbox>>JDSBOX.leading
    let xinc, yinc = lastbox>>JDSBOX.hsize, lastbox>>JDSBOX.vsize
    if oldx gr lastbox>>BOX.x2 then
      [
      let xstart = ((lastbox>>BOX.x2 - lastbox>>BOX.x1)/lastbox>>JDSBOX.hsize
      lastbox>>JDSBOX.hsize) + lastbox>>BOX.x1
      fpsetbits( xstart,
      oldx - xstart + 1,
      lastbox>>BOX.y1,
      oldy - lastbox>>BOX.y1 + 1,
      colorwhite)
      ]
    if oldy gr lastbox>>BOX.y2 then
      [
      let ystart = ((lastbox>>BOX.y2 - lastbox>>BOX.y1)/lastbox>>JDSBOX.vsize
      lastbox>>JDSBOX.vsize) + lastbox>>BOX.y1
      fpsetbits( lastbox>>BOX.x1,
      oldx - lastbox>>BOX.x1 + 1,
      ystart,
      oldy - ystart + 1,
      colorwhite)
      ]
    until (yp + yinc - 1) gr lastbox>>BOX.y2 do
      [
      fpsetbits( lastbox>>BOX.x1,
        ((lastbox>>BOX.x2 - lastbox>>BOX.x1 + 1) / xinc) * xinc,
        yp,
        ybits,
        colorblack)
        yp = yp + yinc
      ]
    until (xp + xinc - 1) gr lastbox>>BOX.x2 do
      [
      fpsetbits( xp + lastbox>>JDSBOX.hsize - lastbox>>JDSBOX.charspace ,
      lastbox>>JDSBOX.charspace,
      lastbox>>BOX.y1,
      lastbox>>BOX.y2 - lastbox>>BOX.y1 + 1,
      colorwhite)
      xp = xp + xinc
      ]
  ]

and outlinejdsbox(box, color; numargs n) be
  [
  let box1 = vec 3
  copybox(box, box1)
  let x = box1>>BOX.x1-outlinewidth
  let y = box1>>BOX.y1-outlinewidth
  let width = boxwidth(box1) + outlinewidth
  let height = boxheight(box1) + outlinewidth
  test n eq 2
   ifso
    [
    fpsetbits(x, width, y, outlinewidth, color)
    fpsetbits(x + width, outlinewidth, y, height, color)
    fpsetbits(x + 1, width, y + height, outlinewidth, color)
    fpsetbits(x, outlinewidth, y + 1, height, color)
    ]
   ifnot
    [
    fpinvertbits(x, width, y, outlinewidth, color)
    fpinvertbits(x + width, outlinewidth, y, height, color)
    fpinvertbits(x + 1, width, y + height, outlinewidth, color)
    fpinvertbits(x, outlinewidth, y + 1, height, color)
    ]
  ]

// jdscharscan jdscharscan.ext


// Declarations

  get "tookdecl"
  get "jdsdecl"


  external // Declared in This File
    [
    brokentest
    displayjdsbox
    displayjdschar
    displaypage
    marktext
    ]

  external // Declared in Other Files
    [
    asmlpbitblt
    blankjdschar
    blinklist
    charscan
    displaycharstack
    fpinvertbits
    startblink
    getjdschar
    insertpos
    jdsdat
    kanjibuffer
    markeroff
    markeron
    movejdschar
```

```
    outlinejdsbox
    putjdschar
    putsize1char
    putsize2char
    rangepos
    removeblink
    scanchar
    stopblink
    typescriptbox
    ]

// Code

  let brokentest(box, textpos) =
    // return textpos of command if box broken at right of pos
    valof[
    let boxsize = box>>JDSBOX.hsize eq tshorizcharsize? 6000b, 2000b
    // start of loop to find right one
      [
      let char = getjdschar(textpos)
      if (char & breaklinemask) ne breaklinechar then resultis 0
      if (char & 6000b) eq boxsize then resultis textpos
      textpos = textpos + textinc
      ] repeat
    ]

  and displayjdschar(box, jdschar, textpos, markflag, numargs n) be
    [
    // display the character just inserted at textpos
    let scanresult = nil
    test box>>JDSBOX.hsize eq tshorizcharsize
      ifso
        [
        scanresult = charscan(box, jdschar, textpos, putjdschar, blankjdschar)
        displaycharstack(kanjibuffer)
        ]
      ifnot
        [
        if n eq 3 then markflag = false
        test box>>JDSBOX.hsize eq horizchar1size
          ifso
            scanresult = charscan(box, jdschar, textpos, putsize1char, blankjdschar)
          ifnot
            scanresult = charscan(box, jdschar, textpos, putsize2char, blankjdschar)
        ]
    movejdschar(jdschar, lv scanresult>>CHARSCANDATA.startpos)
    ]

  and displayjdsbox(box) be
    [
    let jdschar = vec jdscharsize-1
    if box>>JDSBOX.fixedtextpos ne 0 then
    if box>>JDSBOX.fixedtextsize gr 0 then
      [
      jdschar>>JDSCHAR.textpos = box>>JDSBOX.fixedtextpos-1
      jdschar>>JDSCHAR.x = box>>JDSBOX.x1
      jdschar>>JDSCHAR.y = box>>JDSBOX.y1
      let lastpos = box>>JDSBOX.fixedtextpos + box>>JDSBOX.fixedtextsize - 1
      let savetextpos, savetextsize = box>>JDSBOX.textpos, box>>JDSBOX.textsize
        box>>JDSBOX.textpos, box>>JDSBOX.textsize = box>>JDSBOX.fixedtextpos,
        box>>JDSBOX.fixedtextsize
        displayjdschar(box, jdschar, lastpos)
        //box>>JDSBOX.textstartx = jdschar>>JDSCHAR.x - box>>JDSBOX.x1
        //box>>JDSBOX.textstarty = jdschar>>JDSCHAR.y - box>>JDSBOX.y1
        box>>JDSBOX.textpos, box>>JDSBOX.textsize = savetextpos, savetextsize
      ]
    if box>>JDSBOX.textsize le 0 then return
    jdschar>>JDSCHAR.textpos = 0 // force initialization
    let lastpos = box>>JDSBOX.textpos + box>>JDSBOX.textsize - 1
    displayjdschar(box, jdschar, lastpos)
    ]
  and marktext(startpos, endpos, onflag; numargs n) be
    [
    if n le 2 then
      [
      let blinkblock = removeblink(typescriptblink)
      unless blinkblock eq 0 do
        [
        retnum(blinkblock!-1)
        return
        ]
      ]
    let jdschar = vec jdscharsize-1
    let leftxpos, leftypos = nil, nil
    let box = typescriptbox>>JDSBOX.link
      [
      if box eq 0 then return
      leftxpos, leftypos = box>>JDSBOX.x1, box>>JDSBOX.y1
      testIN(startpos, box>>JDSBOX.fixedtextpos-1, box>>JDSBOX.fixedtextpos-1 +
      box>>JDSBOX.fixedtextsize-1)
        ifso break
        ifnot
          if IN( startpos, box>>JDSBOX.textpos-1, box>>JDSBOX.textpos-1 +
          box>>JDSBOX.textsize ) do
            [
            jdschar>>JDSCHAR.textpos = 0 // force initialization
            let scanresult = charscan(box, jdschar, startpos)
            // start of loop
              [
              if scanresult>>CHARSCANDATA.character is 0 then return
              if scanresult>>CHARSCANDATA.nextpos gr endpos then return
              leftxpos, leftypos = scanresult>>CHARSCANDATA.startx,
              scanresult>>CHARSCANDATA.starty
              // if scanresult>>CHARSCANDATA.starty eq
              scanresult>>CHARSCANDATA.nexty then break
              // scanchar(scanresult)
              ] // repeat
            break
            ]
      box = box>>JDSBOX.link
      ] repeat
    startblink(jdsdat, leftxpos, box>>JDSBOX.hsize-box>>JDSBOX.charspace, leftypos,
    box>>JDSBOX.vsize-box>>JDSBOX.leading, typescriptblink,0,0,asmlpbitblt)
    ]
  and displaypage(markerflag; numargs n) be
    [
    if n eq 0 then markerflag = true
    if markerflag do
      [
      markeroff(insertmarker)
      markeroff(rangemarker)
      ]
    let box = typescriptbox>>JDSBOX.link
    // start of box loop
      [
      if box eq 0 then break
      if box>>JDSBOX.borderflag then
        outlinejdsbox(box, colorblack)
```

```
displayjdsbox(box)
box = box>>JDSBOX link
} repeat
if markerflag do
[
markeron(insertmarker, insertpos)
markeron(rangemarker, rangepos)
}
]

// jdscommandio jdscommandio.ext


// Declarations

get "tooldecl"
get "fonttooldecl"
get "jdsdecl"


external // Declared in This File
[
confirmflag
deleteflag
endinput
endinputflag
feedbackx
inputchar
jdsconfirm
jdsdelete
resetjds
startinput
}

external // Declared in Other Files
[
apchr
apstr
colorpage
deletelastchar
getfunctiontable
getnextcommand
inputregister
jdsfeedback
jdsfile
jdsfilename
jdsfunction
jdsinchr
jdspage
measurechar
msgy
peekcommand
putachar
setbits
strikefonts
ttydat
writestring
}

static
[
confirmflag
deleteflag
endinputflag
feedbackx
inputflag
saveinputfunction
}
// Code
let resetjds(state, value) be
{
jdsfeedback(state, resetfunction)
]
and startinput(state, function) be
{
inputflag = 1
endinputflag = 0
saveinputfunction = function
inputregister>>STRING.count = 0
let y = msgy + (strikefonts!0)>>STRIKESEG.ascent
switchon function into
[
case readfilefunction:
case writefilefunction:
{
if jdsfilename ne 0 then
{
//apstr(inputregister, jdsfilename)
//outstr(tty, inputregister)
if function eq readfilefunction then
[
unless jdsfile eq 0 do endcase
apstr(inputregister, jdsfilename)
]
feedbackx = feedbackx + writestring(ttydat, jdsfilename, feedbackx, y)
]
endcase
]
case printfunction:
[
if jdsfilename ne 0 then
unless IN(colorpage, 1, 2) do
[
apstr(inputregister, jdsfilename)
apstr(inputregister, ".page")
if jdspage ne -1 then numtostr(inputregister, jdspage, 10)
//outstr(tty, inputregister)
feedbackx = feedbackx + writestring(ttydat, inputregister, feedbackx, y)
]
endcase
}
]
}
and inputchar(state, value) =
valof[
if inputflag eq 1 then
[
inputregister>>STRING.count = 0
inputflag = 0
jdsfeedback(state, saveinputfunction)
]
let char = maptoascii(jdsinchr() & 177b)
if char ne 0 then
if inputregister>>STRING.count ls inputregistersize then
{
feedbackx = feedbackx + putachar(ttydat, char, feedbackx, msgy +
(strikefonts!0)>>STRIKESEG.ascent)
apchr(inputregister, char)
]
resultis false
]
and endinput(state, value) =
valof[
// if value between 0 and 1023, then test for end
// otherwise, it is a function call
switchon peekcommand() into
{
case backspacefunction:
{
if inputflag eq 1 then
[
inputflag = 0
if saveinputfunction eq writefilefunction then
[
inputregister>>STRING.count = 0
apstr(inputregister, jdsfilename)
}
}
let char = deletelastchar(inputregister)
test char eq -1
ifso
jdsfeedback(state, saveinputfunction)
ifnot
[
let cwidth = measurechar(char, strikefonts!0)
feedbackx = feedbackx - cwidth
setbits(ttydat, feedbackx, cwidth, msgy,
(strikefonts!0)>>STRIKESEG.height, colorwhite)
]
endcase
}
case newlinefunction:
[
endinputflag = true
endcase
}
default
[
let function = jdsfunction(state, value)
if function ne 0 then
|
inputregister>>STRING.count = 0
}
resultis function
|
}
getnextcommand()
resultis 0
|
and jdsconfirm(state, value) =
valof[
let result = 0
test IN(value, 0, 3)
ifso
[
confirmflag = false
if value eq 0 then
feedbackx = feedbackx + writestring(ttydat, "[Confirm with RETURN]",
feedbackx, msgy + (strikefonts!0)>>STRIKESEG.ascent)
if value eq 1 then
feedbackx = feedbackx + writestring(ttydat, "Delete Page? [Confirm with
RETURN]", feedbackx, msgy + (strikefonts!0)>>STRIKESEG.ascent)
if value eq 2 then
feedbackx = feedbackx + writestring(ttydat, "Store Page? [Confirm with
RETURN]", feedbackx, msgy + (strikefonts!0)>>STRIKESEG.ascent)
if value eq 3 then
feedbackx = feedbackx + writestring(ttydat, "Insert Page? [Confirm with
RETURN]", feedbackx, msgy + (strikefonts!0)>>STRIKESEG.ascent)
}
ifnot
test getnextcommand() eq newlinefunction
ifso
confirmflag = true
ifnot
result = getfunctiontable(resetfunction)>>FUNCTION.statelist
resultis result
|
and jdsdelete(state, value) =
valof[
let result = 0
test IN(value, 0, 1)
ifso
{
deleteflag = false
|
ifnot
test peekcommand() eq deletefunction
ifso
[
deleteflag = true
getnextcommand()
]
ifnot
result = getfunctiontable(resetfunction)>>FUNCTION.statelist
resultis result
]
and maptoascii(keyboardcode) =
"54[illegible]
0k[illegible]00*000
3[illegible]
[illegible]00
1[illegible]0?I*000cjb
z*0[illegible]*000+*000*000
r[illegible]58om
*0[illegible][=*000*000*000*000
[illegible]S-E&DUV
)K*140P?|*000*000
#@WOSA(I
XOK*"*175*176*000
!*000*000!*000CJB
Z*000>.*0001*000*000
RTGYH**NM
*000*000*173+*000*000*000*000">>STRING.char↑(MAX(0, MIN(keyboardcode, 177b)))


// jdscommandkeys jdscommandkeys.ext


// Declarations
get "tooldecl"
get "fonttooldecl"
get "jdsdecl"
```

```
external // Declared in This File
  [
  selectcommand
  selectcommandfunc
  showcommandkeys
  ]

external // Declared in Other Files
  [
  colorflag
  colorpage
  displaykeytops
  getfunctiontable
  jdsfunction
  jdsinchr
  kanjikeyvec
  keytopdat
  marrowfile
  measurestr
  setbits
  SetBlock
  strikefonts
  unsigneddivide
  writestring
  ]

// Code

 let selectcommand(state, value) =
  valof [
  // called for keytop select
  let selectedcommand = getfunctiontable(resetfunction)>>FUNCTION.statelist
  let key = jdsinchr() & 77b
  let keyvecpos =
    table[ -1; -1; -1; 2; -1; 12; 6, 23;
    -1; 17; -1; 9; 20; -1; -1; -1;
    -1; -1; 1; 0; 11; 10; -1; 7;
    21; 8; 18; 27; -1; -1; -1; -1;
    -1; -1; -1; 13; -1; 22; 10; 24;
    20; -1; 28; 19; -1; -1; -1; -1;
    3. 4; 14; 5; 15; -1; 25, 26;
    -1; -1; -1; -1, -1; -1; -1; -1
    ]! key
  if keyvecpos ne -1 then
    selectedcommand = kanjikeyvec!keyvecpos
  displaykeytops(-1)
  resultis selectedcommand
  ]

 and selectcommandfunc(state, value) =
  valof [
  // called as a function
  let result = jdsfunction(state, value)
  unless result eq 0 do displaykeytops(-1)
  resultis result
  ]

 and showcommandkeys(state, value) be
  [
  SetBlock(kanjikeyvec, getfunctiontable(resetfunction)>>FUNCTION.statelist,
  numkeytops)
  if marrowfile ne 0 then
    showkey(10, "MARROW" printmarrowfunction)
  test colorpage eq 0
   ifso
     [
     if colorflag then
       showkey(20 "COLOR" colorfunction)
     showkey(22, "PRESS", printfunction)
     ]
   ifnot
     [
     let color = selecton colorpage into
       [
       case 1: "Cyan"
       case 2: "Yellow"
       case 3: "Magenta"

       ]
     showkey(22, color, printfunction)
     ]
  // showkey(15, "NEXT BOX", nextboxfunction)
  // showkey(5, "USE FORM", readformfunction)
  showkey(0, "QUIT", quitfunction)
  showkey(7, "CANCEL", cancelfunction)
  ]
 and showkey(keypos, string, function) be
  [
  let funcstatelist = getfunctiontable(function)>>FUNCTION.statelist
  if funcstatelist eq 0 then return
  let font = strikefonts!0
  let strwidth = measurestr(string, font)
  let nkeys = (strwidth + keywidth-1)/keywidth
  let xpos = nil
  let ypos = unsigneddivide(keypos, 10, lv xpos)
  let x = xpos * keywidth + ypos*keyoffset
  if xpos ge 5 then x = x + keywidth/2
  let y = ypos * keyheight
  setbits(keytopdat x, nkeys*keywidth, y, keyheight, colorwhite)
  //y = y + MAX(0, keyheight-font>>STRIKESEG.height)/2 + font>>STRIKESEG.ascent
  y = y + font>>STRIKESEG.ascent + 2

  //setbits(keytopdat, x, nkeys*keywidth, y, keyheight, colorwhite)
  writestring(keytopdat, string, x, y, font)
  kanjikeyvec!keypos = funcstatelist
  while nkeys gr 1 do
    [
    keypos = keypos + 1
    kanjikeyvec!keypos = funcstatelist
    nkeys = nkeys - 1
    ]
  ]


 // jdsdisplay jdsdisplay.ext


 // Declarations

  get "lookdecl"
  get "jdsdecl"


  external // Declared in This File
    [
    displaypartialpage
    marktypescriptbox
    recreatejdsOdisplay
    restoretextdisplay
    settypescriptline
    ]

  external // Declared in Other Files
    [
    breakbox
    brokentest
    displayjdsbox
    displaypage
    displaytypescriptbox
    fullpagebox
    insertpos
    intextbox
    invertbits
    jdsboxlist
    jdsdat
    jdsfile
    jdsmousey
    jdspage
    jdspage0
    markeroff
    markeron
    outlinejdsbox
    rangepos
    setbits
    showpagenumbers
    stopblink
    typescriptbox
    updatetext
    ]

// Code
 let settypescriptline(state, value) =
   valof[
   if typescriptbox>>JDSBOX.textpos ne stoptextpos then resultis 0
   // move line
   // move the line pointed to by @typescriptline
      let y = MAX(0, MIN(textareaheight-0, jdsmousey - textareay))
      let d1, d2 = y-typescriptbox>>BOX.y1, y-typescriptbox>>BOX.y2
      d1 = MAX(d1, -d1)
      d2 = MAX(d2, -d2)
      let lineheight = typescriptbox>>JDSBOX.vsize
      marktypescriptbox()
      test d1 le d2
        ifso // top line
          [
          typescriptbox>>BOX.y1 = MIN(typescriptbox>>BOX.y2-2, y)
          //let nlines = boxheight(typescriptbox)/lineheight
          //typescriptbox>>BOX.y1 = MIN(typescriptbox>>BOX.y2-2,
          //typescriptbox>>JDSBOX.y2 - nlines*lineheight + 1)
          ]
        ifnot // bottom line
          [
          typescriptbox>>BOX.y2 = MAX(typescriptbox>>BOX.y1 + 2, y)
          //let nlines = boxheight(typescriptbox)/lineheight
          //typescriptbox>>BOX.y2 = MAX(typescriptbox>>BOX.y1 + 2,
          //typescriptbox>>JDSBOX.y1 + nlines*lineheight-1)
          ]
      marktypescriptbox()
      ]
and marktypescriptbox() be
  [
  // top marker
    invertbits(jdsdat, rightlextmargin + 5, 8, typescriptbox>>BOX.y1 , 8)
  // bottom marker
    invertbits(jdsdat, rightlextmargin + 5, 8, typescriptbox>>BOX.y2-7 , 8)
  ]
and recreatejds0display(state, value) be
  [
  markeroff(insertmarker)
  markeroff(rangemarker)
  stopblink()
  markeron(rangemarker, rangepos)
  ]
and restoretextdisplay(y1, y2) be
  [
  y1 = MAX(0, MIN(y1, jdsdat>>DAT.height-1))
  y2 = MAX(y1, MIN(y2, jdsdat>>DAT.height-1))
  let bitblttable = jdsdat>>DAT.bitblttable
  let bmw = bitbltable>>BITBLTTABLE.bmw
  let height = y2 - y1 + 1
  // re-establish text display area
    clear(bitbltable>>BITBLTTABLE.bca + y1 * bmw, height*bmw)
  // mark outline
    setbits(jdsdat, leftlextmargin-4, 4, y1, height)
    setbits(jdsdat, rightmarginx, 4, y1, height)
    if y2 ge (textareatop + textareaheight) then
      setbits(jdsdat, leftlextmargin, textareawidth, textareatop + textareaheight, 4)
  // and page numbers
    //showpagenumbers(jdsfile, jdspage0, jdspage)
    marktypescriptbox(y1, y2)
  displaypartialpage(y1, y2)
  ]
and displaypartialpage(y1, y2, markerflag; numargs n) be
  [
  if n le 2 then markerflag = true
  if markerflag do
    [
    markeroff(insertmarker)
    markeroff(rangemarker)
    ]
  let box = typescriptbox>>JDSBOX.link
  // start of box loop
    [
    if box eq 0 then break
    unless box>>JDSBOX.y2 ls y1 do
      unless box>>JDSBOX.y1 gr y2 do
        [
        if box>>JDSBOX.borderflag then
          outlinejdsbox(box, colorblack)
        displayjdsbox(box)
        ]
    box = box>>JDSBOX.link
    ] repeat
  if markerflag do
    [
    markeron(insertmarker, insertpos)
    markeron(rangemarker, rangepos)
    ]
  ]

// jdsedities jdsedities.ext


// Declarations

  get "lookdecl"
  get "jdsdecl"
```

```
external // Declared in This File
  [
  appendjdschar
  deletejdschar
  invalidpos
  markdeleted
  storejdschar
  updatetext
  ]

external // Declared in Other Files
  [
  infixedtext
  insertpos
  intextbox
  jdsboxlist
  jdstext
  MoveBlock
  rangepos
  typescriptbox
  ]


// Code
 let appendjdschar(char, updateflag, numargs n) =
   valof[
   // return true if nothing had to move
   let pos = jdstext!-1
   let textpos = pos
   let result = false
   unless pos eq jdstext!-2 do
     [
     test n eq 1
       ifso
         updateflag = true
       ifnot
         [
         if updateflag do
           [
           textpos = (updateflag + 1) rshift 1
           updateflag = true
           test textpos ls pos
             ifso
               [
               let nextchar = jdstext!textpos
               if (nextchar & ignorebit) ne 0 then // ignore big and/or small
                 [
                 unless (intextbox(textpos, typescriptbox)) & ((nextchar &
                 bigignorebit) eq 0) do
                   [
                   //updatejdsptrs((textpos + 1) lshift 1, -textinc)
                   result = true
                   ]
                 ]
               unless result do
                 for i = pos to textpos + 1 by -1 do
                   jdstext!i = jdstext!(i-1)
               ]
             ifnot textpos = pos
           ]
         ]
     jdstext!textpos = char
     unless result do
       [
       jdstext!-1 = pos + 1
       if updateflag then updatejdsptrs(textpos lshift 1-1, textinc)
       ]
     ]
   resultis result
   ]

 and storejdschar(char, pos) be
   [
   pos = (pos + 1) rshift 1
   if IN(pos, 1, jdstext!-1-1) then
     jdstext!pos = char
   ]
 and markdeleted(pos) =
    test pos eq jdstext!-1
      ifso jdstext!-1 = pos - 1
      ifnot (jdstext + pos)>>CHAR.deleted = 1
    resultis (jdstext + pos)>>CHAR
   ]
 and updatetext() be
   [
   let i = 1
   let lastpos = jdstext!-1
   while i ls lastpos do
     [
     if (jdstext!i)<<CHAR.deleted then
       [
       let endi = i
       // search for end of deleted interval
         [
         let nexti = endi + 1
         if nexti ge lastpos then break
         unless (jdstext!nexti)<<CHAR.deleted do break
         endi = nexti
         ]repeat
       deletejdschar(i lshift 1, endi lshift 1)
       lastpos = jdstext!-1
       ]
     i = i + 1
     ]
   ]

 and deletejdschar(textposstart, textposend; numargs n) =
   valof[
   let lastpos = jdstext!-1
   if lastpos gr 1 then
     [
     textposstart = textposstart rshift 1
     textposend = textposend rshift 1
     switchon n into
       [
       case 0: textposstart = lastpos
       case 1: textposend = textposstart
       ]
     let nchars = textposend - textposstart + 1
     jdstext!-1 = lastpos - nchars
     if lastpos gr textposend then
       MoveBlock(jdstext + textposstart, jdstext + textposend + 1, lastpos-textposend)
     updatejdsptrs(textposstart lshift 1, -(nchars*textinc))
     ]
   resultis textposstart lshift 1 // textpos * textinc
   ]

and updatejdsptrs(pos, inc) =
  valof[
  let box = jdsboxlist
  // start of loop for other boxes
    [
    let tsize = box>>JDSBOX.textsize
    test intextbox(box, pos)
      ifso
        box>>JDSBOX.textsize = MAX(0, box>>JDSBOX.textsize + inc)
      ifnot
        [
        if IN(box>>JDSBOX.textpos, pos, stoptextpos-1) then
          box>>JDSBOX.textpos = MAX(2, box>>JDSBOX.textpos + inc)
        if IN(box>>JDSBOX.fixedtextpos, pos, stoptextpos-1) then
          box>>JDSBOX.fixedtextpos = MAX(2, box>>JDSBOX.fixedtextpos + inc)
        if IN(box>>JDSBOX.insertmark>>MARK.textpos, pos + 1, stoptextpos-1) then
          box>>JDSBOX.insertmark>>MARK.textpos = MAX(2,
          box>>JDSBOX.insertmark>>MARK.textpos + inc)
        if IN(box>>JDSBOX.rangemark>>MARK.textpos, pos + 1, stoptextpos-1) then
          box>>JDSBOX.rangemark>>MARK.textpos = MAX(2,
          box>>JDSBOX.rangemark>>MARK.textpos + inc)
        ]
    box = box>>JDSBOX.link
    if box eq 0 then break
    ]repeat
  if IN(insertpos, pos + 1, stoptextpos-1) then
    insertpos = MAX(2, insertpos + inc)
  if IN(rangepos, pos + 1, stoptextpos-1) then
    rangepos = MAX(2, rangepos + inc)
  resultis pos
  ]
and invalidpos(state, value) =
  valof [ // return true if the range and insert markers are not valid markers
  if validpos(rangepos) then
    if validpos(insertpos) then resultis false
  resultis true
  ]
and validpos(pos) =
  valof [ // return true if pos is a valid pos
  let box = typescriptbox>>JDSBOX.link
  // start of loop for other boxes
    [
    if box eq 0 then resultis false
    if intextbox(box, pos) then resultis true
    if infixedtext(box, pos) then resultis true
    box = box>>JDSBOX.link
    ]repeat
  ]


  // jdsinit jdsinit.ext


  // Declarations

    get "tooldecl"
    get "jdsdecl"


    external // Declared in This File
      [
      toolbox
      ]

    external // Declared in Other Files
      [
      debugeefile
      DisableInterrupts
      diskbuffer
      echoflag
      EnableInterrupts
      feedbackstr
      jdsinitcontrol
      jdsinitdisplay
      jdsinitio
      jdsmain
      options
      OutLd
      ReadDiskDescriptor
      quittoolbox
      setfunctiontable
      showdiskspace
      showtypemode
      stuffcommandring
      ]

  // Code
   let toolbox(p) be
     [
     let ... flag = table[ 77600u; returnjump ]
     let ... = seterror(true)
     if ... G then
       [
       ... (err)
       q... ()
       ]
     ch... ()
     jdsinit... ()
       ch... ()
     jds... ()
       ... mem()
     jd... (options!$A)
     let ... memleft = checkmem()
     // ... memleft ls 1000 then
       // ... debug("Memory Left is less than 1000 words", memleft)
     echoflag = false
     // set up the initial type mode
       showtypemode(0, romajifunction)
     // set up the initial Document name
       feedbackstr(fnamex, fnamey, fnamewidth, "NO DOCUMENT")
     // and set us up for the right state table
       setfunctiontable(0, nofiletable)
     // and swap out a copy for fast starts
       DisableInterrupts()
       OutLd(debugeefile, diskbuffer)
       EnableInterrupts()
     ReadDiskDescriptor() // get the real one
     // and show the disk space
       showdiskspace()
     jdsmain()
     ]

     // jdsinitdisplay jdsinitdisplay.ext


     // Declarations
```

```
get "tooldecl"
get "fonttooldecl"
get "jdsdecl"

external // Declared in This File
  [
  jdsinitdisplay
  ]

external // Declared in Other Files
  [
  createmarker
  displaykeytops
  displayon
  feedbackstr
  fullpagebox
  insertpos
  jdsboxlist
  jdsdat
  jdspage
  jdstext
  jdsttyfont
  jdsttyfontascent
  keytopdat
  makebox
  marktypescriptbox
  measurechar
  pagenodisplayinfo
  pagesleftlocx
  rangepos
  setbits
  strikefonts
  ttydat
  ttyoff
  ttyon
  typescriptbox
  ]

manifest jdstextsize = 2500

// Code
let jdsinitdisplay() be
  [
  // Set up the Key top area
    keytopdat = displayon(keytopx, keytopy, keytopx + keytopwidth + keywidth*2-1,
    keytopy + keytopheight-1)
    displaykeytops(-1)
  // And the text display
    fullpagebox = makebox(lefttextmargin, textareatop, righttextmargin, textareatop +
    textareaheight-1)
    typescriptbox = getmem(jdsboxsize)
    clear(typescriptbox, jdsboxsize)
      typescriptbox>>BOX.x1 = leftmarginx + markerwidth
      typescriptbox>>BOX.y1 = textareaheight/2
      typescriptbox>>BOX.x2 = rightmarginx + rightmarginwidth - 1
      typescriptbox>>BOX.y2 = textareaheight-2
      typescriptbox>>JDSBOX.textstartx = 0
      typescriptbox>>JDSBOX.textstarty = 0
      typescriptbox>>JDSBOX.vsize = tsvertcharsize
      typescriptbox>>JDSBOX.leading = tsleading
      typescriptbox>>JDSBOX.hsize = tshorizcharsize
      typescriptbox>>JDSBOX.charspace = tscharspace
      typescriptbox>>JDSBOX.textpos = stoptextpos
      jdsboxlist = typescriptbox
    jdspage = -1
    let kludgedat = displayon(textareax, textareay-4, textareax + rightmarginx +
    rightmarginwidth - 1, textareay-1)
    jdsdat = displayon(textareax, textareay, textareax + rightmarginx +
    rightmarginwidth - 1, textareay + textareatop + textareaheight-1 + 4)
    typescriptbox>>JDSBOX.insertmark = createmarker(typescriptbox, insertmarker)
    typescriptbox>>JDSBOX.rangemark = createmarker(typescriptbox, rangemarker)
  // and the text area
    jdstext = getmem(jdstextsize + 3) + 2
    jdstext!-1 = -1
    jdstext!-2 = jdstextsize
  // and some markers
    insertpos = 0
    rangepos = 0
  // outline area
      // mark outline
      setbits(jdsdat, lefttextmargin-4, 4, 0, textareaheight + 4)
      setbits(jdsdat, rightmarginx, 4, 0, textareaheight + 4)
      setbits(jdsdat, lefttextmargin, textareawidth, textareatop + textareaheight, 4)
      setbits(kludgedat, lefttextmargin-4, textareawidth + 8, 0, 4)
    marktypescriptbox(typescriptbox)
  // set page area grey
    setbits(jdsdat, fullpagebox, colormediumgrey)
  // And the tty display
    ttyon(ttyx, ttyy, ttyx + ttywidth-1, ttyy + ttyheight-1)
    ttyoff()
    ttydat>>DAT.background = 1
    ttyon()
    jdsttyfont = strikefonts!0
    jdsttyfontascent = jdsttyfont>>STRIKESEG.ascent
    pagesleftlocx = feedbackstr(pagesleftx, pageslefty, pagesleftwidth, "Space Left for
    ")
  // and the pagenumber display info
    pagenodisplayinfo = getmem(pagenodisplaysize)
    let font = strikefonts!0
    let lineheight = (textareaheight - tsleading)/ maxdocumentpages
    pagenodisplayinfo>>PAGENODISPLAY.y = tsleading
    pagenodisplayinfo>>PAGENODISPLAY.ybase =
    pagenodisplayinfo>>PAGENODISPLAY.y + font>>STRIKESEG.ascent
    pagenodisplayinfo>>PAGENODISPLAY.lineheight = MIN(lineheight,
    font>>STRIKESEG.height + tsleading)
    let width = measurechar($1, font) lshift 1
    pagenodisplayinfo>>PAGENODISPLAY.x = MAX(0, lefttextmargin - width - 6)
    pagenodisplayinfo>>PAGENODISPLAY.width = MIN(width, MAX(0, lefttextmargin
    - pagenodisplayinfo>>PAGENODISPLAY.x - 6))

]


// jdsmisc jdsmisc ext


// Declarations

  get "tooldecl"
  get "jdsdecl"


  external // Declared in This File
    [
    bsjdschar
    echojdschar
    nokanji
    putkanji
    restorekana
    scrolltypescriptbox
    ]

  external // Declared in Other Files
    [
    appendjdschar
    bitblt
    blankjdschar
    boxheight
    boxwidth
    breakbox
    breakline
    brokentest
    deletedsize
    deletechar
    deletejdschar
    diskbuffer
    displayjdschar
    endoftext
    findleftxy
    findrightxy
    fpinvertbits
    getjdschar
    getring
    incharnum
    initkanjilookup
    insertpos
    intextbox
    jdsboxlist
    jdscode
    jdsdat
    jdsinchr
    jdslookupchar
    jdstext
    kanjikeyvec
    markdeleted
    markeroff
    markeron
    marktext
    MoveBlock
    movejdschar
    numdateflag
    outcharnum
    rangepos
    readdisk
    savekanaring
    scanchar
    setbits
    setcharscan
    setjdschar
    storejdschar
    typescriptbox
    updatedisplay
    waitms
    workfile
    writedisk
    ]

// Code
  let scandeleted(box, sourcejdschar, destjdschar) =
    valof[
    // return true if char completely absorbed
    let destx, desty = destjdschar>>JDSCHAR.x, destjdschar>>JDSCHAR.y
    let scanresult = setcharscan(box, sourcejdschar)
      [
      if scanchar(scanresult) ls 0 then resultis true
      unless (scanresult>>CHARSCANDATA.character eq deletedjdschar) %
      (scanresult>>CHARSCANDATA.character eq jdsblankchar) do resultis false
      if scanresult>>CHARSCANDATA.nexty ge desty then
        test scanresult>>CHARSCANDATA.nexty eq desty
          ifso
          [
          if scanresult>>CHARSCANDATA.nextx gr destx then
            resultis true // past it
          ]
        ifnot
          resultis true // past it
    let char = getjdschar(scanresult>>CHARSCANDATA.nextpos - textinc)
    if (char & breaklinemask) eq breaklinechar then resultis false
    unless char<<CHAR.deleted do resultis false
    movejdschar(sourcejdschar, lv scanresult>>CHARSCANDATA.nextpos)
    ] repeat
  ]
and scanonechar(box, jdschar, character; numargs n) =
  valof[
  let textpos = nil
  let savejdschar = nil
  if n eq 3 then // scan specific character
    [
    textpos = jdschar>>JDSCHAR.textpos
    savejdschar = getjdschar(textpos)
    storejdschar(character, textpos) // stick the new one in
    ]
  let result = setcharscan(box, jdschar)
  if scanchar(result) ls 0 then result = result>>CHARSCANDATA.character
  if n eq 3 then // scan specific character
    [
    storejdschar(savejdschar, textpos) // restore the old one
    ]
  resultis result
  ]
and changedisplay(box, jdschar, newchar) =
  valof[
  // return textpos of last deleted character to nullify
  // update display incrementally
  // when called, source is set up like a jdschar on left side
  let source = vec charscandatasize-1
    let sourcejdschar = lv source>>CHARSCANDATA.startpos
    movejdschar(sourcejdschar, jdschar)
    let [illegible]result = lv source>>CHARSCANDATA.nextpos
  let [illegible]result = vec jdscharsize-1
  let [illegible]k = vec charscandatasize-1
    [illegible]>>CHARSCANDATA.character = -1
  let [illegible]aksource = vec charscandatasize-1
  let [illegible]akdest = vec jdscharsize-1
  let [illegible]akflag = false
  let tempjdschar = vec jdscharsize-1
  // get new current
    let scanresult =
    scanonechar(box, jdschar, newchar)
    if scanresult le -1 then
      [
      if scanresult eq -1 then // blank out space
        [
        [illegible]result>>JDSCHAR.x = box>>JDSBOX.x2
```

```
      destresult>>JDSCHAR.y = box>>JDSBOX.y2
      blankjdschar(box, jdschar, destresult) // colorlightgrey)
      ]
    resultis sourcejdschar>>JDSCHAR.textpos
    ]
  movejdschar(destresult, lv scanresult>>CHARSCANDATA.nextpos) // get right
  bound
  destresult>>JDSCHAR.textpos = sourcejdschar>>JDSCHAR.textpos // set to re-scan
  next
  findleftxy(box, destresult, destresult>>JDSCHAR.textpos) // get left bound of next
  if scandeleted(box, sourcejdschar, destresult) then
      [
      compileif false then
        [
        if intextbox(box, sourcejdschar>>JDSCHAR.textpos + textinc) then
          blankjdschar(box, jdschar, destresult) // colorlightgrey)
        ]
      resultis sourcejdschar>>JDSCHAR.textpos
      ]
blankjdschar(box, jdschar, sourcejdschar)
// jdschar points to starting location
  movejdschar(sourceresult, sourcejdschar) // this is what to move
// set up starting values
  movejdschar(tempjdschar, sourcejdschar) // this is what to move
  movejdschar(lv scanresult>>CHARSCANDATA.nextpos, destresult)
let breakflag = false
// now start loop looking for changes
  [
  if (tempjdschar>>JDSCHAR.x eq scanresult>>CHARSCANDATA.nextx) then
    test (tempjdschar>>JDSCHAR.y eq scanresult>>CHARSCANDATA.nexty)
      ifso break // got it
      ifnot // maybe a line break
        unless linebreakflag do // first one
        
        [
        linebreakflag = true
        MoveBlock(linebreak, scanresult, charscandatasize)
        MoveBlock(linebreaksource, source, charscandatasize)
        movejdschar(linebreakdest, destresult) // this is now where to move
        movejdschar(sourcejdschar, sourceresult) // this is new where to move
        ]
movejdschar(destresult, lv scanresult>>CHARSCANDATA.nextpos) // advance
dest right bound
movejdschar(sourceresult, tempjdschar) // advance source right bound
if breakflag then break
// get next under current configuration
    if scanonechar(box, sourceresult) le -1 then break
    movejdschar(tempjdschar, lv scanresult>>CHARSCANDATA.nextpos) // save
    right bound of next char in old
// get next under new configuration
    if scanonechar(box, destresult) le -1 then
      [
      if scanresult>>CHARSCANDATA.character eq -2 then break
      // by here overflowed box on second character
      scanresult>>CHARSCANDATA.nextx = box>>JDSBOX.x2 + 1
      // old code: pre 4/19/78
        //scanresult>>CHARSCANDATA.nexty =
        MAX(scanresult>>CHARSCANDATA.nexty,
        box>>JDSBOX.y2 box>>JDSBOX.vsize + 1)
      if scanresult>>CHARSCANDATA.nexty le
      (box>>JDSBOX.y2 box>>JDSBOX.vsize + 1) then
        blankjdschar(box, lv scanresult>>CHARSCANDATA.startpos, lv
        scanresult>>CHARSCANDATA.nextpos, colorlightgrey)
      break
      ]
  ] repeat
test linebreakflag
  ifnot
    [
    unless source>>CHARSCANDATA.startpos eq source>>CHARSCANDATA.nextpos
    do
      updatedisplay(box, source, destresult)
    resultis sourcejdschar>>JDSCHAR.textpos
    ]
  ifso
    [
    updatedisplay(box, source, destresult)
    blankjdschar(box, lv linebreak>>CHARSCANDATA.startpos, lv
    linebreak>>CHARSCANDATA.nextpos, colorlightgrey)
    updatedisplay(box, linebreaksource, linebreakdest)
    resultis linebreaksource>>CHARSCANDATA.startpos
    ]
]
and scrolltypescriptbox() be
[
let box = typescriptbox
let height, width = boxheight(box), boxwidth(box)
let vsize = box>>JDSBOX.vsize
let nlines = height/vsize
if nlines eq 0 then return // can t do a thing
// find pos of end of first line
  let jdschar = vec jdscharsize-1
  setjdschar(box, jdschar)
  let firsty = jdschar>>JDSCHAR.y
  let scanresult = setcharscan(box, jdschar)
  let textpos = nil
  // start of loop
    [
    if scanchar(scanresult) le -1 then break
    unless firsty eq scanresult>>CHARSCANDATA.nexty do break // past it
    ] repeat
box>>JDSBOX.rangemark>>MARK.textpos = 0
box>>JDSBOX.insertmark>>MARK.textpos = 0
let newpos = nil
nlines = nlines - 1
let goodposflag = false
while not goodposflag do
  [
  newpos = nlines eq 0? scanresult>>CHARSCANDATA.startpos + 1,
    scanresult>>CHARSCANDATA.starty eq firsty?
    scanresult>>CHARSCANDATA.nextpos + 1,
    scanresult>>CHARSCANDATA.startpos + 1
  if scanresult>>CHARSCANDATA.character le -1 then break
  let box = typescriptbox>>JDSBOX.link
    [
      [
      if box eq 0 then break
      if IN(newpos + 1, box>>JDSBOX.fixedtextpos, box>>JDSBOX.fixedtextpos +
      box>>JDSBOX.fixedtextsize -1) then
        [
        goodposflag = true
        break
        ]
      if intextbox(box, newpos) then
        [
        goodposflag = true
        break
        ]
      box = box>>JDSBOX.link
      ] repeat
    break
    ]
  scanchar(scanresult)
  ]
unless nlines eq 0 do
  [
  // move up lower part of box
    let source = vec 3
      source!0 = jdsdat>>DAT.bitbltable>>BITBLTTABLE.bca
      source!1 = jdsdat>>DAT.bitbltable>>BITBLTTABLE.bmw
      source!2 = box>>JDSBOX.x1
      source!3 = scanresult>>CHARSCANDATA.nexty
    let height = box>>JDSBOX.y2 - scanresult>>CHARSCANDATA.nexty + 1
    bitblt(jdsdat, box>>JDSBOX.x1, width, box>>JDSBOX.y1, height,
    replacefunction, source, blocksource, colorblack)
  // blank out last lines
    setbits(jdsdat, box>>JDSBOX.x1, width, box>>JDSBOX.y1 + height, boxheight(box)
    - height, colorwhite)
  ]
// unmark text
  marktext(0, 0)
// now update size, pos, and markers
  box>>JDSBOX.textsize = MAX(0, box>>JDSBOX.textsize - (newpos -
  box>>JDSBOX.textpos))
  box>>JDSBOX.textpos = newpos
  if intextbox(box, rangepos) do
    [
    [illegible]leftxy(box, box>>JDSBOX.rangemark, rangepos)
    [illegible]jdschar(box>>JDSBOX.insertmark, box>>JDSBOX.rangemark)
    ]
  find[illegible](box, box>>JDSBOX.insertmark, insertpos)
  [illegible]jdschar, box>>JDSBOX.insertmark)
  display[illegible](box, jdschar, newpos + box>>JDSBOX.textsize-1) // display rest of
  box
// [illegible]
  [illegible]-1, newpos + 1, true)
]
and [illegible](state, function) be
[
let [illegible] = state eq -1? function, jdscode(jdsinchr())
if [illegible] eq -1 then return
let [illegible]ahead = (incharnum - outcharnum)
if [illegible]ahead ge 5 then breakline(state,0)
[illegible](insertmarker)
if [illegible] eq insertpos then markeroff(rangemarker)
let [illegible]char = vec jdscharsize-1
let [illegible]flag = false
let [illegible]pos = typescriptbox>>JDSBOX.textpos
let [illegible] = jdsboxlist
  [
  if box eq 0 then break
  if intextbox(box, insertpos) then
    unless box>>JDSBOX.insertmark>>MARK.textpos eq 0 do
      [
      test box eq typescriptbox
        ifso
          [
          movejdschar(tempjdschar, box>>JDSBOX.insertmark)
          tempjdschar>>JDSCHAR.textpos = box>>JDSBOX.textpos-1 // make sure
          it is in box
          if scanonechar(box, tempjdschar, char) eq -1 then
            [
            scrolltypescriptbox()
            ]
          ]
        ifnot
          [
          if (oldpos ne stoptextpos) & (intextbox(box,oldpos)) & (insertpos le
          oldpos) then
            [
            overflag = true
            marktext(oldpos-1,oldpos + 1)
            ]
          ]
      let pos = changedisplay(box, box>>JDSBOX.insertmark, char)
      let ignorebits = box>>JDSBOX.hsize eq lshorizcharsize? bigignorebit,
      (intextbox(typescriptbox, pos)? ignorebit, ignorebit + bigignorebit)
      while pos gr insertpos do
        
        [
        pos = pos - textinc
        let char = getjdschar(pos)
        if char<<CHAR.deleted then
          storejdschar(char % ignorebits, pos) // deleted ignore character
        ]
      ]
    box = box>>JDSBOX.link
    ] repeat

  appendjdschar(char, insertpos)
  let textpos = insertpos + textinc
  let box = jdsboxlist
  tempjdschar>>JDSCHAR.textpos = 0
  let scanresult = setcharscan(box, tempjdschar)
    [
    if box eq 0 then break
    if intextbox(box, insertpos) then
      [
      let overflowflag = true
      movejdschar(tempjdschar, box>>JDSBOX.insertmark)
      unless tempjdschar>>JDSCHAR.textpos eq 0 do
        [
        displayjdschar(box, tempjdschar, textpos)
        unless box eq typescriptbox do
          unless findrightxy(box, box>>JDSBOX.insertmark, insertpos) eq -1 do
            overflowflag = false
        ]
      if overflowflag do
        unless box eq typescriptbox do
          [
          fpinvertbits(box>>JDSBOX.x1, boxwidth(box), box>>JDSBOX.y1,
          boxheight(box))
          waitms(100)
          fpinvertbits(box>>JDSBOX.x1, boxwidth(box), box>>JDSBOX.y1,
          boxheight(box))
          ]
      ]
    box = box>>JDSBOX.link
    ] repeat
  let savepos = typescriptbox>>JDSBOX.insertmark>>MARK.textpos
  if rangepos eq insertpos then markeron(rangemarker, rangepos)
  markeron(insertmarker, textpos)
  if typescriptbox>>JDSBOX.insertmark>>MARK.textpos eq 0 then
    unless savepos eq 0 do // scroll window
      [
      scrolltypescriptbox()
      markeron(insertmarker, textpos)
```

```
    }
  oldpos = typescriptbox>>JDSBOX.textpos
  if invertflag then
    marktext(oldpos-1,oldpos + 1)
  ]
and echojdstext(address, nchars) be
  [
  if nchars le 0 then return
  markeroff(insertmarker)
  let tempjdschar = vec jdscharsize-1
  let invertflag = ((typescriptbox>>JDSBOX.textpos + 1) rshift 1) eq ((insertpos + 1) rshift
  1)
  let box = jdsboxlist
    [
    if box eq 0 then break
    if intextbox(box, insertpos) then
      unless box>>JDSBOX.insertmark>>MARK.textpos eq 0 do
        [
        let hinc = box>>JDSBOX.hsize * nchars
        let currx = box>>JDSBOX.insertmark>>MARK.x-box>>JDSBOX.x1
        let tabx = currx + hinc
        let bwidth = boxwidth(box)
        if tabx gr bwidth then tabx = MIN(currx, tabx - bwidth)
        let char = tabx
        char<<CHAR.command = tabcommand
        if box eq typescriptbox then
          {
          movejdschar(tempjdschar, box>>JDSBOX.insertmark)
          tempjdschar>>JDSCHAR.textpos = box>>JDSBOX.textpos // make sure it is
          in box
          if scanonechar(box, tempjdschar, char) eq -1 then
            scrolltypescriptbox()
          }
        let pos = changedisplay(box, box>>JDSBOX.insertmark, char)
        let ignorebits = box>>JDSBOX.hsize eq tabsizecharsize? bigignorebit,
        (intextbox(typescriptbox, pos)? ignorebit, ignorebit + bigignorebit)
        while pos gr insertpos do
          [
          pos = pos - textinc
          let char = getjdschar(pos)
          if char<<CHAR.deleted then
            storejdschar(char % ignorebits, pos) // deleted ignore character
          ]
        ]
    box = box>>JDSBOX.link
    ] repeat

  let textpos = insertpos
  for i = 0 to nchars-1 do
    [
    appendjdschar(address!i, textpos)
    textpos = textpos + textinc
    ]
  let box = jdsboxlist
    {
    if box eq 0 then break
    if intextbox(box, insertpos) then
      unless box>>JDSBOX.insertmark>>MARK.textpos eq 0 do
        [
        displayjdschar(box, box>>JDSBOX.insertmark, textpos, invertflag)
        ]
    box = box>>JDSBOX.link
    ] repeat
  let savepos = typescriptbox>>JDSBOX.insertmark>>MARK.textpos
  markeron(insertmarker, textpos)
  if typescriptbox>>JDSBOX.insertmark>>MARK.textpos eq 0 then
    unless savepos eq 0 do // scroll window
      [
      scrolltypescriptbox()
      markeron(insertmarker, textpos)
      ]
  ]

and bajdschar(state, function) be
  [
  // delete character to left of insertpos
  let textpos = insertpos - 1
  let deletedflag = false
  let prevpos = 0
  let box = typescriptbox>>JDSBOX.link
    [
    if box eq 0 then break
    if intextbox(box, textpos) then
      [
      test endoftext(textpos)
        ifso deletejdschar(textpos)
        ifnot markdeleted(textpos)
      deletedflag = true
      break
      ]
    let lastpos = box>>JDSBOX.textpos + box>>JDSBOX.textsize - 1
    if lastpos ls textpos then
      if lastpos gr prevpos then
        prevpos = lastpos
    box = box>>JDSBOX.link
    ] repeat
  markeroff(insertmarker)
  if insertpos eq rangepos then
    markeroff(rangemarker)
  test deletedflag
    ifnot
      textpos = prevpos eq 0? insertpos, prevpos
    ifso
      [
      textpos = insertpos-textinc
      let box = jdsboxlist
        {
        if box eq 0 then break
        if intextbox(box, insertpos) then
          unless box>>JDSBOX.insertmark>>MARK.textpos eq 0 do
            [
            movejdschar(box>>JDSBOX.insertmark, box>>JDSBOX.rangemark)
            //displayjdschar(box, box>>JDSBOX.insertmark, textpos)
            unless findleftxy(box, box>>JDSBOX.insertmark, textpos) eq -1 do
              [
              let result = scanonechar(box, box>>JDSBOX.insertmark)
              unless result eq -1 do
                [
                blankjdschar(box, lv result>>CHARSCANDATA.startpos, lv
                result>>CHARSCANDATA.nextpos, result eq -2? colorwhite,
                colorlightgrey)
                if insertpos eq rangepos then
                  movejdschar(box>>JDSBOX.rangemark,
                  box>>JDSBOX.insertmark)
                ]
              ]
```

```
            ]
          box = box>>JDSBOX.link
          ] repeat
        ]
    if insertpos eq rangepos then
      markeron(rangemarker, textpos)
    markeron(insertmarker, textpos)
    ]
and putkanji(state, function) be
  [
  // if function = 0, then replace [range, insert] with kanji
  // otherwise, append to insert pos
   // return true if no kanji
  let kanjientry = kanjikeyvect-1
  if kanjientry eq -1 then return
  if function eq 0 then
    [
    deletechar(state, function, endoftext(insertpos)? colorwhite, colorlightgrey)
    ]
  let nkanji = kanjientry>>KANJILIST.numberofkanji
  let kanjiptr = lv kanjientry>>KANJILIST.kanji
  for i = 0 to nkanji-1 do
    unless IN(kanjiptr!i, 0, 7777b) do kanjiptr!i = jdsblankchar
  echojdstext(kanjiptr, nkanji)
  if function eq 0 then
    [
    markeroff(rangemarker)
    markeron(rangemarker, insertpos)
    ]
  kanjikeyvect-1 = -1
  ]
and nokanji(state, function) =
  (kanjikeyvect-1 eq -1)
and restorekana(state, function; numargs n) be
  [
  //until insertpos le rangepos do
    //bsjdschar(state, function)
  if n eq 1 then
    [
    markeroff(rangemarker)
    markeron(rangemarker, state)
    ]
  //deletechar(state, function, colorlightgrey)
  deletechar(state, function, endoftext(insertpos)? colorwhite, colorlightgrey)
  let saveout = savekanaring>>RINGBUFFER.out
  let buff = vec kanaringsize-1
  let nchars = 0
  // start of restore loop
    [
    let char = getring(savekanaring)
    if char eq -1 then break
    //echojdschar(-1, char)
    buff!nchars = char
    nchars = nchars + 1
    if nchars ge kanaringsize then break
    ] repeat
  savekanaring>>RINGBUFFER.out = saveout // for next time
  echojdstext(buff, nchars)
  ]


  // jdspagenumbers jdspagenumbers.ext


  // Declarations

    get "lookdecl"
    get "jdsdecl"


    external // Declared in This File
      [
      displaypageno
      erasepagenumbers
      showpagenumbers
      ]

    external // Declared in Other Files
      [
      copystring
      feedbackstr
      fpsetbits
      jdsdat
      measurechar
      numtostr
      pagenodisplayinfo
      pagenumberson
      putachar
      setbits
      typescriptbox
      unsigneddivide
      ]

  // Code
    let showpagenumbers(file, page0, currentpage; numargs n) be
      [
      test file eq 0
        ifso
          {
          erasepagenumbers() // no file there
          }
        ifnot
          [
          if n [illegible] 2 then currentpage = 0
          for i = 1 to maxdocumentpages do
            displaypageno(i, i eq currentpage? 2, (page0!i eq 0? 0, 1))
          pagenumberson = true
          ]
      ]
   and erasepagenumbers(feedbackflag; numargs n) be
     [
     unless n eq 1 do feedbackflag = true
     // [illegible] page number area to white
       fpsetbits( pagenodisplayinfo>>PAGENODISPLAY.x,
       pagenodisplayinfo>>PAGENODISPLAY.width,
       pagenodisplayinfo>>PAGENODISPLAY.y,
       pagenodisplayinfo>>PAGENODISPLAY.lineheight * maxdocumentpages,
       colorwhite)
       pagenumberson = false
     if feedbackflag then
       feedbackstr(currentpagex, currentpagey, currentpagewidth, "")
     ]
  and displaypageno(pageno, option) be
    [
    // if option = 0, grey background
    // option = 1 for black on white
    // option = 2 for while on black
```

```
pageno = MAX(1, MIN(pageno, maxdocumentpages))
let leftx = pagenodisplayinfo>>PAGENODISPLAY.x
if option eq 2 then
  [
  let str = vec 5
  copystring("Page ", str)
  numtostr(str, pageno, 10)
  feedbackstr(currentpagex, currentpagey, currentpagewidth, str)
  ]
let lineheight = pagenodisplayinfo>>PAGENODISPLAY.lineheight
let yinc = (pageno-1)*lineheight
let y = pagenodisplayinfo>>PAGENODISPLAY.y + yinc

// see if overlaps typescript box
  unless typescriptbox>>JDSBOX.textpos eq stoptextpos do
    [
    if IN(y, typescriptbox>>JDSBOX.y1, typescriptbox>>JDSBOX.y2) then return
    if IN(y + lineheight, typescriptbox>>JDSBOX.y1, typescriptbox>>JDSBOX.y2) then
    return
    ]
// Set background

  setbits(jdsdat, leftx, pagenodisplayinfo>>PAGENODISPLAY.width, y, lineheight,
  table[ colorlightgrey, colorwhite; colorblack] ! option)

// set up bitblttable for black characters

  jdsdat>>DAT.bitblttable>>BITBLTTABLE.operation = option eq 2? invertfunction,
  paintfunction
  jdsdat>>DAT.bitblttable>>BITBLTTABLE.greycode = -1

let basey = pagenodisplayinfo>>PAGENODISPLAY.ybase + yinc
let tens, ones = nil, nil
tens = unsigneddivide(pageno, 10, lv ones)
unless tens eq 0 do
  putachar(jdsdat, tens + $0, leftx, basey)
putachar(jdsdat, ones + $0, leftx + measurechar($0), basey)
]

// jdspress.jdspress.ext

// Declarations

  get "tooldecl"
  get "jdsdecl"
  get "fonttooldecl"


  external // Declared in This File
    [
    colorpage
    jdsprintpage
    ]

  external // Declared in Other Files
    [
    boxheight
    boxwidth
    charscan
    checkdiskspace
    expandbox
    inputregister
    jdsdat
    jdstext
    presscharacter
    pressfile
    pressfileclose
    pressfileopen
    presslinkfont
    presspage
    pressrectangle
    presssetfont
    pressstartentitylist
    showdiskspace
    typescriptbox
    ]


  static
    [
    colorpage
    currentfont
    fonttest
    fontsize
    ]

// Code

  let jdsprintpage(state, value) be
    [
    // inputregister = file name
    if seterror() then return
    //close(jdsfile) // for now
    if (colorpage eq 0) % (pressfile eq 0) then
      [
      let npages = ((jdstext!1) * 5 + 255)/256 + 3 // approx space needed for a file
      if colorpage ne 0 then npages = npages lshift 1 + npages // * 3
      npages = npages + 3 // for part and font and document directories
      unless checkdiskspace(npages) do return // not enough space
      pressfileopen(inputregister)
      ]
    let fontlist = 0
    // initialize the fonts
      // ASCII = gacha12MRE font # 0
        presslinkfont(lv fontlist, "GACHA", 12, 12, space, 177b)// face = MRE
      // KANA font # 1
        presslinkfont(lv fontlist, "KANA", 12, 0, 0, 377b)
      // and kanji font # 2-13
        let kanjiname = "KANJIAA"
        for i = 0 to 11 do
          [
          kanjiname>>STRING.char↑6 = $A + i
          presslinkfont(lv fontlist, kanjiname, 12, 0, 0, 377b)
          ]
      // Punctuation = ROMAJI font # 14
        presslinkfont(lv fontlist, "ROMAJI", 12, 0, 0, 377b)//
    // dummy up the jdsdat to make the page come out right
      let savex1, savey1 = jdsdat>>DAT.x1, jdsdat>>DAT.y1
      jdsdat>>DAT.x1 = 0
      jdsdat>>DAT.y1 = 0
      jdsdat>>DAT.x2 = jdsdat>>DAT.x2 - savex1
      jdsdat>>DAT.y2 = jdsdat>>DAT.y2 - savey1
    test fonttest eq 0
      ifso
        [
        pressstartentitylist()
      // set up for ASCII to start
        currentfont = 0
        presssetfont(currentfont)
      let box = typescriptbox>>JDSBOX.link
        [ // start of print box loop
        if box eq 0 then break
        printjdsbox(box)
        box = box>>JDSBOX.link
        ] repeat
      presspage()
      ]
    ifnot
      [
      //for i = 1 to 12 do
      let i = fonttest
        [
        pressstartentitylist()
        presssetfont(i)
        let char = 0
        let box = vec 3
        box>>BOX.x1 = lefttextmargin + 64
        box>>BOX.y1 = 64
        box>>BOX.x2 = lefttextmargin + 64 + 127
        box>>BOX.y2 = 64 + 127
        printboxoutline(jdsdat, box)
        for y = 64 to 64 + 128-1 by 8 do
          for x = 64 to 64 + 128-1 by 8 do
            [
            presscharacter(jdsdat, x, y + 6-1, char) // add ascent to y
            char = char + 1
            ]
        presspage()
        ]
      fonttest = fonttest eq 14? 1, fonttest + 1
      ]
    jdsdat>>DAT.x1 = savex1
    jdsdat>>DAT.y1 = savex1
    jdsdat>>DAT.x2 = jdsdat>>DAT.x2 + savex1
    jdsdat>>DAT.y2 = jdsdat>>DAT.y2 + savey1
    colorpage = MAX(0, colorpage-1)
    if colorpage eq 0 then
      [
      pressfileclose(fontlist)
      showdiskspace()
      ]
    while fontlist ne 0 do
      [
      let f = @fontlist
      retmem(fontlist)
      fontlist = f
      ]
    //jdsfile = open(jdsfilename, readwrite)
    ]

and printjdsbox(box) be
    [
    if box>>JDSBOX.borderflag then
      [
      printboxoutline(jdsdat, box)
      ]
    let jdschar = vec jdscharsize-1
    let lastpos = 0
    if box>>JDSBOX.fixedtextpos ne 0 then
      if box>>JDSBOX.fixedtextsize ne 0 then
        [
        let savetextpos, savetextsize = box>>JDSBOX.textpos, box>>JDSBOX.textsize
        box>>JDSBOX.textpos = box>>JDSBOX.fixedtextpos
        box>>JDSBOX.textsize = box>>JDSBOX.fixedtextsize
        jdschar>>JDSCHAR.textpos = box>>JDSBOX.textpos-1
        jdschar>>JDSCHAR.x = box>>JDSBOX.x1
        jdschar>>JDSCHAR.y = box>>JDSBOX.y1
        lastpos = box>>JDSBOX.textpos + box>>JDSBOX.textsize-1
        fontsize = box>>JDSBOX.fsize eq horzchar fsize? 1, 2
        charscan(box, jdschar, lastpos, printjdschar)
        box>>JDSBOX.textpos, box>>JDSBOX.textsize = savetextpos, savetextsize
        ]
    jdschar>>JDSCHAR.textpos = 0
    lastpos = box>>JDSBOX.textpos + box>>JDSBOX.textsize-1
    charscan(box, jdschar, lastpos, printjdschar)
    ]
and printjdschar(char, x, y) =
    valof[
    let font = nil
    test char ls 1000b
      ifso
        test IN(char, 210b, 313b) // romaji
          ifso
            [
            font = 0
            test IN(char, 210b, 227b) // 0-9
              ifso char = char - 216b + $0
              ifnot
                test IN(char, 230b, 261b) // A-Z
                  ifso char = char - 230b + $A
                  ifnot char = char - 262b + $a
            ]
          ifnot
            [
            test IN(char, 42b, 215b) // punctuation
              ifso
                font = 14
              ifnot // must be kana
                [
                unless char gr 400b do resultis false
                test char gr 600b
                  ifso // katakana
                    char = char - 600b + 163b
                  ifnot // hiragana
                    char = char - 400b + 40b
                font = 1
                ]
            ]
      ifnot
        [
        char = char - 1000b
        font = (char rshift 8) + 2
        char = char & 377b
        ]
    font = MAX(0, MIN(font, 15))
    unless font eq currentfont do
      [
      presssetfont(font)
      currentfont = font
      ]
    presscharacter(jdsdat, x-lefttextmargin, y + 6-1, char) // add ascent to y
    resultis false
```

```
}
and printboxoutline(dat. box) be
  [
  // for y. the positive direction is DOWN the page. but the height of the rectangle
  extends UP the page from y

    let box1 = vec 3
    expandbox(box. box1)
    let width, height = boxwidth(box1) + outlinewidth, boxheight(box1) +
    outlinewidth
    let x, y = box1>>JDSBOX x1 - outlinewidth - lefttextmargin, box1>>JDSBOX.y1-1

  // for y. the positive direction is DOWN the page, but the height of the rectangle
  extends UP the page from y

  // top
    pressrectangle(dat, x, y, width, outlinewidth) // top horiz line
  // right side
    pressrectangle(dat, x + width, y + height - outlinewidth, outlinewidth, height) //
    right side
  // bottom
    pressrectangle(dat, x + outlinewidth, y + height, width, outlinewidth) // bottom
    horiz line
  // left side
    pressrectangle(dat, x, y + height, outlinewidth, height) // left side
  ]

and printmaptoascii(keyboardcode) =
  valof[
  compileif false then
    [
    resultis
    "546e7duv0k p7\*000*0003?vqsa9xol ]t*0001*000*000l*000cjbz*000;*000+*000*000
    rlgyh9orn*000
    [=*001*000*000*000%$~E$DUV]K*140P?|*000*000#@WGSA(IXOL<""*175*176*000!
    *000*00F*0aCJBZ*000z*000(*000*000fITGYH*NM*000*000*173+*000*000*000*00
    0">>STRING char(MAX(0, MIN(keyboardcode. 177b)))
    ]
  ]

and maptokana(keyboardcode) =
  valof[
  // returnlh = font #, rh = code
  // 1100 = no character
  compileif false then
  [
  let char = table[
    // 0
      6; 6; 10; 4; 68; 23; 42; 50;
      79; 46; 59; 27; 65; 82; 0; 0;
      2; 53; 38; 31; 40; 33; 72; 43;
      21; 73; 74; 45; 17; 77; 0; 0;
    // 40
      44; 7075b; 0; 47; 0; 20; 62; 19;
      36; 0; 75; 76; 0; 0; 0; 0;
      25; 11; 13; 83; 15; 70; 63; 66;
      0; 0; 64; 56; 0; 0; 0; 0;
    // 100
      81; 0; 7157b; 80; 7066b; 24; 0; 51;
      7070b; 0; 60; 28; 7051b; 7071b; 0; 0;
      7215b; 54; 39; 32; 41; 34; 7067b; 0;
      22; 7072b; 0; 7042b; 16; 7127b; 0; 0;
    // 140
      7052b; 7065b; 0; 48; 0; 30; 0; 20;
      37; 0; 7043b; 0; 0; 0; 0; 0;
      26; 12; 22; 0; 18; 7207b; 0; 0;
      0; 0; 7126b; 57; 0; 0; 0; 0;
    // 200
      7; 5; 9; 4; 67; 0; 0; 52;
      78; 0; 61; 0; 0; 0; 0; 0;
      1; 55; 0; 0; 0; 0; 71; 0;
      0; 0; 0; 0; 0; 7131b; 0; 0;
    // 240
      0; 0; 0; 49; 0; 0; 0; 0;
      35; 0; 0; 0; 0; 0; 0; 0;
      0; 0; 0; 0; 0; 69; 0; 0;
      0; 0; 7130b; 58; 0; 0; 0; 0
    ] !keyboardcode
  if char le 337b then
    char = char + 440b
  resultis char
  ]
  ]

// jdsprint jdsprint.oxt

// Declarations

  get "tooldecl"
  get "jdsdecl"
  get "fonttooldecl"

  external // Declared in This File
    [
    jdsprintmarrow
    ]

  external // Declared in Other Files
    [
    bitblt
    closejdspage
    copydat
    diskbuffer
    displaykeytops
    displaymarrowstack
    expandbox
    feedbackstr
    feedbackx
    firstmarrowpage
    freediskblock
    getdiskblock
    jdsboxlist
    jdsdat
    jdsfile
    jdspage
    jdspage0
    kanjibuffer
    kanjistack
    keytopdat
    marrowfile
    measurechar
    numtostr
    printkanjifile
    putmarrowchar
    readdisk
    readtextdisplay
    resetmarrow
```

```
    setmarchar
    setfonts
    setmarscan
    setpagenumbers
    strikefonts
    ttydat
    typescriptbox
    windows
    workfile
    writedisk
    writestring
    ]

  static
    [
    debugprint
    mdat
    ]
  manifest trapflag = false


// Code

  let jdsprintmarrow(state, value) be
    [
    let ntimes = 1
    if marrowfile eq 0 then return
    if typescriptbox>>JDSBOX link eq 0 then return
    let savekstack = kanjstack!-1
    closejdspage(jdsboxlist, jdspage, false)
    let dcb = 0!DCBChainHead
    dcb = dcb>>DCB link // dcb for keyboard
      let savewordsperscanline = dcb>>DCB wordsperscanline
      dcb>>DCB wordsperscanline = 0
    dcb = dcb>>DCB link // dcb for tty
    let savedcb = dcb>>DCB link
      dcb>>DCB link = 0
    let savebmapsize = 0
    unless adeerror() do
      [
      // set up MARROW dat
        mdat = copydat(jdsdat)
    kanjstack!-1 = mdat
    kanjstack!0 = 0
    let bitblttable = mdat>>DAT.bitblttable
    let oldbmw = bitblttable>>BITBLTTABLE.bmw
    let bmapsize = mdat>>DAT.height *oldbmw
    savebmapsize = bmapsize
    let bca = bitblttable>>BITBLTTABLE.bca
   // get marrow files
    // use keytopdat for page map1, displaydat for 2
    let pagemap = keytopdat>>DAT.bitblttable>>BITBLTTABLE.bca
      readdisk(workfile, 16, pagemap, 1)
      let npages = (pagemap!0 + 256)/256
      readdisk(workfile, 16, pagemap, npages)
      printkanjifile = getdiskblock("jds32x32.strike", read, diskbuffer, pagemap + 1,
      pagemap)
      if printkanjifile eq 0 then localcallerror(1)
    let marrowstart = 16 + npages
    pagemap = bca
      readdisk(workfile, marrowstart, pagemap, 1)
      let nwords = pagemap!0
      npages = (nwords + 256)/256
      readdisk(workfile, marrowstart, pagemap, npages)
      marrowfile = getdiskblock("marrow.bitmap", read, diskbuffer, pagemap + 1,
      pagemap)
      if marrowfile eq 0 then localcallerror(1)
   // and update mdat
    bca = (bca + nwords) & -2 // force even
    bitblttable>>BITBLTTABLE bca = bca
    bmapsize = bmapsize - nwords
   // and modify the size of mdat
    bitblttable>>BITBLTTABLE.bmw = 105
    let ntracks = (bmapsize/105)/29
    let datheight = ntracks*29
    bmapsize = datheight * 105
    mdat>>DAT.xoffset = 0
    mdat>>DAT width = 1680
    mdat>>DAT.x1 = 0
      mdat>>DAT.x2 = 1679
    mdat>>DAT.y1 = 0
    let source = vec 3
      source!0 = bca
      source!1 = 105
  // Loop on dat window
    let wordspertrack = 105*29
    let scanlines = 2272
  // set up progress message
    let numiters = (scanlines + datheight-1)/datheight
    feedbackx = feedbackstr(msgx, msgy, msgwidth, "Passes = ")
    let numwidth = measurechar($0)
    let numx = feedbackx
    feedbackx = feedbackx + numwidth
    let feedbacky = msgy + (strikefonts!0)>>STRIKESEG ascent
    feedbackx = feedbackx + writestring(ttydat, "0/" feedbackx, feedbacky)
    let str = vec 3
      str>>STRING.count = 0
      numtostr(str, numiters, 10)
      writestring(ttydat, str, feedbackx, feedbacky)
    let npasses = 0
    let pageno = firstmarrowpage
  // now start loop
    [
    let glump = MIN(datheight, scanlines)
    if glump le 0 then break
    clear(bitblttable>>BITBLTTABLE.bca, bmapsize)
    mdat>>DAT height = glump
    mdat>>DAT y2 = mdat>>DAT y1 + glump - 1
    let box = typescriptbox>>JDSBOX link
      [
      if box eq 0 then break
      printmarrowbox(box)
      box = box>>JDSBOX link
      ] repeat
    test debugprint ne 0
      ifso
        [
        // debug display
        source!2 = (debugprint-1)*oldbmw*16
        source!3 = 0
        bitblt(keytopdat, 0, oldbmw* 16, 0, glump, replacefunction, source,
        blacksource, colorblack)
        waitms(1000)
        ]
  ifnot
    [
    let bufladdr = bca
```

```
for i = 0 to ntracks-1 do
  [
    writedisk(marrowfile, pageno, buffaddr, 12)
    buffaddr = buffaddr + wordspertrack
    pageno = pageno + 12
    ]
  ]
mdat>>DAT.y1 = mdat>>DAT.y2 + 1
scanlines = scanlines - glump
npasses = npasses + 1
str>>STRING.count = 0
numtostr(str, npasses, 10)
test str>>STRING.count eq 1
  ifso
    writestring(ttydat, str, numx + numwidth, feedbacky)
  ifnot
    writestring(ttydat, str, numx, feedbacky)
] repeat
// buffer addresses for runmarrow must be odd
  bca = ((bca + 2) & -2) - 1
for i = 1 to ntimes do
  runmarrow(bca, ((bca + 12*256 + 3) & -2) - 1)
 }
unless printkanjifile eq 0 do
  freediskblock(printkanjifile, false, false)
unless marrowfile eq 0 do
  freediskblock(marrowfile, false, false)
unless mdat eq 0 do
  {
  retmem(mdat>>DAT.bitbittable!-1)
  mdat = retmem(mdat)
  }
kanjistack!-1 = savekstack
kanjistack!0 = 0
displaykeytops(-1)
dcb = 0!DCBChainHead
dcb = dcb>>DCB.link // dcb for keyboard
  dcb>>DCB.wordsperscanline = savewordsperscanline
dcb = dcb>>DCB.link // dcb for tty
// re-establish text display area
  re...textdisplay(0, textareaheight-1)
  sh...genumbers(jdsfile,jdspage0, jdspage)
 ...b>>DCB.link = savedcb
}

and printmarrowbox(box) be
  {
  compileif trapflag then
    [
    unless 0!0 eq 0 do
      unless @(0!0) eq 0!1 do localcallerror("Trap")
    ]
  let jdschar = vec jdscharsize-1
  let lastpos = 0
  if box>>JDSBOX.fixedtextpos ne 0 then
    if box>>JDSBOX.fixedtextsize ne 0 then
      [
      let savetextpos, savetextsize = box>>JDSBOX.textpos, box>>JDSBOX.textsize
      box>>JDSBOX.textpos = box>>JDSBOX.fixedtextpos
      box>>JDSBOX.textsize = box>>JDSBOX.fixedtextsize
      jdschar>>JDSCHAR.textpos = box>>JDSBOX.textpos-1
      jdschar>>JDSCHAR.x = box>>JDSBOX.x1
      jdschar>>JDSCHAR.y = box>>JDSBOX.y1
      printmarrowtext(box, jdschar)
      box>>JDSBOX.textpos, box>>JDSBOX.textsize = savetextpos, savetextsize
      ]
  jdschar>>JDSCHAR.textpos = 0
  printmarrowtext(box, jdschar)
  if box>>JDSBOX.borderflag then
    [
    printmarrowoutline(box)
    ]
  compileif trapflag then
    [
    unless 0!0 eq 0 do
      unless @(0!0) eq 0!1 do localcallerror("Trap")
    ]
  ]
and printmarrowtext(box, jdschar) be
  [
  compileif trapflag then
    [
    unless 0!0 eq 0 do
      unless @(0!0) eq 0!1 do localcallerror("Trap")
    ]
  let firsty = MAX(0, mdat>>DAT.y1-29) rshift 2
  let lasty = (mdat>>DAT.y2 + 3) rshift 2
  // jdschar>>JDSCHAR.textpos = 0
  let scanresult = setcharscan(box, jdschar)
  while scanchar(scanresult) ge 0 do
    if scanresult>>CHARSCANDATA.nexty ge firsty then break
  let Size = (box>>JDSBOX.hsize eq horizchar1size)? 10b, 0
  // start of printing loop
    [
    if scanresult>>CHARSCANDATA.starty gr lasty then break // all done
    let char = scanresult>>CHARSCANDATA.character
    if char is 0 then break
    test (char eq deletedjdschar) % (char eq jdsblankchar)
      ifso // simply write out blank
        [
        //let lefty = scanresult>>CHARSCANDATA.starty lshift 2
        //setbits(mdat, scanresult>>CHARSCANDATA.startx lshift 2, 32, lefty -
        mdat>>DAT.y1, MAX(0, MIN(32, mdat>>DAT.y2 - lefty + 1)), char eq
        jdsblankchar? colorwhite, colorlightgrey)
        ]
      ifnot
        [
        compileif false then
          [
          if char ls 1000b then
            test IN(char, firstromaji, lastromaji)
              ifso
                char = marrowmaptoascii(char)
              ifnot
                [
                test IN(char, firsthiragana, lasthiragana)
                  ifso
                    char = marrowmaptokana(char - firsthiragana)
                  ifnot
                    [
                    char = marrowmaptokana(char - firstkatakana)
                    if IN(char, 401b, 577b) then
                      char = char + 200b
                    ]
                ]
          ]
        if putmarrowchar(char, scanresult>>CHARSCANDATA.startx,
        scanresult>>CHARSCANDATA.starty, Size) then
          [
          displaymarrowstack(kanjibuffer)
          putmarrowchar(char, scanresult>>CHARSCANDATA.startx,
          scanresult>>CHARSCANDATA.starty, Size)
          ]
        ]
    scanchar(scanresult)
    ] repeat
  compileif trapflag then
    [
    unless 0!0 eq 0 do
      unless @(0!0) eq 0!1 do localcallerror("Trap")
    ]
  displaymarrowstack(kanjibuffer)
  compileif trapflag then
    [
    unless 0!0 eq 0 do
      unless @(0!0) eq 0!1 do localcallerror("Trap")
    ]
  ]
and printmarrowoutline(box) be
  [
  let linewidth = outlinewidth lshift 2

  let box1 = vec 3
  expandbox(box,box1)
  let x1 = box1>>BOX.x1 - lefttextmargin
    x1 = (x1 - outlinewidth) lshift 2
    let x2 = (box1>>BOX.x2 - lefttextmargin + outlinewidth) lshift 2
    let width = x2 - MAX(0, x1) + linewidth

  let y1 = box1>>BOX.y1
    y1 = (y1 - outlinewidth) lshift 2
    let y2 = (box1>>BOX.y2 + outlinewidth) lshift 2

  let mdaty1 = mdat>>DAT.y1
  let mdaty2 = mdat>>DAT.y2
  let basey = mdaty1 - linewidth + 1

  if basey gr y2 then return
  if mdaty2 ls y1 then return
  // top horizontal
    if IN(y1, basey, mdaty2) then // we will draw a portion at least
      [
      let height = MIN(linewidth, MIN(y1 - basey, mdaty2 - y1) + 1)
      y1 = MAX(y1, mdaty1)
      setbits(mdat, x1, width, y1-mdaty1, height)
      ]
  // bottom horizontal
    if IN(y2, basey, mdaty2) then
      [
      let height = MIN(linewidth, MIN(y2 - basey, mdaty2 - y2) + 1)
      y2 = MAX(y2, mdaty1)
      setbits(mdat, x1, width, y2-mdaty1, height)
      ]
  // and the sides
    y1 = MAX(mdaty1, MIN(y1, mdaty2))
    y2 = MAX(mdaty1, MIN(y2, mdaty2))
    let height = y2 - y1 + 1
    setbits(mdat, x1, linewidth, y1-mdaty1, height)
    setbits(mdat, x2, linewidth, y1-mdaty1, height)
  ]

and marrowmaptokana(keyboardcode) =
  valof[
  compileif false then
  [
  // return lh = font #, rh = code
  // 440b = no character
  let char = table[
    // 0
     8; 6; 10; 4; 68; 23; 42; 50;
     79; 46; 59; 27; 65; 82; 0; 0;
     2; 53; 38; 31; 40; 33; 72; 43;
     21; 73; 74; 45; 17; 77; 0; 0;
    // 40
     44; 7075b; 0; 47; 0; 29; 62; 19;
     36; 0; 75; 76; 0; 0; 0; 0;
     25; 11; 13; 83; 15; 70; 63; 66;
     0; 0; 64; 56; 0; 0; 0; 0;
    // 100
     81; 0; 7157b; 80; 7066b; 24; 0; 51;
     7070b; 0; 60; 28; 7051b; 7071b; 0; 0;
     7215b; 54; 39; 32; 41; 34; 7067b; 0;
     22; 7072b; 0; 7042b; 18; 7127b; 0; 0;
    // 140
     7055b; 7065b; 0; 48; 0; 30; 0; 20;
     37; 0; 7043b; 0; 0; 0; 0; 0;
     26; 12; 22; 0; 16; 7207b; 0; 0;
     0; 0; 7126b; 57; 0; 0; 0; 0;
    // 200
     7; 5; 9; 4; 67; 0; 0; 52;
     78; 0; 61; 0; 0; 0; 0; 0;
     1; 55; 0; 0; 0; 0; 71; 0;
     0; 0; 0; 0; 0; 7131b; 0; 0;
    // 240
     0; 0; 0; 49; 0; 0; 0; 0;
     35; 0; 0; 0; 0; 0; 0; 0;
     0; 0; 0; 0; 0; 69; 0; 0;
     0; 0; 7130b; 58; 0; 0; 0; 0
    ] !keyboardcode
  test char ls 177b
    ifso char = char + 400b
    ifnot char = char & 377b
  resultis char
  ]
  ]

and marrowmaptoascii(keyboardcode) =
  valof[
  compileif false then
  [
  resultis table[
    // 0
      223b; 222b; 224b; 266b; 225b; 265b; 306b; 307b; // "546e7duv"
      216b; 274b; 76b; 301b; 77b; 100b; 0b; 0b; // "0k p7\"000"000"
    // 20
      221b; 220b; 310b; 302b; 304b; 262b; 227b; 272b; // "32wqsa9i"
      311b; 300b; 275b; 44b; 55b; 117b; 212b; 0b; // "xol.]!"000"
    // 40
      217b; 0b; 0b; 267b; 0b; 264b; 273b; 263b; // "1"000"000f"000gh"
      313b; 0b; 43b; 50b; 0b; 211b; 0b; 0b; // "z"000 :"000 "000"000"
    // 60
      303b; 305b; 270b; 312b; 271b; 226b; 277b; 276b; // "rtgyh8nm"
      0b; 0b; 116b; 141b; 0b; 0b; 0b; 0b; // "000[ - "000"000"000"000"
    // 100
```

```
163b; 160b; 157b; 234b; 165b; 233b; 264b; 255b; // "%$-1 &DUY"
113b; 242b; 67b; 247b; 51b; 103b; 0b; 0b; // "|K*140P?|*000*000"
// 120
164b; 167b; 256b; 250b; 257b; 230b; 112b; 240b; // "#@WOSA()"
257b; 240b; 243b; 127b; 110b; 121b; 101b; 0b; // "XOI<"")*176*000"
// 140
52b; 0b; 0b; 235b; 0b; 232b; 241b; 231b; // "!*000*000!*000C.H"
261b; 0b; 123b; 47b; 0b; 212b; 0b; 0b; // "Z*000:*0001*000*000"
// 160
251b; 253b; 230b; 260b; 237b; 160b; 245b; 244b; // "RTGYI!**NM"
0b; 0b; 120b; 134b; 0b; 0b; 0b; 0 // "*000*000[+*000*000*000*000"
]!(MAX(0, MIN(keyboardcode, 177b)))
]

// jdsresdisplay jdsresdisplay.ext

// Declarations

  get "tookdecl"
  get "jdsdecl"

  external // Declared In This File
    [
    asmfpbitblt
    blankjdschar
    breakbox
    breakline
    displaykeytops
    fpbitblt
    fpinvertbits
    fpsetbits
    invertmarker
    putsize1char
    putsize2char
    removeblink
    startblink
    stopblink
    updatedisplay
    ]

  external // Declared in Other Files
    [
    appendjdschar
    asmbitblt
    asmfastblt
    bitblt
    blinklist
    boxheight
    boxwidth
    brokentest
    displayon
    emptyfbox
    fileentry
    findentry
    fullsizebox
    hiraganafont
    insertpos
    inlextbox
    jdsfontst
    jdsdat
    jdspassinc
    katakanafont
    keytopdat
    markeroff
    markeron
    movejdschar
    MoveBlock
    options
    outlinejdsbox
    rangepos
    romajifont
    SetBlock
    storejdschar
    trimbox
    typescriptbox
    ]

// Code
  let displayKeytops(keyvector) be
    [
    // if keyvector = 0, clear keytop area
    // if keyvector = -1, clear and write black keytops
    // otherwise, write a blank keytop wherever keyvector!keypos eq -1
    let nlines = keytopdat>>DAT.height
    let width, height = 18, 20
    let source = vec 3
    source!0 = table[
      007774b; 0;
      007774b; 0;
      030003b; 0;
      030003b; 0;
      140000b; 140000b;
      140000b; 140000b;
      140000b; 140000b;
      140000b; 140000b;
      140000b; 140000b;
      140000b; 140000b;
      140000b; 140000b;
      140000b; 140000b;
      140000b; 140000b;
      140000b; 140000b;
      030003b; 0;
      030003b; 0;
      007774b; 0;
      007774b; 0;
      0; 0;
      0; 0;
      ]
    source!1 = 2
    source!2 = 0
    source!3 = 0
    let bitblttable = keytopdat>>DAT.bitblttable
    if IN(keyvector, -1, 0) then
      [
      clear(bitblttable>>BITBLTTABLE.bca, bitblttable>>BITBLTTABLE.bmw*nlines)
      if keyvector eq 0 then return
      ]
    let xstart, y = 0, 0
    let keypos = 0
    for i = 0 to vertkeys-1 do
      [
      let x = xstart
      for j = 0 to horizkeys-1 do
        [
        if j eq 5 then
          x = x + keywidth/2
        if (keyvector eq -1? -1, keyvector!keypos) eq -1 then
          bitblt(keytopdat, x, width, y, height, replacefunction, source, blocksource,
          colorblack)
        x = x + keywidth
        keypos = keypos + 1
        ]
      xstart = xstart + keyoffset
      y = y + keyheight
      ]
    if keytopdat>>DAT.link eq -1 then displayon(keytopdat)
    ]

and updatedisplay(box, source, dest) be
  [
  let asmbltroutine = box eq typescriptbox? asmbitblt, asmfpbitblt
  let bltroutine = box eq typescriptbox? bitblt, fpbitblt
  let lineheight = box>>JDSBOX.vsize
  let bitblttable = jdsdat>>DAT.bitblttable
  // set up basic arguments
    bitblttable>>BITBLTTABLE.operation = replacefunction
    bitblttable>>BITBLTTABLE.sourcetype = blocksource
    bitblttable>>BITBLTTABLE.sourcebca = bitblttable>>BITBLTTABLE.bca
    bitblttable>>BITBLTTABLE.sourcebmw = bitblttable>>BITBLTTABLE.bmw
    bitblttable>>BITBLTTABLE.height = lineheight
    bitblttable>>BITBLTTABLE.greycode = -1
  // compute x1, x2
    let x1, y1, x2, y2 = nil, nil, nil, nil
    trimbox(box, lv x1)
    x2 = x2 + 1
  // compute y1, y2
    y2 = MAX(y1, y2-lineheight + 1)
  let xdest, ydest = dest>>JDSCHAR.x, dest>>JDSCHAR.y
  let x1source, y1source = source>>CHARSCANDATA.startx,
  source>>CHARSCANDATA.starty
  let x2source, y2source = source>>CHARSCANDATA.nextx,
  source>>CHARSCANDATA.nexty
  let xoffset = xdest - x2source
  // Now take care of right to left moves
    if xoffset ls 0 then
      [
      // move bottom section, and make xoffset > 0
        xoffset = xdest - x1
        x2source = x2source - xoffset
        bitblttable>>BITBLTTABLE.sourceleftx = x2source
          bitblttable>>BITBLTTABLE.width = xoffset
        bitblttable>>BITBLTTABLE.sourcetopy = y2source
        bitblttable>>BITBLTTABLE.leftx = x1
        bitblttable>>BITBLTTABLE.topy = ydest
        if ydest le y2 then
          asmbltroutine(bitblttable)
      ydest = ydest - lineheight
      xdest = x2
      xoffset = xdest - x2source
      ]
  if y1source ne y2source then // move lower lines
    [
    // first move ragged portion
      bitblttable>>BITBLTTABLE.sourceleftx = x1
        bitblttable>>BITBLTTABLE.width = x2source - x1
      bitblttable>>BITBLTTABLE.sourcetopy = y2source
      bitblttable>>BITBLTTABLE.leftx = x1 + xoffset
      bitblttable>>BITBLTTABLE.topy = ydest
      if ydest le y2 then
        asmbltroutine(bitblttable)
    // Now move intermediate lines
      // start of loop
        [
        y2source = y2source - lineheight
        // first move right end of source line to start of dest
          bitblttable>>BITBLTTABLE.sourceleftx = x2-xoffset
            bitblttable>>BITBLTTABLE.width = xoffset
          bitblttable>>BITBLTTABLE.sourcetopy = y2source
          bitblttable>>BITBLTTABLE.leftx = x1
          //bitblttable>>BITBLTTABLE.topy = ydest
          if ydest le y2 then
            asmbltroutine(bitblttable)
        ydest = ydest - lineheight
        if y2source le y1source then break
        // Now move remainder of line to right
          bitblttable>>BITBLTTABLE.sourceleftx = x1
            bitblttable>>BITBLTTABLE.width = x2 - x1 - xoffset
          //bitblttable>>BITBLTTABLE.sourcetopy = y2source
          bitblttable>>BITBLTTABLE.leftx = x1 + xoffset
          bitblttable>>BITBLTTABLE.topy = ydest
          if ydest le y2 then
            asmbltroutine(bitblttable)
        ] repeat
    // set up for top line move
      x2source = x2-xoffset
      xdest = x2
    ]
  // and finally the top line
    bitblttable>>BITBLTTABLE.sourceleftx = x1source
      bitblttable>>BITBLTTABLE.width = x2source - x1source
    bitblttable>>BITBLTTABLE.sourcetopy = y1source
    bitblttable>>BITBLTTABLE.leftx = x1source + xoffset
    bitblttable>>BITBLTTABLE.topy = ydest
    if ydest le y2 then
      asmbltroutine(bitblttable)
  ]

and putsize1char(char, x, y) =
  valof[ // put a small (7X7) character at indicated loc
  let fontbitblttable = nil
  test IN(char, 42b, 720b)
    ifso
      [
      fontbitblttable = romajifont
      char = char - 42b
      ]
    ifnot
      [
      fpsetbits(x, 7, y, 7, colordarkgrey)
      resultis false
      ]
  //fastbitblt(jdsdat, x, 7, y, 7, replacefunction, font, blocksource, colorblack)
  fontbitblttable>>BITBLTTABLE.sourceleftx = (((char lshift 1) + char) lshift 1) + char
  //char*7
  fontbitblttable>>BITBLTTABLE.leftx = x
  fontbitblttable>>BITBLTTABLE.topy = y
  test typescriptbox>>JDSBOX.textpos eq stoptextpos
    ifso
      asmbitblt(fontbitblttable)
    ifnot
      asmfpbitblt(fontbitblttable)
      //[
      // bitblt but only around typescript window
      //test IN(y, typescriptbox>>BOX.y1 - 9, typescriptbox>>BOX.y2 + 2)
```

```
    //ifso // must do it in parts
      //[
      //let y1, y2 = typescriptbox>>BOX.y1-2, //MAX(typescriptbox>>BOX.y2 + 3,
      y)
      //fontbitbltable>>BITBLTTABLE.height = MAX(0, MIN(7, y1-y))
      //asmbitblt(fontbitbltable)

      //fontbitbltable>>BITBLTTABLE.topy = y2
      //fontbitbltable>>BITBLTTABLE.height = MIN(7, MAX(0, //MIN(y + 7,
      fullpagebox>>BOX.y2) y2))
      //fontbitbltable>>BITBLTTABLE.sourcetopy = 7 -
      //fontbitbltable>>BITBLTTABLE.height
      //asmbitblt(fontbitbltable)

      //fontbitbltable>>BITBLTTABLE.sourcetopy = 0 // restore
      //fontbitbltable>>BITBLTTABLE.height = 7 // restore
      //]
    //ifnot
      //asmbitblt(fontbitbltable)
      //]
  resultis false
  ]

and putsize2char(char, x, y) =
  valof[ // put a small (7X7) character at indicated loc
  fpsetbits( x, char2width, y + char2height + 1, 1, colorblack)
  resultis putsize1char(char, x, y)
  ]
and blankjdschar(box, fromchar, tochar, color, numargs n) be
  [
  if n eq 3 then color = colorwhite
  let leftx = box>>JDSBOX.x1
  let lineheight = box>>JDSBOX.vsize
  let toy = tochar>>JDSCHAR.y
  let tox = tochar>>JDSCHAR.x
  let fromy = fromchar>>JDSCHAR.y
  let fromx = fromchar>>JDSCHAR.x
  let x1, x2 = box>>JDSBOX.x1, box>>JDSBOX.x2 + 1
  let width = nil
  let localcolor = options!$G eq 0? color, colorwhite
  test (toy ne fromy) % (tox ls fromx)
    ifso // on separate lines
      [
      let nexty = fromy + lineheight
      if (toy + lineheight) le box>>JDSBOX.y2 + 1 then
        [
        while (nexty + lineheight) le toy do
          [
          blankbits(box, leftx, boxwidth(box), nexty, lineheight, localcolor)
          nexty = nexty + lineheight
          ]
        blankbits(box, leftx, tox - leftx, toy, lineheight, localcolor)
        ]
      width = x2 - fromx
      ]
    ifnot // blank out space on same line
      width = tox - fromx
  blankbits(box, fromx, width, fromy, lineheight, localcolor)
  ]
and blankbits(box, x, width, y, height, color) be
  [
  let bitroutine = box eq typescriptbox? bitblt, fpbitblt
  test color eq colorwhite
    ifso
      [
      bitroutine(jdsdat, x, width, y, height, replacefunction, 0, constantsource,
      colorwhite)
      ]
    ifnot
    test color eq -1
      ifso
        [
        bitroutine(jdsdat, x, width, y, height, invertfunction, 0, constantsource,
        colorblack)
        ]
      ifnot
        [
        let hsize = box>>JDSBOX.hsize
        let cwidth, cheight = hsize - box>>JDSBOX.charspace, box>>JDSBOX.vsize -
        box>>JDSBOX.leading
        while width ge cwidth do
          [
          bitroutine(jdsdat, x, cwidth, y, cheight, replacefunction, 0,
          constantsource, color)
          width = width - hsize
          x = x + hsize
          ]
        ]
  ]

and startblink(dat, x, width, y, height, ident, linkedblink, source, bitbltroutine;
numargs n) be
  [
  if n ls 6 then linkedblink = 0
  if n ls 7 then source = 0
  if n ls 8 then bitbltroutine = asmbitblt
  let blinkblock = setblink(dat, x, width, y, height, ident, source, bitbltroutine)
  blinkblock>>BLINKBLOCK.link = linkedblink
  test linkedblink eq 0
    ifso linkedblink = blinkblock
    ifnot
    [
    until linkedblink>>BLINKBLOCK.link eq 0 do
      linkedblink = linkedblink>>BLINKBLOCK.link
    ]
  linkedblink>>BLINKBLOCK.link = blinklist
    blinklist = blinkblock
    ]
  and setblink(dat, x, width, y, height, ident, source, bitbltroutine; numargs n) =
    valof[
    if n le 6 then source = 0
    let blinkblockaddr = getmem(blinkblocksize + 2)
    let blinkblock = (blinkblockaddr + 2)&-2 // force even boundary
    blinkblock!-1 = blinkblockaddr
    clear(blinkblock, blinkblocksize)
    blinkblock>>BLINKBLOCK.ident = ident
    blinkblock>>BLINKBLOCK.bitbltproc = bitbltroutine
    MoveBlock(blinkblock, dat>>DAT.bitbltable, bitbltablesize)
    blinkblock>>BITBLTTABLE.leftx = x
    blinkblock>>BITBLTTABLE.width = width
    blinkblock>>BITBLTTABLE.topy = y
    blinkblock>>BITBLTTABLE.height = height
    test source eq 0
      ifso
        [
        blinkblock>>BITBLTTABLE.sourcetype = constantsource
        ]
      ifnot
```

```
        [
        blinkblock>>BITBLTTABLE.sourcetype = blocksource
        MoveBlock(lv blinkblock>>BITBLTTABLE.sourcebca, source, 4)
        ]
    blinkblock>>BITBLTTABLE.operation = invertfunction
    blinkblock>>BITBLTTABLE.greycode = -1
    resultis blinkblock
    ]
  and stopblink(ident, numargs n) be
    [
    let rlist = removeblink(n eq 0? 0, ident)
    let prevblink = lv rlist - (offset BLINKBLOCK.link + 15)/16
      [
      let blinkblock = prevblink>>BLINKBLOCK.link
      if blinkblock eq 0 then break
      freemem(blinkblock!-1)
      prevblink = blinkblock
      ]repeat
    ]

  and removeblink(ident) =
    // removes all entries on blinklist of type ident, returns a pointer to a linked list of
    the unlinked entries
    valof[
    let prevblink = lv blinklist - (offset BLINKBLOCK.link + 15)/16
    let removedlist = 0
      [
      let blinkblock = prevblink>>BLINKBLOCK.link
      if blinkblock eq 0 then break
      if (ident eq 0) % (blinkblock>>BLINKBLOCK.ident eq ident) then
        [
        prevblink>>BLINKBLOCK.link = blinkblock>>BLINKBLOCK.link
        if blinkblock>>BLINKBLOCK.flag then
          [
          (blinkblock>>BLINKBLOCK.bitbltproc)(blinkblock)
          blinkblock>>BLINKBLOCK.flag = false
          ]
        blinkblock>>BLINKBLOCK.link = removedlist
        removedlist = blinkblock
        loop
        ]
      prevblink = blinkblock
      ]repeat
     resultis removedlist
    ]
  and asmdpbitblt(bitbltable) be
    [
    test typescriptbox>>JDSBOX.textpos eq stoptextpos
      ifso
        [
        asmbitblt(bitbltable)
        ]
      ifnot
        [
        // bitblt but only outside of typescript window
        let y, sourcey = bitbltable>>BITBLTTABLE.topy,
      bitbltable>>BITBLTTABLE.sourcetopy
        let savy = y
        let y1, y2 = typescriptbox>>BOX.y1-2, typescriptbox>>BOX.y2 + 3
        let savheight = bitbltable>>BITBLTTABLE.height
        let sourceheight = savheight
        let height = MAX(0,MIN(savheight,y1-y))
        // Do part above typescript window
          if bitbltable>>BITBLTTABLE.sourcebca eq bitbltable>>BITBLTTABLE.bca
          then
            [
            sourceheight = MAX(0,MIN(sourceheight,y1-sourcey))
            ]
          bitbltable>>BITBLTTABLE.height = MIN(height,sourceheight)
          asmbitblt(bitbltable)
        // Do part below typoscript window
          height = MAX(0,MIN(savheight,y + savheight-y2))
          sourceheight = savheight
          unless bitbltable>>BITBLTTABLE.sourcetype eq constantsource do
            [
            bitbltable>>BITBLTTABLE.sourcetopy = sourcey + MAX(0,y2 - y)
            if bitbltable>>BITBLTTABLE.sourcebca eq bitbltable>>BITBLTTABLE.bca
            then
              [
              sourceheight = MAX(0,MIN(sourceheight,sourcey + sourceheight-y2))
              bitbltable>>BITBLTTABLE.sourcetopy = MAX(sourcey,y2)
              ]
            ]
          bitbltable>>BITBLTTABLE.height = MIN(height,sourceheight)
          bitbltable>>BITBLTTABLE.topy =
          MAX(y + savheight-bitbltable>>BITBLTTABLE.height,y2)
          asmbitblt(bitbltable)
        // Restore arguments
          bitbltable>>BITBLTTABLE.topy = savy
          bitbltable>>BITBLTTABLE.sourcetopy = sourcey
          bitbltable>>BITBLTTABLE.height = savheight
          ]
    ]

  and fpbitblt(dat, x, width, y, height, function, source, sourcetype, color) be
    [
    test typescriptbox>>JDSBOX.textpos eq stoptextpos
      ifso
        [
        bitblt(dat, x, width, y, height, function, source, sourcetype, color)
        ]
      ifnot
        [
        // bitblt but only around typescript window
        let y1, y2 = typescriptbox>>BOX.y1-2, typescriptbox>>BOX.y2 + 3
        let savy, savheight = y, height
        let sourceheight = savheight
        let sourcey = source!3
        // Do part Above typescript box
          height = MAX(0,MIN(savheight,y1-y))
          if sourcetype ne constantsource then
            if source!0 eq dat>>DAT.bitbltable>>BITBLTTABLE.bca then
              sourceheight = MAX(0,MIN(savheight,y1-sourcey))
          bitblt(dat, x, width, y, MAX(0, MIN(height, sourceheight)), function,
          source, sourcetype, color)
        // Do part Below typescript box
          height = MAX(0,MIN(savheight,y + savheight-y2))
          sourceheight = savheight
          if sourcetype ne constantsource then
            [
            source!3 = sourcey + MAX(0,y2-y)
            if source!0 eq dat>>DAT.bitbltable>>BITBLTTABLE.bca then
              [
              sourceheight = MAX(0,MIN(sourceheight,sourcey + sourceheight-y2))
              source!3 = MAX(sourcey, y2)
              ]
            ]
          height = MIN(height,sourceheight)
          y = MAX(y + savheight-height,y2)
```

```
      bitblt(dat, x, width, y, height, function, source, sourcetype, color)
    // Restore arguments
      y = savy
      height = savheight
    ]
  ]

and fpsetbits(x, width, y, height, color) be
  fpbitblt(jdsdat, x, width, y, height, replacefunction, 0, constantsource, color)

and fpinvertbits(x, width, y, height) be
  fpbitblt(jdsdat, x, width, y, height, invertfunction, 0, constantsource, colorblack)

and invertmarker(box, marker) be
  [
  // invert the indicated marker
  if marker eq 0 then return
  if marker>>MARK.textpos eq 0 then return
  let x, y = marker>>MARK.x, marker>>MARK.y
  let type = marker>>MARK.type
  let loc = jdspageloc(x, y)
  let bltroutine = nil
  let source = vec 3
  source!0 = table[
    100001b;
    140003b;
    160007b;
    170017b;
    174037b;
    176077b;
    177177b
    ];
  source!1 = 1
  source!2 = 0
  source!3 = 0
let width, height = nil, nil
let xinc, yinc = 0, nil
let blinktype = insertblink
let synclist = 0
test box eq typescriptbox
  ifso
    [
    unless loc eq typescriptloc do return

    yinc = tsvertcharsize - 7
    width = 7
    height = 7

    if type eq rangemarker then
      [
      source!2 = 9
      xinc = -7
      ]
    bitblt(jdsdat, x + xinc, width, y + yinc, height, invertfunction, source,
    blocksource, colorblack)
    ]
  ifnot
    [
    unless loc eq typescriptloc do
      unless loc eq fullpageloc do return

    bltroutine = fpbitblt

    yinc = vertchar1size - 3
    width = 3
    height = 3

    if type eq rangemarker then
      [
      source!2 = 13
      xinc = -3
      blinktype = rangeblink
      ]
    test marker>>MARK.marked eq 0
      ifso startblink(jdsdat, x + xinc, width, y + yinc, height, blinktype,
      removeblink(rangeblink + insertblink-blinktype), source, asmfpbitblt)
      ifnot stopblink(blinktype)
    ]
  marker>>MARK.marked = not marker>>MARK.marked
  ]

and breakbox(box, textpos) be
  [ // break box at right of textpos
  // First fix up text
    let jdschar = vec jdscharsize - 1
    let nextjdschar = vec jdscharsize - 1
    jdschar>>JDSCHAR.textpos = 0
    findleftxy(box, jdschar, textpos)
    movejdschar(nextjdschar, jdschar)
    findrightxy(box, nextjdschar, textpos)
    let tabchar = 2000b + (jdschar>>JDSCHAR.x - box>>JDSBOX.x1)
      tabchar<<CHAR.opcode = tabcommand
      tabchar<<CHAR.deleted = true
    if box eq typescriptbox then tabchar = tabchar % 4000b
    let pos = brokentest(box, textpos)
    if jdschar>>JDSCHAR.y ne nextjdschar>>JDSCHAR.y then
      pos = 0 // not on same line, so force
    test pos ne 0
      ifso storejdschar(tabchar, pos)
      ifnot appendjdschar(tabchar, textpos)
  // And now do the display
  let bltroutine = box eq typescriptbox? bitblt, fpbitblt
  movejdschar(nextjdschar, jdschar)
  findrightxy(box, nextjdschar, textpos)
  let bitblttable = jdsdat>>DAT.bitblttable
  let source = vec 3
    source!0 = bitblttable>>BITBLTTABLE.bca
    source!1 = bitblttable>>BITBLTTABLE.bmw
  let lineheight = box>>JDSBOX.vsize
  let toy = nextjdschar>>JDSCHAR.y
    if (toy + lineheight) le box>>BOX.y2 + 1 then
      [
      source!2 = box>>JDSBOX.x1
      source!3 = jdschar>>JDSCHAR.y
      bltroutine(jdsdat, box>>JDSBOX.x1, boxwidth(box), toy, box>>JDSBOX.y2 - toy,
      replacefunction, source, blocksource, colorblack)
      ]
    if toy eq jdschar>>JDSCHAR.y then
      nextjdschar>>JDSCHAR.x = box>>JDSBOX.x2 // blank to right of box
    blankjdschar(box, jdschar, nextjdschar, colorlightgrey)
    ]
  and breakline(state, value) be
    [
    markeroff(insertmarker)
    markeroff(rangemarker)
    let jdschar = vec jdscharsize - 1
    let smallflag = false
```

```
let box = jdsboxlist
  [
  if box eq 0 then break
  if intextbox(box, insertpos) then
  if brokentest(box,insertpos) eq 0 then
  unless insertpos eq (box>>JDSBOX.textpos + box>>JDSBOX.textsize - 1) do
  breakbox(box, insertpos)
  box = box>>JDSBOX.link
  ] repeat
markeron(insertmarker, insertpos)
markeron(rangemarker, rangepos)
]


// jdsresscan jdsresscan.ext


// Declarations

 get "lookdecl"
 get "jdsdecl"


 external // Declared in This File
   [
   charscan
   findleftxy
   findrightxy
   ]

 external // Declared in Other Files
   [
   displaycharstack
   intextbox
   kanjibuffer
   movejdschar
   scanchar
   setcharscan
   setjdschar
   typescriptbox
   ]

// Code

 let charscan(box, jdschar, textpos, displayroutine, blankroutine; numargs n) =
   valof[
   // find the xy for the left of the character to right of textpos
   // return jdschar updated, and address of CHARSCANDATA
   unless intextbox(box, textpos) do resultis 0
   unless intextbox(box, jdschar>>JDSCHAR.textpos) do
     setjdschar(box, jdschar)
   unless textpos ge jdschar>>JDSCHAR.textpos do
     [
     let tempjdschar = vec jdscharsize-1
     movejdschar(tempjdschar, jdschar)
     tempjdschar>>JDSCHAR.textpos = 0
     let result = charscan(box, tempjdschar, textpos)
     if n ge 4 then // display it
       [
       movejdschar(tempjdschar, lv result>>CHARSCANDATA.startpos)
       test n eq 4
         ifso
           charscan(box, tempjdschar, jdschar>>JDSCHAR.textpos, displayroutine) //
           display it
         ifnot
           charscan(box, tempjdschar, jdschar>>JDSCHAR.textpos, displayroutine,
           blankroutine) // display it
       result = charscan(box, tempjdschar, textpos) // restore result
       ]
     resultis result
     ]
  let scanresult = setcharscan(box, jdschar)
  let stopy = 77777b
  unless box eq typescriptbox do
    if n ge 4 then
      unless typescriptbox>>JDSBOX.textpos eq stoptextpos do
        if IN(box>>JDSBOX.y2, typescriptbox>>JDSBOX.y1,
        typescriptbox>>JDSBOX.y2 + box>>JDSBOX.vsize - 1) then // suppress last part
        of box
          stopy = typescriptbox>>JDSBOX.y1
   // start of scan loop
    [
    if scanchar(scanresult) is 0 then break // done
    if scanresult>>CHARSCANDATA.nextpos gr textpos then break // we have gone
    past it
    if scanresult>>CHARSCANDATA.nexty ge stopy then
      [
      scanresult>>CHARSCANDATA.character = -1 // done
      break
      ]

    if n ge 4 then // display it
      [
      let char = scanresult>>CHARSCANDATA.character
      test (char eq deletedjdschar) % (char eq jdsblankchar)
        ifso [illegible] blank
          if n eq 5 then
            blankroutine(box, lv scanresult>>CHARSCANDATA.startpos, lv
            scanresult>>CHARSCANDATA.nextpos, char eq jdsblankchar?
            colorwhite, colorlightgrey)
        ifnot
          if displayroutine(char, scanresult>>CHARSCANDATA.startx,
          scanresult>>CHARSCANDATA.starty) then
            [
            displaycharstack(kanjibuffer)
            displayroutine(char, scanresult>>CHARSCANDATA.startx,
            scanresult>>CHARSCANDATA.starty)
            ]
      ]
    ] repeat
  resultis scanresult
  ]

and findleftxy(box, jdschar, textpos) =
  // find the xy for the left of the character to right of textpos
  // return character
  valof[
  let scanresult = charscan(box, jdschar, textpos)
  if scanresult eq 0 then
    [
    setjdschar(box, jdschar)
    resultis 0
    ]
  movejdschar(jdschar, lv scanresult>>CHARSCANDATA.startpos)
  if scanresult>>CHARSCANDATA.startpos eq textpos then resultis 0
  resultis scanresult>>CHARSCANDATA.character
  ]
```

```
and findrightxy(box, jdschar, textpos) =
  // find the xy for the right of the character to right of textpos
  // return character
  valof{
  let scanresult = charscan(box, jdschar, textpos)
  if scanresult eq 0 then
    {
    setjdschar(box, jdschar)
    resultis 0
    }
  movejdschar(jdschar, lv scanresult>>CHARSCANDATA.nextpos)
  resultis scanresult>>CHARSCANDATA.character
  }

  // jdsselect jdsselect.ext


  // Declarations

    get "tooldecl"
    get "fonttooldecl"
    get "jdsdecl"


    external // Declared in This File
      {
      selectjdschar
      selectnextbox
      setjdsmarker
      }

    external // Declared in Other Files
      {
      emptytypescriptbox
      c...typescriptbox
      fill...scriptbox
      findjdsbox
      inbox
      infixedtext
      initkanjilookup
      insertpos
      intextbox
      jdsboxlist
      jdscommandx
      jdscommandy
      jdspageloc
      markeroff
      markeron
      marktext
      re...pos
      sc...char
      setcharscan
      typescriptbox
      }


  // Code
   let setjdsmarker(state, value) be
     {
     // value = insertmarker for insert, rangemarker for range, 2 for both
     let x, y = jdscommandx textareax, jdscommandy - textareay
     let loc = jdspageloc(x, y)
     unless loc ge typescriptloc do return
     if typescriptbox>>JDSBOX.textpos ne stoptextpos then x =
     MAX(typescriptbox>>JDSBOX.x1,MIN(typescriptbox>>JDSBOX.x2,x))
     let ... finddsbox(x, y, typescriptbox>>JDSBOX.textpos eq stoptextpos?
     ty...>>JDSBOX.link, jdsboxlist)
     if ... return
     let ... = selectjdschar(box, x, y)
     if ... eq 2 then
       {
       m...eroff(rangemarker)
       m...keron(rangemarker, textpos)
       //initkanjilookup()
       value = insertmarker
       }
     unless textpos le insertpos do
       value = insertmarker
     test value eq insertmarker
       ifso
         {
         unless textpos ge rangepos do return
         markeroff(insertmarker)
         markeron(insertmarker, textpos, rangemarker)
         }
       ifnot
         {
         markeroff(rangemarker)
         markeron(rangemarker, textpos)
         }
     initkanjilookup()
     }
   and ...(state, value) =
     valof{
     // return true if another box selected
     let currbox = insertpos eq 0? typescriptbox,
       valof{
       let box = typescriptbox
       // start of loop
         {
         box = box>>JDSBOX.link
         if box eq 0 then resultis 0
         if intextbox(box, insertpos) then resultis box
         } repeat
       }
     if currbox eq 0 then resultis false
     let box = currbox
     // start of loop
       {
       box = box>>JDSBOX.link
       if box eq 0 then resultis 0
       if box>>JDSBOX.skipboxflag eq 0 then break
       } repeat
     // emptytypescriptbox(state, value)
     markeroff(insertmarker)
     markeroff(rangemarker)
     let pos = box>>JDSBOX.textpos-1
     // fill typescript window
       let oldtextpos = typescriptbox>>JDSBOX.textpos
       unless oldtextpos eq stoptextpos do // unmark text
         marktext(oldtextpos,oldtextpos + typescriptbox>>JDSBOX.textsize)
       typescriptbox>>JDSBOX.textpos = box>>JDSBOX.fixedtextsize eq 0?
       ((box>>JDSBOX.textpos + 1) & -2) ((box>>JDSBOX.fixedtextpos + 1) & -2)
       typescriptbox>>JDSBOX.textsize =
       MAX(0,box>>JDSBOX.textsize + box>>JDSBOX.fixedtextsize)
       typescriptbox>>JDSBOX.insertmark>>MARK.textpos = 0
       typescriptbox>>JDSBOX.rangemark>>MARK.textpos = 0
       displaytypescriptbox()
     markeron(rangemarker, pos)
     markeron(insertmarker, pos + box>>JDSBOX.textsize)
     // filltypescriptbox(state, value)
     resultis true
     }
  and selectjdschar(box, x, y) =
    valof {
    // return textpos for char
    unless inbox(x, y, box) do resultis 0
    test box>>JDSBOX.textsize eq 0
      ifso
        {
        resultis box>>JDSBOX.textpos-1 // to the left of first character
        }
      ifnot
        {
        let jdschar = vec jdscharsize-1
          jdschar>>JDSCHAR.textpos = 0
        let scanresult = setcharscan(box, jdschar)

        // look for line containing y

          y = (MAX(0, MIN(box>>JDSBOX.y2,
          y) jdschar>>JDSCHAR.y)/box>>JDSBOX.vsize) * box>>JDSBOX.vsize +
          jdschar>>JDSCHAR.y
          // start of loop
            {
            if y le scanresult>>CHARSCANDATA.starty then
              break // found it
            if scanchar(scanresult) le -1 then
              break // didn't find it
            } repeat

        x = x + (box>>JDSBOX.hsize rshift 1)
        // by here, scanresult>>CHARSCANDATA.startpos points to start of line
        containing y
            {
            if x le scanresult>>CHARSCANDATA.nextx then break
            if scanchar(scanresult) le -1 then break // didn't find it
            unless y eq scanresult>>CHARSCANDATA.nexty do break // off line
            } repeat

        // now make sure its not in fixed text in the typescript box

        let textpos = scanresult>>CHARSCANDATA.startpos

        if box eq typescriptbox then
          {
          let box1 = typescriptbox>>JDSBOX.link
            {
            if box1 eq 0 then break
            if infixedtext(box1, textpos) then // whoops!!
              {
              textpos = box1>>JDSBOX.textpos-1 // to left of first text char
              break
              }
            box1 = box1>>JDSBOX.link
            } repeat
          }
        resultis textpos

            }
    }

  // jdsstatics jdsstatics.ext

  get "tooldecl"
  get "jdsdecl"


  external // Declared in This File
    {
    blinkclr
    blinkinterval
    blinklist
    colorflag
    commandring
    currentpage
    deletedpage
    deletedsize
    firstnarrowpage
    fullpagebox
    functionkeys
    functiontable
    hiraganafont
    incharnum
    inputregister
    inputring
    insertpos
    jdsboxlist
    jdscommandx
    jdscommandy
    jdsdat
    jdsfile
    jdsfileFP
    jdsfilename
    jdsgoflag
    jdsmousebuttons
    jdsmousex
    jdsmousey
    jdspage
    jdspage0
    jdsshift
    jdsstatetable
    jdstext
    jdsttyfont
    jdsttyfontascent
    jdswordflag
    kanacount
    kanaring
    kanjibuffer
    kanjidict
    kanjientry
    kanjifile
    kanjikeyvec
    kanjistack
    katakanafont
    keytopdat
    lastcursorloc
    lookupdict
    lookupfile
    lookupfile0
    lookupfile1
    narrowfile
    mousebuttons
    nofilefunctions
    nopagefunctions
```

```
   numdateflag
   numdatefunctions
   outcharnum
   pagefunctions
   pagenodisplayinfo
   pagenumberson
   pagesleftlocx
   printkanjifile
   rangepos
   romajifont
   savekanaring
   selectedpage
   selectfunctions
   singlekanjiselect
   startkanjipos
   stateblock
   stateblockend
   statsfile
   statson
   statstring
   storedsize
   textfunctions
   typescriptbox
   workfile
   ]

static
   [
   blinkctr
   blinkinterval = 30
   blinklist
   colorflag
   commandring
   currentpage
   deletedpage
   deletedsize
   functionkeys
   functiontable
   hiraganafont
   incharnum
   inputregister
   inputring
   insertpos
   firstnarrowpage
   fullpagebox
   jdsboxlist
   lastcursorloc
   jdscommandx
   jdscommandy
   jdsdat
   jdsfile
   jdsfileFP
   jdsfilename
   jdsgoflag
   jdsmousebuttons = 377b
   jdsmousex
   jdsmousey
   jdspage = -1
   jdspage0 = 0
   jdsshift
   jdsshiftetable
   jdstext
   jdsstrfont
   jdsstrfontascent
   jdswordflag
   kanaring
   kanjidict
   kanacount
   kanjientry
   kanjifile
   kanjikeyvec
   kanjistack
   kanjibuffer
   katakanafont
   keytopdat
   lookupdict
   lookupfile
   lookupfile0
   lookupfile1
   narrowfile
   mousebuttons = 7
   nofilefunctions
   nopagefunctions
   numdateflag
   numdatefunctions
   outcharnum
   pagefunctions
   pagenodisplayinfo
   pagenumberson
   pagesleftlocx
   printkanjifile
   rangepos
   romajifont
   savekanaring
   selectedpage
   selectfunctions
   singlekanjiselect
   stateblock
   stateblockend
   statsfile
   statson
   statstring
   startkanjipos
   storedsize
   textfunctions
   typescriptbox
   workfile
   ]

// jdsutilities jdsutilities.ext

// Declarations

  get "tooldecl"
  get "jdsdecl"

  external // Declared in This File
    [
    createmarker
    expandbox
    findjdsbox
    markeroff
    markeron
    trimbox
```

```
    ]

  external // Declared in Other Files
    [
    boxheight
    boxwidth
    findleftxy
    inbox
    inseqtpos
    intextbox
    invertmarker
    jdsboxlist
    MoveBlock
    movejdschar
    rangepos
    typescriptbox
    ]

// Code

  let createmarker(box, type) =
    valof[
    let marker = getmem(marksize)
    clear(marker, marksize)
    marker>>MARK.type = type
    resultis marker
    ]

  and findjdsbox(x, y, boxlist) =
    valof[ // find a box on the list -- return 0 if none
      [
      if boxlist eq 0 then break
      if inbox(x, y, boxlist) then
        [
        if boxlist ne typescriptbox then break
        if typescriptbox>>JDSBOX.textpos ne stoptextpos then break
        ]
      boxlist = boxlist>>JDSBOX.link
      ]repeat
    resultis boxlist
    ]

  and markeroff(type) be
    [
    // turn off all markers of indicated type
    // *** JDS DAT COORDS ***
    let box = jdsboxlist
    // start of loop
      [
      if box eq 0 then break
      let marker = @(lv box>>JDSBOX.markers + type)
      if marker>>MARK.marked then
        invertmarker(box, marker)
      box = box>>JDSBOX.link
      ]repeat
    ]

  and markeron(type, textpos, sourcemarker; numargs n) be
    [
    // mark with new marker if legal coordinates
    // *** JDS DAT COORDS ***
    let box = jdsboxlist
    if n le 2 then sourcemarker = type
    // start of loop
      [
      if box eq 0 then break
      if intextbox(box, textpos) then
        [
        let marker = @(lv box>>JDSBOX.markers + type)
      let pos = marker>>MARK.textpos
      unless intextbox(box, pos) do
        marker>>MARK.textpos = 0

      unless sourcemarker eq type do
        [
        let othermark = @(lv box>>JDSBOX.markers + (1-type))
        let pos = othermark>>JDSCHAR.textpos
        if intextbox(box, pos) then
          if (pos eq (sourcemarker eq rangemarker? rangepos, insertpos)) then
            if pos le textpos then
              movejdschar(marker, othermark)
        ]

      test findleftxy(box, marker, textpos) eq -1
        ifso
          clear(marker, jdscharsize)
        ifnot
          unless marker>>MARK.marked do
            invertmarker(box, marker)
      ]
    box = box>>JDSBOX.link
    ]repeat

  test type eq rangemarker
    ifso rangepos = textpos
    ifnot insertpos = textpos
  ]

and expandbox(jdsbox, box; numargs n) be
  [
  // fix box to be include leading all around
  if n eq 1 then box = jdsbox
  let box1 = vec 3
  MoveBlock(box, jdsbox, boxsize)
  trimbox(jdsbox, box1) // get proper right and lower bounds
  // Fix width
    [
    box>>BOX.x1 = box>>BOX.x1 - jdsbox>>JDSBOX.charspace
    //box>>BOX.x2 = MAX(box1>>BOX.x2 + jdsbox>>JDSBOX.charspace, box>>BOX.x2)
    box>>BOX.x2 = MAX(box1>>BOX.x2 , box>>BOX.x2)
    ]
  // Fix height
    [
    box>>BOX.y1 = box>>BOX.y1 - jdsbox>>JDSBOX.leading
    //box>>BOX.y2 = MAX(box1>>BOX.y2 + jdsbox>>JDSBOX.leading, box>>BOX.y2)
    box>>BOX.y2 = MAX(box1>>BOX.y2 , box>>BOX.y2)
    ]
  ]

and trimbox(jdsbox, box; numargs n) be
  [
  // fix box to be in JDS box increments
  if n eq 1 then box = jdsbox
  MoveBlock(box, jdsbox, boxsize)
  // Fix width
    [
    let hsize = jdsbox>>JDSBOX.hsize
```

```
 let nchars = MAX(boxwidth(box)/hsize, 1)
 box>>BOX x2 = MAX(box>>BOX x1, box>>BOX.x1 + nchars*hsize - 1)
 }
// Fix height
 {
 let vsize = jklsbox>>JOSBOX.vsize
 let nlines = MAX(boxheight(box)/vsize, 1)
 box>>BOX y2 = MAX(box>>BOX.y1, box>>BOX.y1 + nlines*vsize - 1)
 }
}
```

What is claimed is:

1. A data processing system permitting the simultaneous display of two different images representing the same page of text but displayed in different font character sizes in different areas of a display and comprising:

(1) first storage means (64) for storing character font data representative of a first set of characters, each character of said first set being represented as a bit map of first predetermined dimensions;

(2) second storage means (90) for storing character font data representative of a second set of characters, each character of said second set corresponding to a character in said first set but being represented as a bit map of second predetermined dimensions of greater arbitrary scale than said first predetermined dimensions in order to provide more geometric detail of characters in said first set of characters, said second set character font data stored in said second storage means in numerically ordered character strikes with a predetermined number of characters per strike;

(3) third storage means (60) coupled to said first and second storage means for storing bit map representations of preselected of said first and second sets of characters, said preselected first set characters representative of a selected stored page of text and said preselected second set characters representative of a portion of or aspects of a corresponding stored page of text;

(4) fourth storage means (92) for storing pages of text, each page comprising a character identification list representative of said preselected firt set characters for each stored page of text and their position on each page, (5) fifth storage means (76) for storing a bit map generation control list and a second list representative of preselected second set characters based upon a character identification list for a selected stored page of text, (6) display means (24) coupled to said third storage means for displaying said bit map representations in a display area thereof;

(7) segmenting means (62, 78) coupled to said third storage means for defining first and second segments (DCB's) of said bit map representations in said third storage means to thereby define first and second display sections (66, 74 or 96) in predetermined locations of said display area;

(8) display control means (26) coupled to said third storage means and to said display means for controlling said display means to display said preselected first and second set characters in said display area in accordance with the character font data stored in said bit map representations in said third storage means, said first display section (66) representing said preselected first set characters for a selected page of text, and said second display section (74 or 96) representing said preselected second set characters;

(9) data control means (CPU 10) coupled to said first, second, third, fourth and fifth storage means for controlling the processing and handling of character font data for a selected page of text, said data control means comprising (i) means for accessing from said first storage means said preselected first set characters in their ordered visual display sequence in accordance with the character identification list for said selected page of text and for transferring said preselected first set characters from said first storage means into said first segment in said third storage means for display in said first display section;

(ii) means for creating said display bit map generation control list (FIG. 7) in said fifth storage means based upon said character identification list for said selected page of text, said control list representative of said preselected second set characters for said selected page of text and to be displayed in said second display section in their ordered visual display sequence;

(iii) means for sorting through said control list (FIG. 7) in said fifth storage means and rearranging said preselected second set characters in said control list into said second list (FIG. 8) representative of an ordered sequence in which said preselected second set characters appear in said second storage means in said numerically ordered character strikes;

(iv) means for examining said second list to generate character strike selection signals representative of said selected character strikes in said second storage means that have the character font data for all said preselected second set characters in said second list;

(v) means for selecting said preselected second set characters from each accessed, selected character strike and for transferring the selected of said preselected second set characters into said second segment in said third storage means for display in said second display section;

(10) transfer means (22) coupled to said data control means and said second and fifth storage means and responsive to said character strike selection signals from said data control means to sequentially access from said second storage means, in ascending order, selected character strikes;

(11) data buffer means (68, 70, 72) coupled to said data control means and to said second and third storage means to sequentially receive and store said selected character strikes accessed by said transfer means, and for transmitting the selected of said preselected second set characters into said second segment in said third storage means under the control of said data control means for display in said second display section.

2. The data processing system of claim 1 wherein said data buffer means is capable of receiving and storing a presently accessed character strike from said second storage means concurrently with the storage of a previously accessed character strike from said second storage means, the selection and transfer to said third storage means of said selected of said preselected second set characters from said previous accessed character strike occurring simultaneously with the access and transfer to said data buffer means of said presently accessed character strike.

3. The data processing system of claim 1, wherein said first and third storage means is a solid-state random access memory.

4. The data processing system of claim 3, wherein said second storage means is a magnetic disk random access memory.

5. The data processing system of claim 1, wherein the first set of characters include a plurality of character sub-sets, and all of the characters of a predetermined one of said sub-sets are represented by a single character font bit map in said first storage means.

6. The data processing system of claim 5, wherein the plurality of character sub-sets include Hiragana, Katakana, Romaji and Kanji character sub-sets, and said predetermined one character sub-set is the Kanji character sub-set.

7. The data processing system of claim 6, wherein the second set of characters include Hiragana, Katakana, Romaji and Kanji character sub-sets.

* * * * *